(12) United States Patent
Senshu

(10) Patent No.: US 7,876,652 B2
(45) Date of Patent: *Jan. 25, 2011

(54) DISC RECORDING MEDIUM, DISC DRIVE APPARATUS, AND REPRODUCTION METHOD

(75) Inventor: Susumu Senshu, Kanagawa (JP)

(73) Assignee: Sony Corporation, Tokyo (JP)

(*) Notice: Subject to any disclaimer, the term of this patent is extended or adjusted under 35 U.S.C. 154(b) by 290 days.

This patent is subject to a terminal disclaimer.

(21) Appl. No.: 11/852,866

(22) Filed: Sep. 10, 2007

(65) Prior Publication Data

US 2009/0231985 A1 Sep. 17, 2009

Related U.S. Application Data

(63) Continuation of application No. 10/267,806, filed on Oct. 9, 2002, now Pat. No. 7,355,936.

(30) Foreign Application Priority Data

Oct. 11, 2001 (JP) .............................. 2001-313819

(51) Int. Cl.
G11B 20/22 (2006.01)
G11C 29/20 (2006.01)
H04N 5/91 (2006.01)

(52) U.S. Cl. .............. 369/47.24; 369/59.25; 369/275.3; 714/769; 714/814; 386/126

(58) Field of Classification Search ............... 369/275.3
See application file for complete search history.

(56) References Cited

U.S. PATENT DOCUMENTS 4,429,334 A * 1/1984 Hashimoto et al. ............ 386/13

(Continued)

FOREIGN PATENT DOCUMENTS

EP 0 800 172 A2 10/1997

(Continued)

OTHER PUBLICATIONS

Schep, K et al: "Format Description and Evaluation of the 22.5 GB Digital-Video-Recording Disc" Japanese Journal of Applied Physics, Japan Society of Applied Physics, Tokyo, JP, vol. 40, No. 3B, Part 1, Sep. 5, 2000, pp. 1813-1816, XP001038396, ISSN: 0021-4922.

Narahara, T et al: "Optical Disc System for Digital Video Recording" Japanese Journal of Applied Physics, Japan Society of Applied Physics, Tokyo, JP, vol. 39, No. 2B, Part 1, Jul. 11, 1999, pp. 912-919, XP001005912, ISSN:0021-4922.

*Primary Examiner*—Daniell L Negrón
*Assistant Examiner*—Kezhen Shen
(74) *Attorney, Agent, or Firm*—Oblon, Spivak, McClelland, Maier & Neustadt, L.L.P.

(57) ABSTRACT

First data representing user data and third data use the same error correction codes. The first data has a first error correction block structure and the third data has a second error correction block structure. That is to say, the first data and the third data have their respective error correction block structures proper for them. In particular, the recording density of the third data is made less dense than the recording density of the first data, and the number of correction codes in the first error-correction block is set at a multiple of m whereas the number of correction codes in the second error-correction block is set at n/m times the number of correction codes in the first error-correction block so that a data-piece count in the second error-correction block is also n/m times a data-piece count in the first error-correction block. As a result, it is possible to provide a good technique of recording shipping-time information onto a high-recording-density disc.

24 Claims, 34 Drawing Sheets

U.S. PATENT DOCUMENTS

| | | | |
|---|---|---|---|
| 4,513,327 A * | 4/1985 | Takahashi et al. | 386/33 |
| 5,848,050 A | 12/1998 | Nagasawa et al. | |
| 5,870,375 A | 2/1999 | Maeda et al. | |
| 5,930,210 A * | 7/1999 | Timmermans et al. | 369/44.13 |
| 6,249,896 B1 | 6/2001 | Ho et al. | |
| 6,262,950 B1 | 7/2001 | Narahara et al. | |
| 6,721,251 B2 | 4/2004 | Kojima et al. | |
| 7,110,332 B2 * | 9/2006 | Schep et al. | 369/47.19 |
| 7,274,627 B2 * | 9/2007 | Schep et al. | 369/44.13 |
| 2001/0005357 A1 * | 6/2001 | Ha et al. | 369/275.4 |
| 2003/0048725 A1 * | 3/2003 | Lee et al. | 369/59.13 |
| 2003/0090977 A1 * | 5/2003 | Schep et al. | 369/53.21 |
| 2004/0233812 A1 * | 11/2004 | Kobayashi | 369/53.35 |

FOREIGN PATENT DOCUMENTS

| | | |
|---|---|---|
| EP | 0 837 471 A2 | 4/1998 |
| EP | 1 128 366 A2 | 8/2001 |
| EP | 1 435 607 A1 | 7/2004 |
| JP | 9-50677 | 2/1997 |
| JP | 9-265630 | 10/1997 |
| JP | 10-125005 | 5/1998 |
| JP | 10-222874 | 8/1998 |
| JP | 10-241167 | 9/1998 |
| JP | 11-096683 | 4/1999 |
| JP | 11-353810 | 12/1999 |
| JP | 2000-40307 | 2/2000 |
| JP | 2000-293944 | 10/2000 |
| JP | 2001-311489 | 10/2001 |

* cited by examiner

Disc Layout

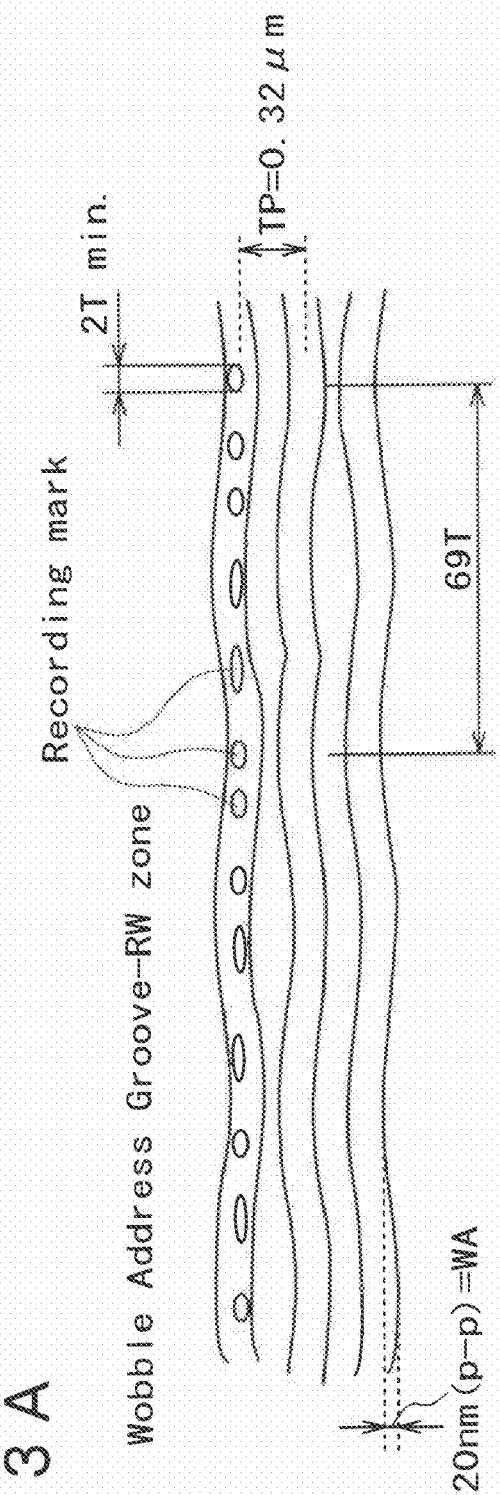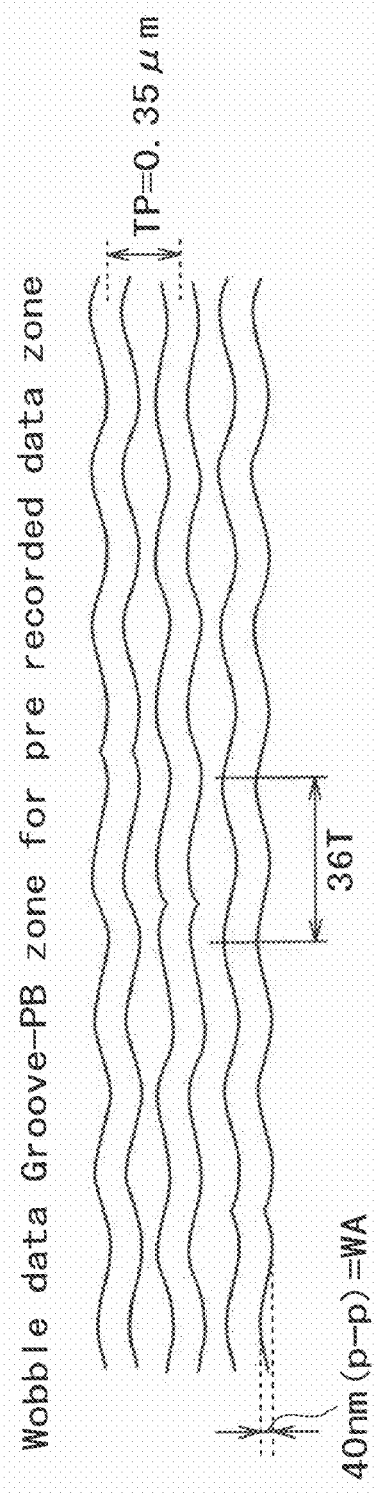
F I G. 3A
F I G. 3B

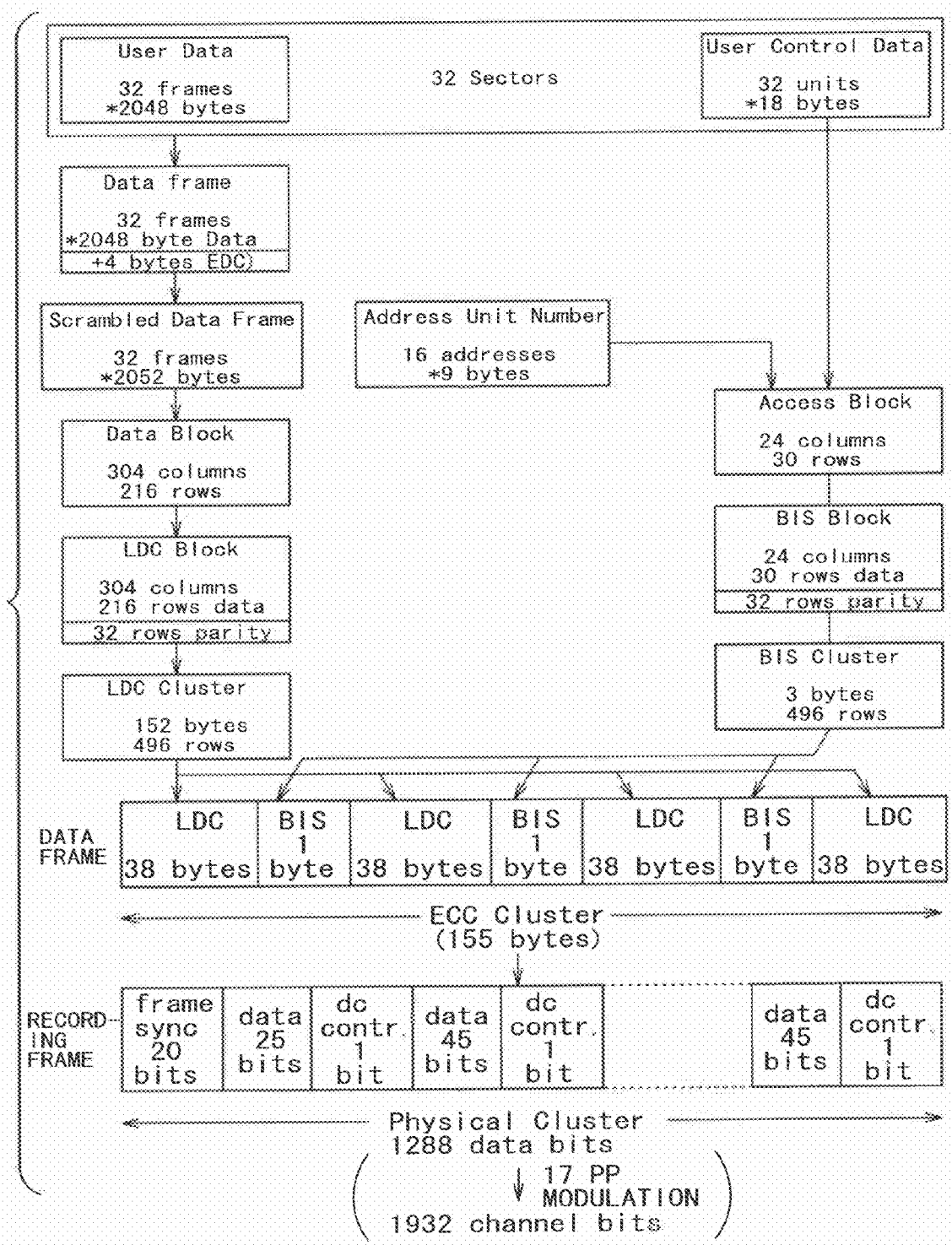

FIG. 5A
ECC
RW main data 64 KB block
LDC
RS (248, 216, 33)
FIG. 5C
BIS
RS (62, 30, 33)
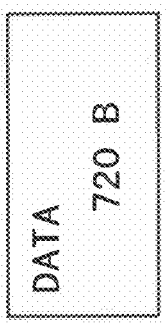
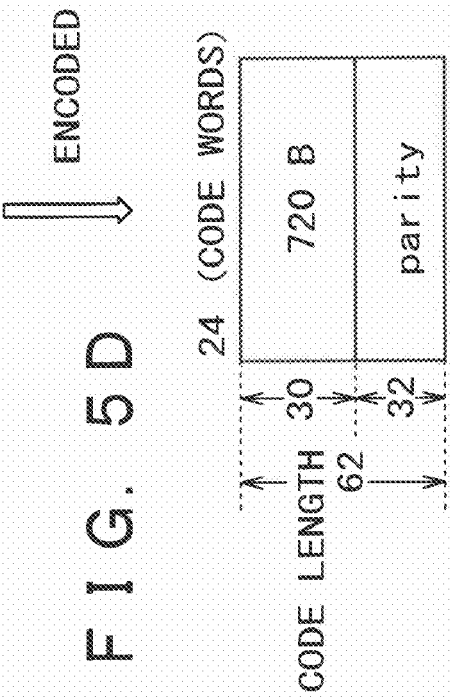
FIG. 5B
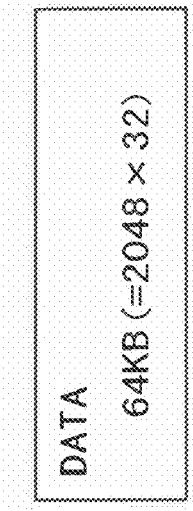
FIG. 5D
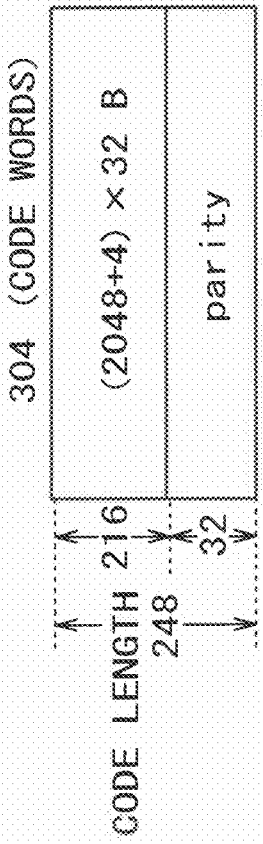

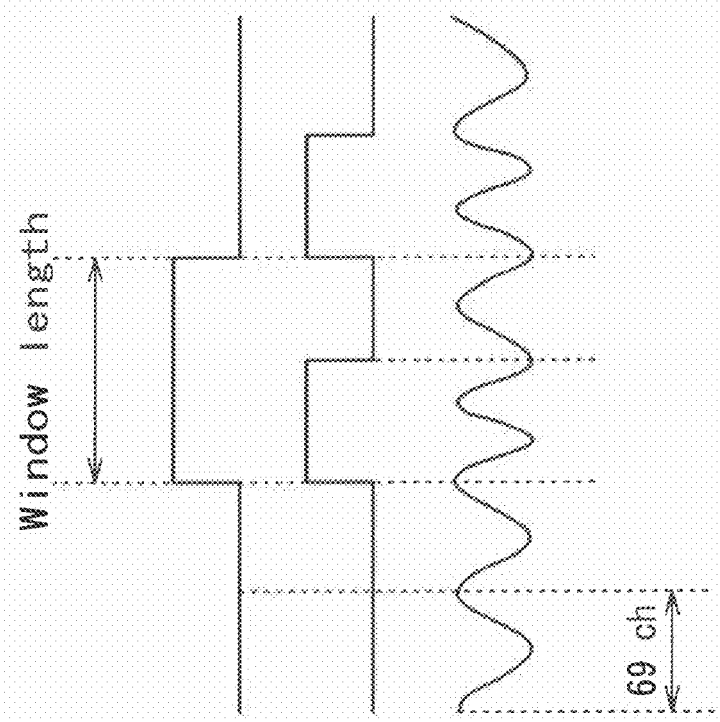

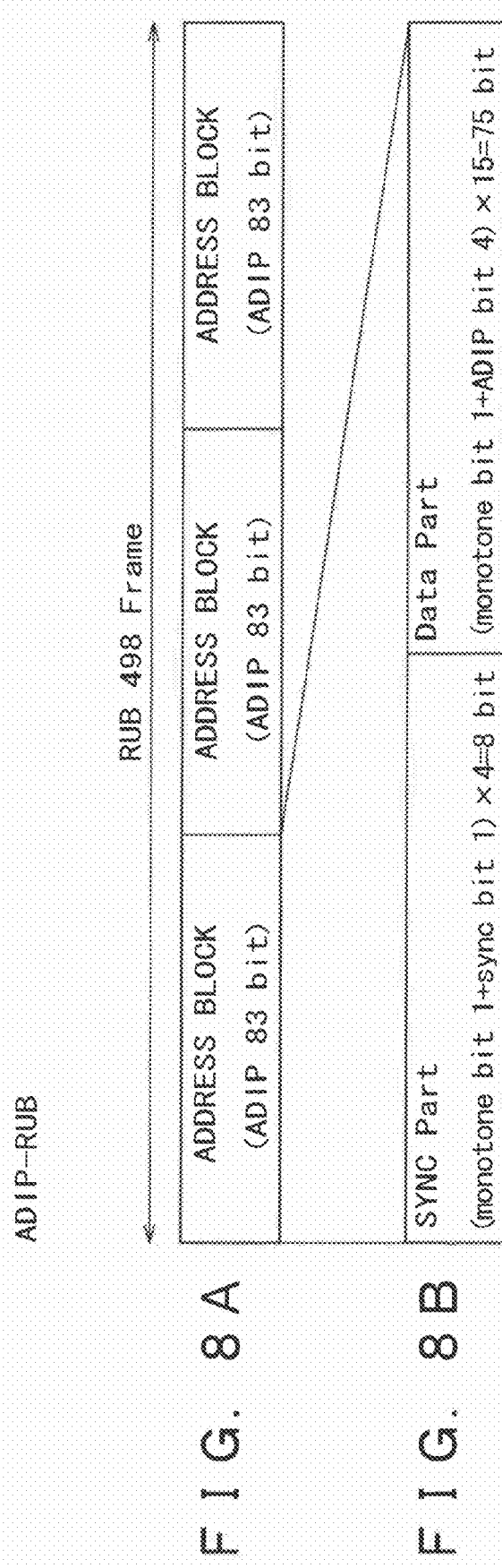

Sync Part

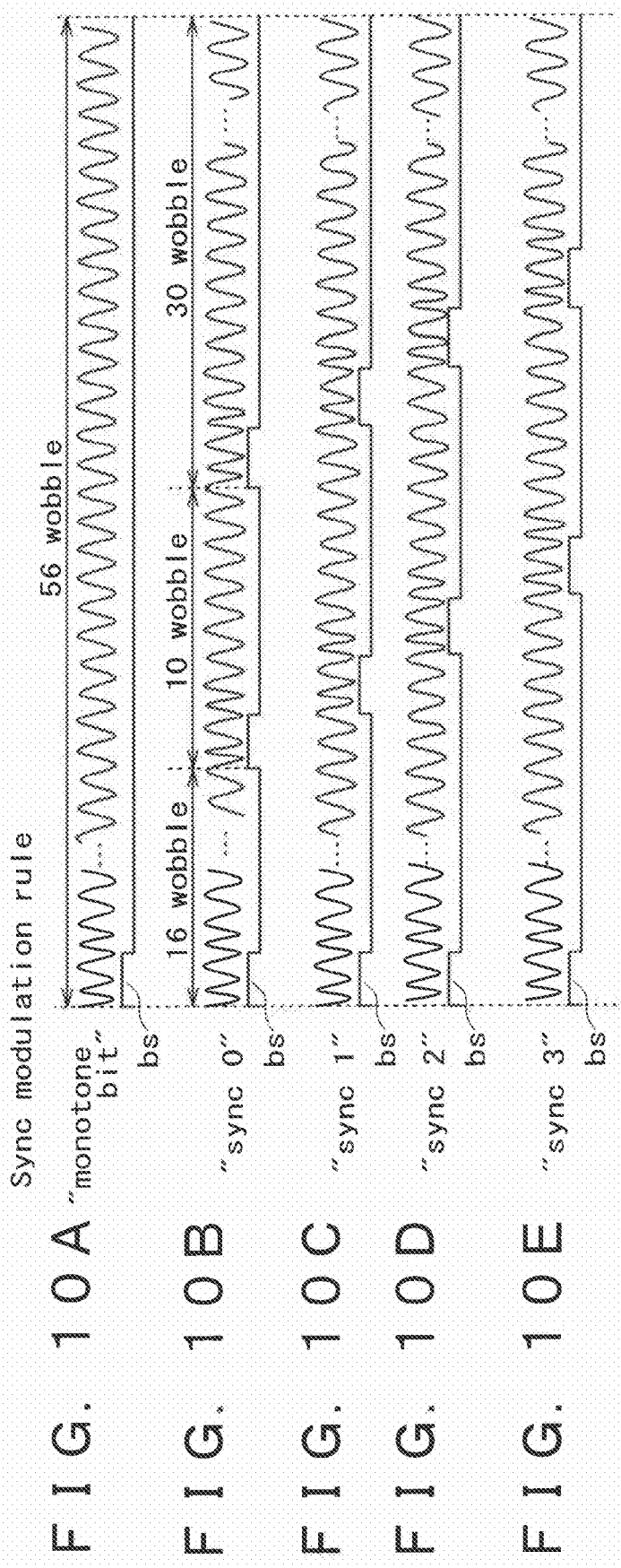

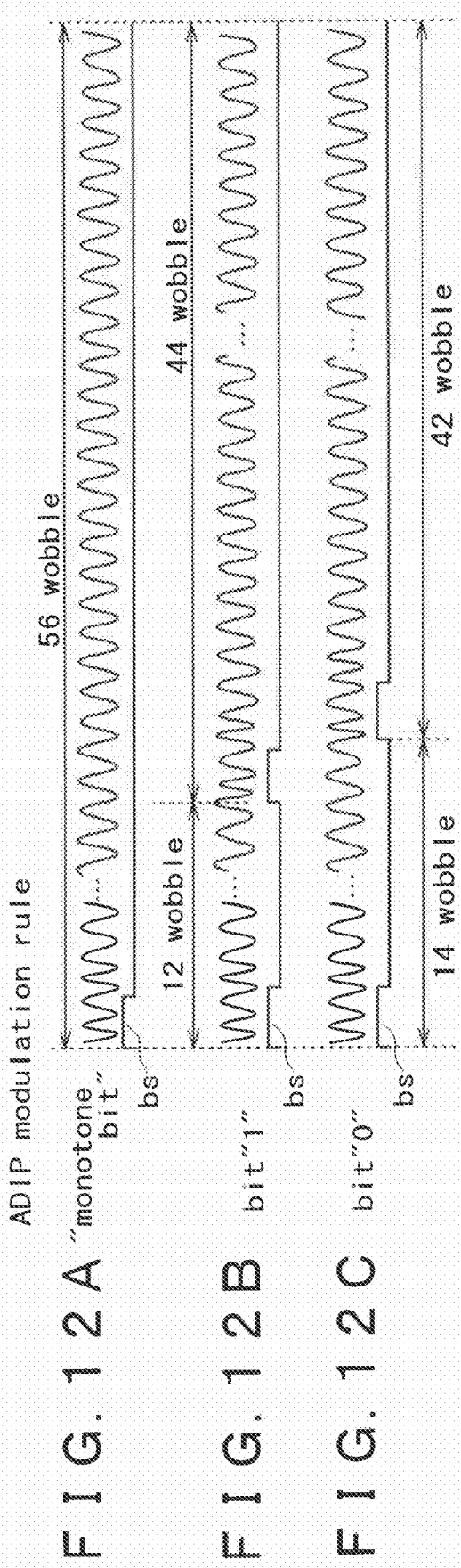

FIG. 13

ECC: Nibble(4 bits) based 1D RS(15, 9, 7)

| Layer | 3 bits |
| RUB | 19 bits |
| Address number/RUB | 2 bits |
| Aux data | 12 bits |
| Parity | 24 bits |
| Total | 60 bits |

| | | | | |
|---|---|---|---|---|
| Nibble 0 | layer no. bit 2 | layer no. bit 1 | layer no. bit 0 | ADIP address 6 nibbles |
| Nibble 1 | RUB no. bit 17 | RUB no. bit 16 | RUB no. bit 15 | RUB no. bit 14 |
| Nibble 2 | RUB no. bit 13 | RUB no. bit 12 | RUB no. bit 11 | RUB no. bit 10 |
| Nibble 3 | RUB no. bit 9 | RUB no. bit 8 | RUB no. bit 7 | RUB no. bit 6 |
| Nibble 4 | RUB no. bit 5 | RUB no. bit 4 | RUB no. bit 3 | RUB no. bit 2 |
| Nibble 5 | RUB no. bit 1 | RUB no. bit 0 | address no. bit 1 | address no. bit 0 |
| Nibble 6 | reserve bit 11 | reserve bit 10 | reserve bit 9 | reserve bit 8 |
| Nibble 7 | reserve bit 7 | reserve bit 6 | reserve bit 5 | reserve bit 4 |
| Nibble 8 | reserve bit 3 | reserve bit 2 | reserve bit 1 | reserve bit 0 |
| Nibble 9 | parity bit 23 | parity bit 22 | parity bit 21 | parity bit 20 |
| Nibble 10 | parity bit 19 | parity bit 18 | parity bit 17 | parity bit 16 |
| Nibble 11 | parity bit 15 | parity bit 14 | parity bit 13 | parity bit 12 |
| Nibble 12 | parity bit 11 | parity bit 10 | parity bit 9 | parity bit 8 |
| Nibble 13 | parity bit 7 | parity bit 6 | parity bit 5 | parity bit 4 |
| Nibble 14 | parity bit 3 | parity bit 2 | parity bit 1 | parity bit 0 | total 15 nibbles
data 9 nibbles
parity 6 nibbles

Aux data 3 nibbles

Nibbled based 1D-RS ECC 6 nibbles

\* parity bits are recorded as inverted bits

FM code
modulation rule
FIG. 14A   data bit         "1"         "0"
FIG. 14B   ch clock          
           Bi-phase
FIG. 14C  ⎰(FM code)         
FIG. 14D  ⎱wobble
           Bi-phase
              or
FIG. 14E  ⎰FM code           
FIG. 14F  ⎱wobble            
FIG. 14G   data bit stream 1 0 1 1 0 0 1 0
FIG. 14H  ⎰FM code stream  
FIG. 14I  ⎱Wobble stream   
              or
FIG. 14J  ⎰FM code stream  
FIG. 14K  ⎱Wobble stream   

FIG. 16A
ECC
Pre recorded data 4kB block
LDC
RS (248, 216, 33)
BIS
RS (62, 30, 33)
FIG. 16C
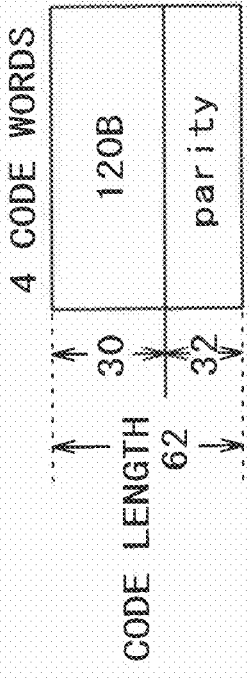
FIG. 16B
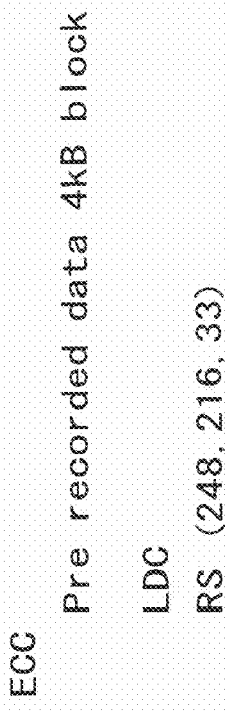
FIG. 16D
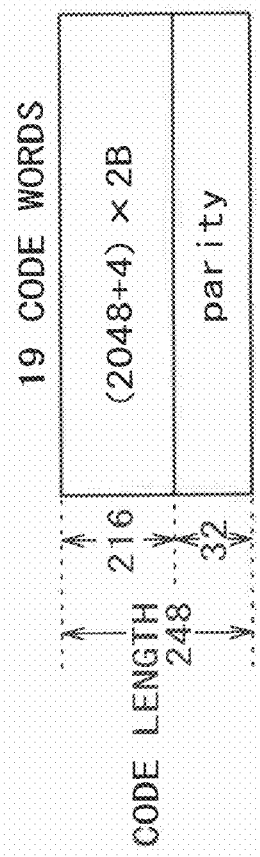

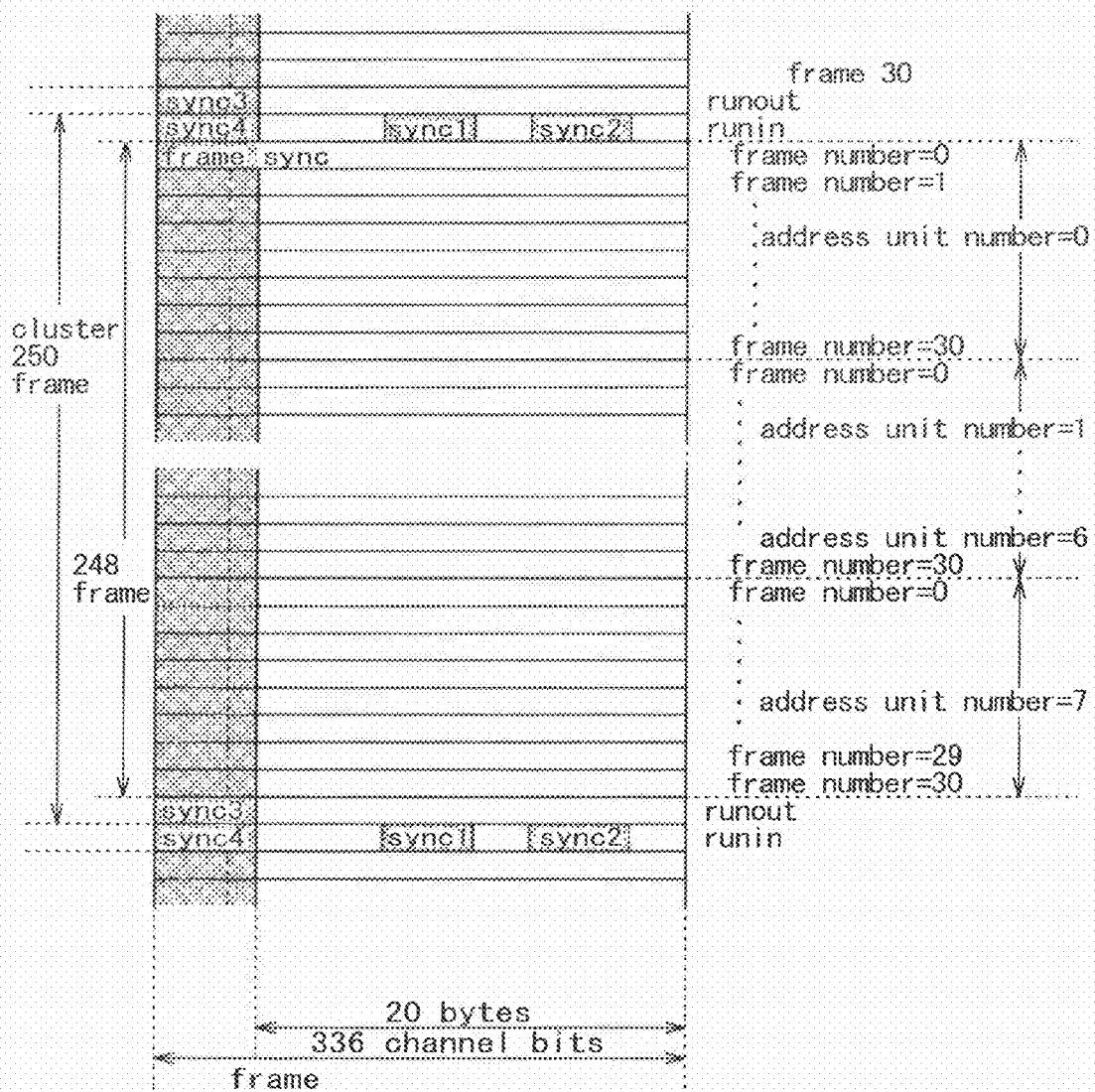

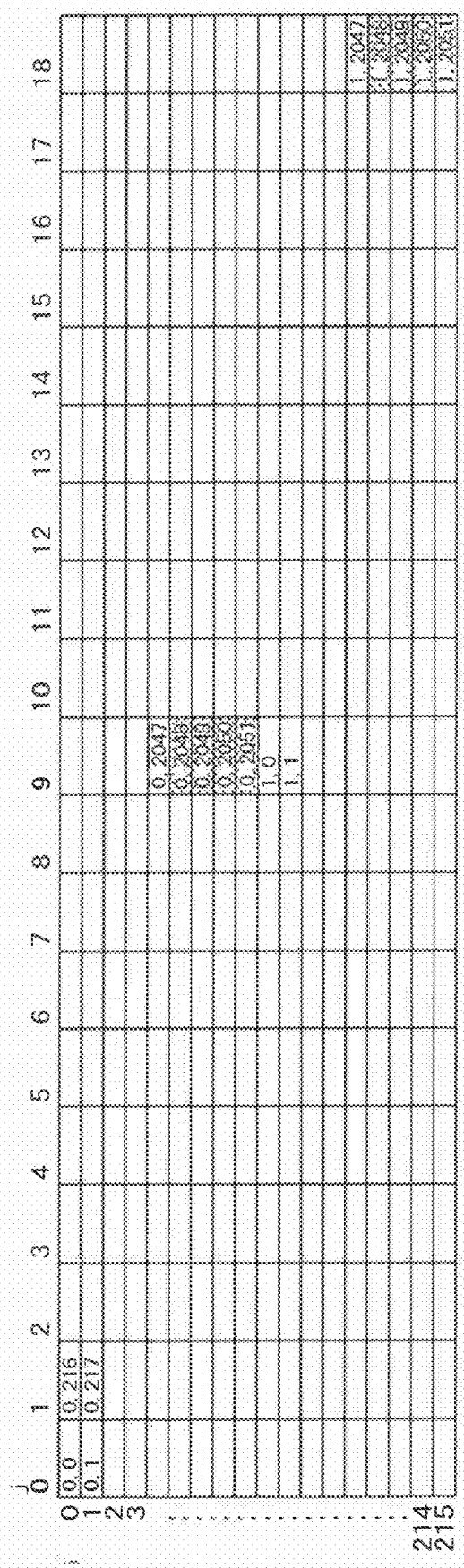

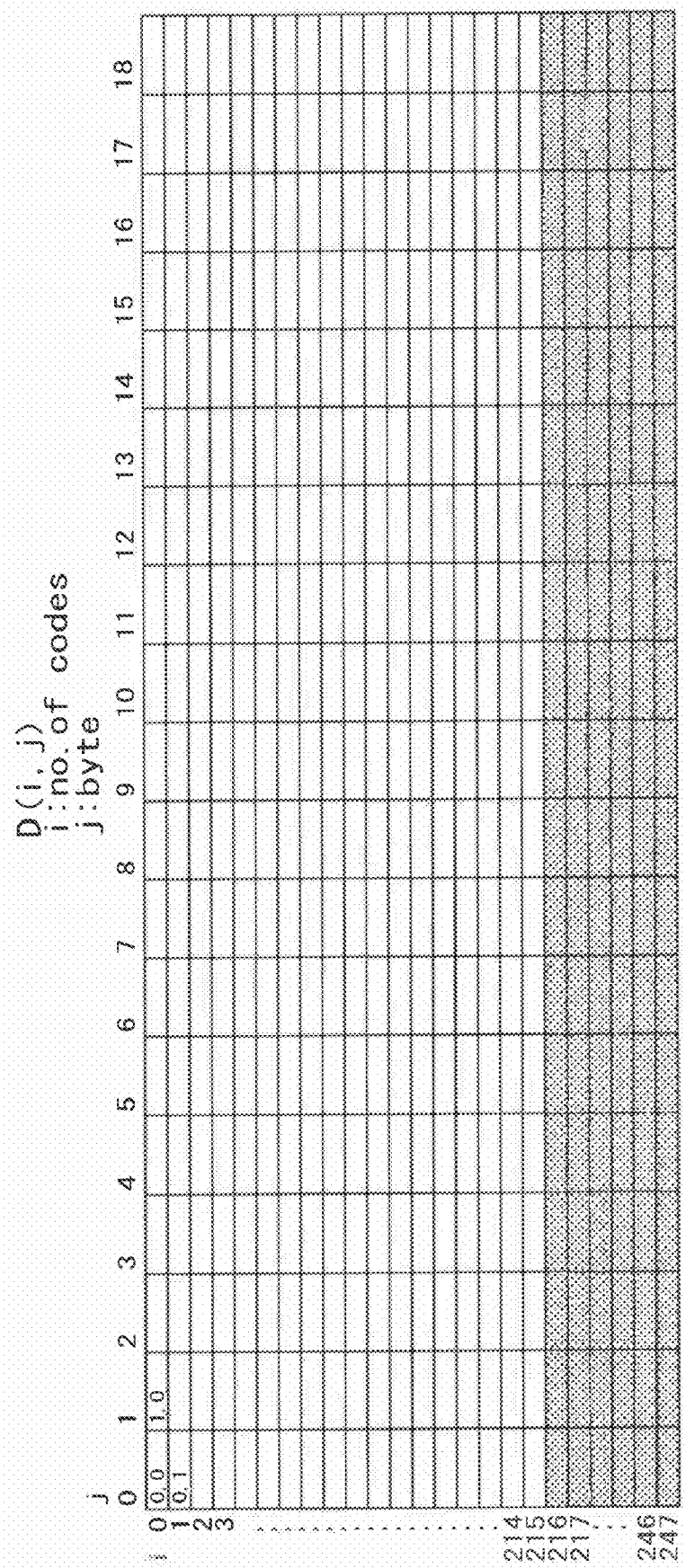

F I G. 2 1 b(s, t, u)
s: AUN
t: frame
u: byte

FIG. 22A

ECC
BIS Cluster

Address Fields

{ An-0~3: 4B AUN
  An-4: 3LSb address field number
  An-5~8: 4B Parity }

9 byte × 8 address field
8 address field

| | #0 | #1 | #2 | #3 | #4 | #5 | #6 | #7 |
|---|---|---|---|---|---|---|---|---|
| 0 | 0,0 | 1,0 | 2,0 | 3,0 | 4,0 | 5,0 | 6,0 | 7,0 |
| 1 | 0,1 | 1,1 | 2,1 | 3,1 | 4,1 | 5,1 | 6,1 | 7,1 |
| 2 | 0,2 | 1,2 | 2,2 | 3,2 | 4,2 | 5,2 | 6,2 | 7,2 |
| 3 | 0,3 | 1,3 | 2,3 | 3,3 | 4,3 | 5,3 | 6,3 | 7,3 |
| 4 | 0,4 | 1,4 | 2,4 | 3,4 | 4,4 | 5,4 | 6,4 | 7,4 |
| 5 | 0,5 | 1,5 | 2,5 | 3,5 | 4,5 | 5,5 | 6,5 | 7,5 |
| 6 | 0,6 | 1,6 | 2,6 | 3,6 | 4,6 | 5,6 | 6,6 | 7,6 |
| 7 | 0,7 | 1,7 | 2,7 | 3,7 | 4,7 | 5,7 | 6,7 | 7,7 |
| 8 | 0,8 | 1,8 | 2,8 | 3,8 | 4,8 | 5,8 | 6,8 | 7,8 |

9 byte

FIG. 22B

Pre recorded data units  24 byte × 2 units 2 unit

| | #0 | #1 |
|---|---|---|
| 0 | 0,0 | 1,0 |
| 1 | 0,1 | 1,1 |
| 2 | 0,2 | 1,2 |
| 3 | 0,3 | 1,3 |
| ⋮ | ⋮ | ⋮ |
| 23 | 0,23 | 1,23 |

24 byte

B(i, j)
i: no. of codes
j: byte

Information

Parity

FIG. 25 b(s, t, u)
s: AUN
t: frame
u: byte

| i \ j | 0 | 1 | 2 | 3 |
|---|---|---|---|---|
| 0 | 0,0,0 | 3,0,0 | 2,0,0 | 1,0,0 |
| 1 | 4,0,0 | | | |
| 2 | 1,1,0 | 0,1,0 | 3,1,0 | 2,1,0 |
| 3 | | 4,1,0 | | |
| 4 | 2,2,0 | 1,2,0 | 0,2,0 | 3,2,0 |
| 5 | | | 4,2,0 | |
| 6 | 3,3,0 | 2,3,0 | 1,3,0 | 0,3,0 |
| 7 | | | | 4,3,0 |
| 8 | | | | 1,4,0 |
| 9 | 0,4,0 | | | |
| 10 | 1,5,0 | 0,5,0 | | |
| 11 | | | | |
| 12 | | 1,6,0 | 0,6,0 | |
| 13 | | | | |
| 14 | | | 1,7,0 | 0,7,0 |
| 15 | | | | |
| 16 | 0,8,0 | | | 1,8,0 |
| 17 | | | | |
| 18 | | 0,9,0 | | |
| 19 | | | | |
| 20 | | | 0,10,0 | |
| 21 | | | | |
| 22 | | | | 0,11,0 |
| 23 | | | | |
| 24 | 0,12,0 | | | |
| 25 | | | | |
| 26 | | 0,13,0 | | |
| 27 | | | | |
| 28 | | | 0,14,0 | |
| 29 | | | | |
| 30 | | | | 0,15,0 |
| 31 | | | | |
| 32 | 0,16,0 | | | |
| 33 | | | | |
| 34 | | 0,17,0 | | |
| 35 | | | | |
| 36 | | | 0,18,0 | |
| 37 | | | | |
| 38 | | | | 0,19,0 |
| 39 | | | | |
| 40 | 0,20,0 | | | |
| 41 | | | | |
| 42 | | 0,21,0 | | |
| 43 | | | | |
| 44 | | | 0,22,0 | |
| 45 | | | | |
| 46 | | | | 0,23,0 |
| 47 | | | | |
| 48 | 0,24,0 | | | |
| 49 | | | | |
| 50 | | 0,25,0 | | |
| 51 | | | | |
| 52 | | | 0,26,0 | |
| 53 | | | | |
| 54 | | | | 0,27,0 |
| 55 | 7,27,0 | | | |
| 56 | 0,28,0 | | | |
| 57 | | 7,28,0 | | |
| 58 | | 7,29,0 | | |
| 59 | | | 7,29,0 | |
| 60 | 2,30,0 | 1,30,0 | 0,30,0 | 3,30,0 |
| 61 | | | | 7,30,0 |

FIG. 30

Frame sync

FS:71D FS, 16 channel bits

| sync number | data | sync body | Sync ID data | Sync ID data bit | parity bit | Sync ID |
|---|---|---|---|---|---|---|
| FS0 | 1×  | 11001001 | 10101010 | 000 | 0 |
| FS1 | 1×  | 11001001 | 10101111 | 001 | 1 |
| FS2 | 1×  | 11001001 | 10111011 | 010 | 1 |
| FS3 | 1×  | 11001001 | 1011110 | 011 | 0 |
| FS4 | 1×  | 11001001 | 1101011 | 100 | 1 |
| FS5 | 1×  | 11001001 | 1101110 | 101 | 0 |
| FS6 | 1×  | 11001001 | 1111010 | 110 | 0 |

FS code are converted to NRZI

F I G. 31

| Frame number | Frame sync | Frame number | Frame sync |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

DISC RECORDING MEDIUM, DISC DRIVE APPARATUS, AND REPRODUCTION METHOD

CROSS-REFERENCE TO RELATED APPLICATIONS

This application is a continuation of and is based upon and claims the benefit of priority under 35 U.S.C. §120 for U.S. Ser. No. 10/267,806, filed Oct. 9, 2002, and claims the benefit of priority under 35 U.S.C. §119 from Japanese Patent Application No. 2001-313819, filed Oct. 11, 2001, the entire contents of each which are incorporated herein by reference.

BACKGROUND OF THE INVENTION

The present invention relates to a disc recording medium such as an optical disc, a disc-manufacturing method for manufacturing the disc recording medium, a disc drive apparatus for driving the disc recording medium, and a reproduction method for reproducing data from the disc recording medium. More particularly, the present invention relates to a disc on which tracks are each wobbled as a pregroove.

As a technology of recording and reproducing digital data, there has been developed a technology of recording data used in recording media onto optical discs including magneto-optical discs. An optical disc can be designed as a CD (Compact Disc), an MD (Mini-Disc), or a DVD (Digital Versatile Disc). The optical disc is a generic name of a disc-like metallic thin plate serving as recording media from which data is read out as changes in reflected laser beam resulting from reflection of a laser beam radiated to the recording media.

To put it in more detail, an optical disc can be of a read-only type or a writable type allowing user data to be written onto the disc. Reproduction-only optical discs include a CD, a CD-ROM, and a DVD-ROM. On the other hand, writable optical discs include an MD, a CD-R, a CD-RW, a DVD-R, a DVD-RW, a DVD+RW, and a DVD-RAM. Data is recorded onto a writable disc by adopting, among other techniques, a magneto-optical recording technique, a phase-change recording technique, and a dye-film-change recording technique. The dye-film-change recording technique is also referred to as a write-once recording technique whereby data can be recorded onto the optical disc only once, and once data has been recorded onto a disc, data can no longer be recorded onto the same disc. Thus, the dye-film-change recording technique is suitable for a recording operation to save data. On the other hand, the magneto-optical recording technique and the phase-change recording technique are adopted in a variety of applications including operations to record various kinds of content data such as musical data, video data, games, and application programs.

In order to record data onto a disc to which the magneto-optical recording technique, the phase-change recording technique, and the dye-film-change recording technique are applicable, a guiding means for tracking a data track is required. For this reason, grooves are created in advance as pregrooves. The grooves and lands are used as data tracks. A land is a plateau-like member sandwiched by two adjacent grooves.

In addition, it is also necessary to record address information so that data can be recorded at any predetermined position on a data track. In some cases, however, the address information is recorded by wobbling the grooves.

Assume that a track for recording data is created in advance as a pregroove. In this case, the side walls of the pregroove each have a wobbled shape representing address information. By having such a pregroove, an address can be fetched from wobbling information obtained in recording and reproduction operations as information conveyed by a reflected beam. Thus, data can be recorded onto or reproduced from a desired location without creating for example pit data showing addresses in advance.

By adding address information as a groove wobbling shape in this way, it is no longer necessary to provide for example discrete address areas on the track and record addresses in the address areas typically as pit data. Thus, portions for the address areas can be used for storing actual data so that the storage capacity can be increased.

It is to be noted that absolute-time information and address information, which are each expressed by the groove wobbling shape as such, are referred to as an ATIP (Absolute Time In Pregroove) and an ADIP (Address In Pregroove) respectively.

By the way, in the case of a rewritable disc in particular, there may be a situation in which the manufacturer wants to ship a disc containing various kinds of shipping-time information recorded onto the disc in advance. The shipping-time information of a disc is prerecorded information recorded onto the disc in advance prior to the shipping of the disc.

Typically, the shipping-time information includes disc information and system information. The disc information typically includes a recording linear velocity and a laser-power recommended value. On the other hand, the system information shows how to exclude an apparatus of a hacker.

The shipping-time information must be reliable, must have a large size to a certain degree, and must not be falsified.

If the shipping-time information is not reliable, that is, if the disc information included in the shipping-time information is not accurate, for example, there may be raised a problem such as inability to obtain a proper recording condition in the apparatus on the user side.

In an operation to record content data, the data may be encrypted for protection of a copyright. If a key used for encryption is not obtained accurately from the system information, the encrypted data cannot be decrypted so that the content cannot be utilized. This is also because the content data cannot be encrypted in an operation to record the data.

For the reasons described above, disc information and system information, which are recorded as shipping-time information, are required to have reliability higher than recorded and reproduced user data.

The shipping-time information has a large size to a certain degree because of the following reasons.

Consider a case in which the master key of the system needs to be updated because the key is leaked to a hacker. In this case, the type of system (or product) or the like may be used as a unit of exclusion of a hacker apparatus. Thus, in order to update the master key, a large amount of information to a certain degree is required as a bundle of key information for identifying the master key for each unit. For this reason, the system information inevitably has a comparatively large size.

In addition, even if the possibility of existence of a defect such as an injury or dirt on a disc is taken into consideration, it is important to read out the shipping-time information with a high degree of accuracy from the reliability point of view. For this reason, disc information and system information are stored repeatedly. That is to say, the same data is recorded a plurality of times. Naturally, the amount of the shipping-time information cannot but increase.

Falsification of information must be avoided because, if the system information used for excluding an apparatus of a hacker as described above is not prevented from being falsified, the system information does not have a meaning. The function of the system information cannot be executed unless falsification of the system information is avoided effectively.

It is important for the shipping-time information as a prerecorded information to satisfy the above requirements. A recording technique suitable for the shipping-time information is also demanded.

It is to be noted that, as a method for prerecording the shipping-time information onto a disc, a technique of creating embossed pits on the disc is known.

If operations to record and reproduce high-density data onto and from an optical disc are taken into consideration, however, the embossed-pit-prerecording technique has problems.

For operations to record and reproduce high-density data onto and from an optical disc, a groove with a small depth is required. In the case of a disc manufactured by creation of grooves and embossed pits at the same time by using a stamper, it is extremely difficult to form the grooves and the embossed pits with the depth of the grooves made different from the depth of the embossed pits. Thus, the depth of the grooves and the depth of the embossed pits cannot help becoming equal to each other.

However, embossed pits with a small depth raises a problem that a signal having a high quality cannot be obtained from the embossed pits.

Assume for example that data having an amount of 23 GB (Giga Bytes) can be recorded onto and reproduced from an optical disc with a diameter of 12 cm and a cover (substrate) thickness of 0.1 mm through an optical system employing a laser diode generating a laser having a wavelength of 405 nm and an objective lens with an NA of 0.85 by recording and reproducing phase change marks at a track pitch of 0.32 $\mu m$ and a linear density of 0.12 $\mu m/bit$.

In this case, the phase change marks are recorded onto and reproduced from a groove created to have a spiral shape on the disc. In order to suppress media noises caused by the high density of the phase change marks, it is desirable to create a groove with a depth of about 20 nm of a depth in the range $\lambda/13$ to $\lambda/12$ where notation $\lambda$ denotes a wavelength.

In order to obtain a signal from embossed pits having a high quality, on the other hand, it is desirable to create a groove with a depth in the range $\lambda/8$ to $\lambda/4$. After all, it is impossible to get a good solution to the problem of providing the same depth to the groove and the embossed pits.

From this situation, there has been demanded a method of prerecording shipping-time information, which compensates embossed pits.

SUMMARY OF THE INVENTION

It is thus an object of the present invention addressing the problems described above to provide a new disc recording medium using an appropriate prerecording technique to increase the storage capacity of the disc recording medium and to improve the recording and reproduction performance of the disc recording medium, provide a disc-manufacturing method for manufacturing the disc, provide a disc drive apparatus for driving the disc recording medium as well as a reproduction method of reproducing data from the disc recording medium.

In order to achieve the object described above, the present invention provides a disc recording medium including:

a recording/reproduction area, which first data can be recorded onto and reproduced from by adoption of a rewriting-capable recording technique and already recorded second data and, which second data remains recorded into and reproduced from by adoption of a groove-wobbling technique; and a reproduction-only area only allowing third data recorded therein by adoption of the groove-wobbling technique to be reproduced, wherein:

the first data is recorded by adoption of a first modulation technique and has a first error-correction block structure;

the second data is recorded by adoption of a second modulation technique; and the third data is recorded by adoption of a third modulation technique and has a second error-correction block structure based on the same correction codes as those of the first error-correction block structure.

The first error-correction block includes a first frame structure, a first sub-block structure including first error correction codes and a second sub-block structure including second error correction codes. On the other hand, the second error-correction block includes a second frame structure, a third sub-block structure including first error correction codes and a fourth sub-block structure including second error correction codes.

In addition, the second data and the third data are recorded along a wobbling groove created in advance. The rewriting-capable recording technique adopted for recording the first data is a recording technique of recording phase change marks onto a track implemented as the wobbling groove described above.

As an alternative, the second data and the third data are recorded along a wobbling groove created in advance whereas the rewriting-capable recording technique adopted for recording the first data is a recording technique of recording magneto-optical marks onto a track implemented as the wobbling groove described above.

In addition, the third data recorded onto the reproduction-only area includes address information.

Furthermore, the recording density of the third data is made less dense than the recording density of the first data, and the number of correction codes in the first error-correction block is set at a multiple of m whereas the number of correction codes in the second error-correction block is set at n/m times the number of correction codes in the first error-correction block so that a data-piece count in the second error-correction block is also n/m times a data-piece count in the first error-correction block where notations n and m each denote a positive integer.

Moreover, the recording density of the third data is made less dense than the recording density of the first data, and the number of first correction codes composing a first sub-block is set at a multiple of m whereas the number of first correction codes composing a third sub-block is set at n/m times the number of correction codes composing the first sub-block so that a data-piece count in the third sub-block is also n/m times a data-piece count in the first sub-block where notations n and m each denote a positive integer.

In addition, the number of second correction codes composing a second sub-block is set at a multiple of p, whereas the number of second correction codes composing a fourth sub-block is set at q/p times the number of correction codes composing the second sub-block so that a data-piece count in the fourth sub-block is also q/p times a data-piece count in second sub-block where notations p and q each denote a positive integer.

In these cases, the integer m is a power of 2 and the integer n is 1.

Furthermore, the block lengths of the first error-correction block and the second error-correction block are each set at such a value that the block can be recorded in a circle of the track on the disc.

Moreover, the number of frames in the first error-correction block and the number of frames in the second error-correction block are each set at a value at least about equal to a data-piece count in the error correction codes.

In addition, the number of frames in the first error-correction block and the number of frames in the second error-correction block can also each be set at a value at least about equal to the sum of the number of first correction code words and the number of second correction code words.

Furthermore, the second frame includes a synchronization signal in data's portion corresponding to the third sub-block. The second frame also includes an address unit number in the data's portion corresponding to the fourth sub-block.

In addition, a frame for linking is added to the first error-correction block as well as to the second error-correction block.

As an alternative, a frame for linking is added to the first error-correction block but no frame for linking is added to the second error-correction block.

The first modulation technique described above is an RLL (1, 7) PP technique, the second modulation technique is an MSK modulation technique and the third modulation technique is a bi-phase modulation technique.

In addition, the first modulation technique can be the same as the third modulation technique. In this case, the first and third modulation techniques are both the RLL (1, 7) PP technique whereas the second modulation technique is the MSK modulation technique.

The present invention also provides a disc drive apparatus for recording data and reproducing data from a disc recording medium including:

a recording/reproduction area, which first data can be recorded onto and reproduced from by adoption of a rewriting-capable or write-once recording technique and, which second data remain recorded second into and reproduced from by adoption of a groove-wobbling technique; and a reproduction-only area only allowing third data recorded therein by adoption of the groove-wobbling technique to be reproduced, wherein:

the first data is recorded by adoption of a first modulation technique and has a first error-correction block structure;

the second data is recorded by adoption of a second modulation technique; and the third data is recorded by adoption of a third modulation technique and has a second error-correction block structure based on the same correction codes as those of the first error-correction block structure.

Furthermore, the disc drive apparatus has:

head means for radiating a laser beam to a track created as the groove and receiving a reflected beam signal;

wobbling extraction means for extracting a signal representing the wobbling shape of the track from the reflected beam signal;

first data-signal extraction means for extracting a signal representing the first data from the reflected beam signal;

second data demodulation means for demodulating the signal representing the wobbling shape of the track in a reproduction operation carried out on the recording/reproduction area by the second modulation technique;

first data demodulation means for demodulating the signal representing the first data in a reproduction operation carried out on the recording/reproduction area by the first modulation technique;

third data demodulation means for demodulating, in a reproduction operation carried out on the reproduction-only area, the signal representing the wobbling shape of the track by the third modulation technique;

error correction means for carrying out error-correction processing based on the error-correction codes on a modulation result output by the first data demodulation means and a modulation result output by the third data demodulation means; and control means for driving the second data demodulation means to carry out demodulation processing in a recording/reproduction operation performed on the recording/reproduction area, requesting the error correction means to carry out error-correction processing based on the first error correction block in a recording/reproduction operation performed on the recording/reproduction area, driving the third data demodulation means to carry out demodulation processing in a reproduction operation performed on the reproduction-only area, requesting the error correction means to carry out error-correction processing based on the second error correction block in a reproduction operation performed on the reproduction-only area.

In addition, the error correction means is capable of encoding and decoding the first error correction block including a first frame structure, a first sub-block structure composed of first correction codes and a second sub-block structure composed of second correction codes, and capable of decoding the second error correction block including a second frame structure, a third sub-block structure composed of first correction codes and a fourth sub-block structure composed of second correction codes.

Moreover, the control means drives the head means to make an access to the recording/reproduction area at a location indicated by address information extracted as the second data and drives the head means to make an access to the reproduction-only area at a location indicated by address information included in the third data.

In addition, the error-correction means carries out error correction processing by setting the number of correction codes composing the first error correction block at a multiple of m and the number of correction codes composing the second error correction block at n/m times the number of correction codes composing the first error-correction block where notations n and m each denote a positive integer.

Furthermore, the error-correction means carries out error correction processing by setting the number of first correction codes composing the first error correction block at a multiple of m, the number of first correction codes composing the third error correction block at n/m times the number of correction codes composing the first error-correction block where notations n and m each denote a positive integer, the number of second correction codes composing the second error correction block at a multiple of p and the number of second correction codes composing the fourth error correction block at q/p times the number of correction codes composing the second error-correction block where notations p and q each denote a positive integer.

In these cases, the integer m is a power of 2 and the integer n is 1.

In addition, the demodulation processing is carried out by assuming that the first modulation technique described above is an RLL (1, 7) PP technique, the second modulation technique is an MSK modulation technique and the third modulation technique is a bi-phase modulation technique.

As an alternative, required demodulation processing is carried out by assuming that the first modulation technique is the same as the third modulation technique.

As another alternative, demodulation processing is carried out by assuming that the first and third modulation techniques are both the RLL (1, 7) PP technique whereas the second modulation technique is an MSK modulation technique.

The present invention also provides a reproduction method for reproducing data from a disc recording medium including:

a recording/reproduction area, which first data to be recorded onto and reproduced from by adoption of a rewriting-capable or write-once recording technique and, which second data remains recorded into and reproduced from by adoption of a groove-wobbling technique; and a reproduction-only area only allowing third data recorded by adoption of the groove-wobbling technique to be reproduced, wherein:

the first data is recorded by adoption of a first modulation technique and has a first error-correction block structure;

the second data is recorded by adoption of a second modulation technique; and the third data is recorded by adoption of a third modulation technique and has a second error-correction block structure based on the same correction codes as those of the first error-correction block structure.

Furthermore, for a reproduction operation carried out on the recording/reproduction area, the reproduction method is further provided with the steps of:

radiating a laser beam to a track created as the groove and receiving a reflected beam signal;

extracting a signal representing the wobbling shape of the track and a signal representing the first data from the reflected beam signal;

demodulating the extracted signal representing the wobbling shape of the track by the second modulation technique and carrying a decoding process to produce address information;

demodulating the extracted signal representing the first data by adoption of a demodulation technique corresponding to the first modulation technique used for modulating the signal representing the first data; and carrying out error-correction processing based on the error-correction codes of the first error correction block to reproduce the first data.

In addition, for a reproduction operation carried out on the reproduction-only area, the reproduction method is further provided with the steps of:

radiating a laser beam to the track created as the groove and receiving a reflected beam signal;

extracting a signal representing the wobbling shape of the track from the reflected beam signal;

demodulating the extracted signal representing the wobbling shape of the track by the third modulation technique; and carrying out error-correction processing based on the error-correction codes of the second error correction block to reproduce the third data.

In addition, for a reproduction operation carried out on the recording/reproduction area, the reproduction method is further provided with the step of carrying out error correction processing based on the first error correction block including a first frame structure, a first sub-block structure composed of first correction codes and a second sub-block structure composed of second correction codes whereas, for a reproduction operation carried out on the reproduction-only area, the reproduction method is further provided with the step of carrying out error correction processing based on the second error correction block including a second frame structure, a third sub-block structure composed of first correction codes and a fourth sub-block structure composed of second correction codes.

Moreover, for a reproduction operation carried out on the recording/reproduction area, the reproduction method is further provided with the step of making an access to the recording/reproduction area at a location indicated by address information extracted as the second data and, for a reproduction operation carried out on the reproduction-only area, the reproduction method is further provided with the step of making an access to the reproduction-only area at a location indicated by address information included in the third data.

In addition, in the error correction processing, the number of correction codes composing the first error correction block is set at a multiple of m and the number of correction codes composing the second error correction block is set at n/m times the number of correction codes composing the first error-correction block where notations n and m each denote a positive integer.

Furthermore, in the error correction processing, the number of first correction codes composing the first error correction block is set at a multiple of m, the number of first correction codes composing the third error correction block is set at n/m times the number of correction codes composing the first error-correction block where notations n and m each denote a positive integer, the number of second correction codes composing the second error correction block is set at a multiple of p and the number of second correction codes composing the fourth error correction block is set at q/p times the number of correction codes composing the second error-correction block where notations p and q each denote a positive integer.

In these cases, the integer m is a power of 2 and the integer n is 1.

In addition, the demodulation processing is carried out by assuming that the first modulation technique described above is an RLL (1, 7) PP technique, the second modulation technique is an MSK modulation technique and the third modulation technique is a bi-phase modulation technique.

As an alternative, required demodulation processing is carried out by assuming that the first modulation technique is the same as the third modulation technique.

As another alternative, demodulation processing is carried out by assuming that the first and third modulation techniques are both the RLL (1, 7) PP technique whereas the second modulation technique is an MSK modulation technique.

In accordance with the present invention, on a disc of the write-once-storage-capacity type or a disc of the rewritable type, shipping-time information (prerecorded information) is recorded as the third data by wobbling a groove. In processing to store the prerecorded data, the recording density (and the recording technique as well as the modulation technique) are made less dense. In addition, error correction codes are used by adoption of the same technique as that for write-once-type data or rewritable-type data, which is handled as the first data. The amount of data per error correction block is also reduced to, for example, 1/m.

As a technique to record the first data (or user data) onto the recording/reproduction area, there is provided a phase-change recording technique or a magneto-optical recording technique.

If the labor required at a disc-shipping time and the cost are to be taken into consideration, treatment as reproduction-only data created by using a stamper is desirable since, in this case, it is not necessary to record data of the shipping-time information as third data.

In addition, in a process to record pre-address information (ADIP) as the second data, the groove is wobbled by using no pits. Thus, in the case of a recorded disc of the write-once/rewritable type, pits are also not used in the shipping-time information so that a recording process carried out by wobbling the groove is desirable.

The shipping-time information recorded as the third data has a necessary property different from that of the pre-address information used as the second data.

That is to say, for the pre-address information recorded as the second data, the recording density may be low and a low error rate that can be assured by interpolative protection or the like is acceptable. In addition, if the second data is recorded in the recording/reproduction area as a groove wobbling shape, the first data is superposed on the track implemented by the groove.

On the other hand, the shipping-time information can be recorded as the third data at a recording density lower than that for the first data. If the read time is to be taken into consideration, however, a recording density about the same as that of the second data (that is, the pre-address information) will not work. In addition, an error rate not exceeding that of the first data is demanded. Furthermore, since the reproduction-only area for storing the shipping-time information is an area created by using a stamper, that is, an area containing data recorded as a groove wobbling shape, address information can be included in the shipping-time information so that superposition on the pre-address information is not required.

It is thus possible to have a modulation technique for the third data (that is, the shipping-time information) different from that for the second data (or the ADIP).

Consider a case in which the third data is recorded by wobbling a groove. In a recording process carried out by wobbling a groove, in general, the wobbling amplitude is small and the S/N (Signal-to-Noise) ratio of the signal is poor.

For this reason, in order to assure reliability of the third data (or the shipping-time information), it is important to reduce the recording density to a value much smaller than that of the first data.

In addition, the first data includes a relatively large error correction block (or strictly speaking, a relatively large first error correction block) including error correction codes, which are great in number from the error-correction-ability and redundancy points of view, and completing a deep interleaving process. By taking effects of dust and injuries on the disc into consideration, however, the length of the first error correction block is set as large a value as possible provided that the value is within such a range that the block can be recorded without exceeding a circle of the track.

Also in an attempt to reduce the recording density of the third data, the third data is considered in the same way as the first data. That is to say, the second error correction block length of the third data is set at such a value that the block can be recorded without exceeding a circle of the track.

In addition, in an attempt to reduce the recording density of the third data, the first error correction block length of the first data is set at a value different from the second error correction block length of the third data.

Furthermore, the error correction codes of the third data are made the same as the numerous error correction codes of the first data, which are great in number from the error-correction-ability and redundancy points of view.

Since it is undesirable to apply as many error correction codes as pieces of data in the frame associated with the error correction codes, the data-piece count in a frame is made about equal to or smaller than the number of interleaves, that is, the number of codes.

Thus, as the size of the first error correction block is made different from the size of the second error correction block, the frame structure changes.

In the case of the first data, the first error correction block includes m error correction codes. When the sizes of the error correction blocks for the first data and the third data are changed to accompany reduction of the recording density of the third data, the second error correction block for the third data is constructed from n/m error correction codes.

In this case, it is desirable to set an effective-data-piece count of the first error correction block at a multiple of a power of 2 such as a multiple of 2,048 bytes.

In addition, it is also desirable to set an effective-data-piece count of the second error correction block for the third data at a multiple of a power of 2 such as a multiple of 2,048 bytes.

If an EDC (Error Detection Code) or the like is added, the effective-data-piece count may become a value different from a power of 2 in some cases. In order to have both an effective-data-piece count of the first error correction block and an effective-data-piece count of the second error correction block equal to a multiple of a power of 2, it is necessary to set the value of m at a power of 2 as well.

Furthermore, if both the effective-data-piece count of the first error correction block and the effective-data-piece count of the second error correction block are equal to a power of 2, that is, if n=1, accesses to data can be made with ease.

If the frame structure of the third data (that is, the shipping-time information) is changed to the frame structure of the first data (that is, the user data), the way to insert a synchronization signal, a DC control signal (or the so-called dcc) and the like also changes as well.

In the case of the third data, it is not necessary to consider superposition of the second data (that is, the pre-address information) as is the case with the first data. In addition, a recording density as high as that of the first data is also not required. For these reasons, a simple modulation method can be adopted as the modulation technique of the third data.

If the conditions described above do not exist, on the other hand, the same modulation method as that of the first data can be adopted as the modulation technique of the third data.

Since the third data recorded as a groove wobbling shape is formed in advance by using a stamper, address information can be recorded too at the same time so that the disc drive apparatus is capable of making an access by using the address information.

In this case, a sync pattern and a sync ID are provided on a portion of the frame of the third data while an address unit number is provided on a certain portion of the frame.

Since pre-address information is recorded in the recording/reproduction area in advance as the second data, an access can actually be made even if only a minimum sync pattern exists. Nevertheless, the sync pattern, the sync ID and the address unit number do not cause a problem even if they are provided.

In addition, since the first data is data to be rewritten, frames typically referred to as run-in and run-out frames are required respectively in front of and behind a cluster serving as a rewrite unit. The run-in and run-out frames are used for linking. For example, the run-in frame in front of a specific cluster includes an APC operation area for laser power control, a VFO pattern for PLL leading-in, a sync pattern for synchronization leading-in and a gap area between the specific cluster and a cluster immediately preceding the specific cluster. On the other hand, the run-out frame typically includes a post-amble pattern and a gap area.

Since no other data is recorded onto the reproduction-only area, which is used for recording the third data, however, the APC area, the gap area and the like are not required. In addition, since a data series including synchronization information and address information is created contiguously by using a stamper, the VFO pattern for PLL leading-in is also not required either. Thus, even without the run-in frame, frame synchronization, synchronization based on frame numbers and even address synchronization can be established.

In addition, since the following cluster also starts immediately, the data series is continuous and a post-amble, that is, a run-out frame, is not required either.

Thus, in the case of the third data recorded in the reproduction-only area, the linking frames known as the run-in and run-out frames can be eliminated.

As is comprehensible from the description described above, in accordance with the present invention, with a recording technique, a modulation technique and a recording density optimumly applied to the first data, the second data and the third data as they are, it is possible to implement a write-once-type or rewritable-type disc having a large capacity for recording user data as the first data and properly record shipping-time information serving as third data.

That is to say, the present invention exhibits an effect that it is possible to record a proper amount of third data serving as prerecorded information or the shipping-time information that cannot be falsified by at sustained high reliability.

In addition, in the case of the disc provided by the invention, the effect on devices and circuits employed in the disc drive apparatus is small so that a simple configuration can be realized without incurring an increase in cost.

To put it in detail, the present invention exhibits the following effects.

The first data and the third data share the same error correction codes. Thus, the first data and the third data can be subjected to an ECC process carried out by common hardware allowing the cost of the disc drive apparatus to be lowered and the configuration of the apparatus to be simplified.

Furthermore, the first data has a first error correction block structure while the third data has a second error correction block structure. That is to say, the first data and the third data have their respective proper error correction block structures.

In particular, the recording density of the third data is made less dense than the recording density of the first data, and the number of correction codes in the first error-correction block is set at a multiple of m, whereas the number of correction codes in the second error-correction block is set at n/m times the number of correction codes in the first error-correction block, and the number of data in the second error-correction block is set at n/m times the number of data in the first error-correction block, so that not only do the first data and the third data have their respective proper error correction block structures, but the error correction structures are also amenable to error correction processing.

Moreover, even if the first error-correction block includes a first frame structure, a first sub-block structure including first error correction codes such as LDC and a second sub-block structure including second error correction codes such as BIS while the second error-correction block includes a second frame structure, a third sub-block structure including first error correction codes such as LDC and a fourth sub-block structure including second error correction codes such as BIS, the first data and the third data share the same error correction codes, and in addition, the first data and the third data have their respective proper error correction blocks.

Particularly, in this case, the recording density of the third data is made less dense than the recording density of the first data, the number of first correction codes composing a first sub-block is set at a multiple of m whereas the number of first correction codes composing a third sub-block is set at n/m times the number of correction codes composing the first sub-block, and in addition, the number of second correction codes composing a second sub-block is set at a multiple of p, whereas the number of second correction codes composing a fourth sub-block is set at q/p times the number of correction codes composing the second sub-block so that not only do the first data and the third data have their respective proper error correction block structures, but the error correction structures are also amenable to error correction processing.

In these cases, the optimum values of the integers m and n are a power of two and one respectively.

Moreover, the reproduction-only area is used as an area for recording the third data by groove wobbling. It is thus no longer necessary to record the third data by using embossed pits. Then, since it is not necessary to create embossed pits, the depth of the groove can be reduced. The depth of the groove can be set at a value optimum for a high recording density without taking the reproduction characteristics of the embossed pits into consideration. Thus, it is possible to provide a groove proper for a high recording density.

In addition, in the disc drive apparatus, the third data can be reproduced by using the same wobble-channel reproduction system as the second data or the ADIP address information. Reproduction of the third data means extraction of information on the wobbling shape of the groove along which the third data is recorded.

Furthermore, since the recording density of the third data recorded as the wobbling shape of the groove can be made less dense than the recording density of the first data, the third data can be reproduced at a high quality even though its SNR is poor due to the fact that the third data is reproduced as a wobbling signal.

Moreover, the third data is recorded after completing a bi-phase modulation process such as the FM code modulation process. Thus, the signal can be treated as a narrow-band signal, allowing the SNR to be improved. In addition, the PLL and detection circuits can each be designed as simple hardware.

As an alternative, the third data is modulated by adoption of the same technique as the first data. Even in this case, a common demodulation circuit configuration can be shared between the first data and the third data so that the disc drive apparatus can be simplified.

Furthermore, the third data includes address information. Thus, the disc drive apparatus is capable of properly making accesses to the reproduction-only area and appropriately carrying out operations to reproduce data from the reproduction-only area on the basis of the addresses included in the third data.

BRIEF DESCRIPTION OF THE DRAWINGS

FIGS. 3A and 3B are explanatory diagrams each showing a wobbling technique adopted for a groove created on the disc implemented by the embodiment;

FIG. 4 is an explanatory diagram showing ECC block and data frames structures recorded as phase change marks in the embodiment;

FIGS. 5A to 5D are explanatory diagrams showing ECC block structures recorded as phase change marks in the embodiment;

FIGS. 7A to 7C are explanatory diagrams showing a technique of modulating ADIP information in the embodiment;

FIGS. 8A and 8B are explanatory diagrams showing of address blocks in a RUB in the embodiment;

FIGS. 10A to 10E are explanatory diagrams showing sync bit patterns in the embodiment;

FIGS. 12A to 12C are explanatory diagrams showing ADIP bit patterns in the embodiment;

FIG. 13 is an explanatory diagram showing the ECC structure of ADIP information in the embodiment;

FIGS. 14A to 14K are explanatory diagrams showing a method of modulating prerecorded information in the embodiment;

FIGS. 16A to 16D are explanatory diagrams showing ECC block structures of prerecorded information in the embodiment;

FIG. 17 is an explanatory diagram showing the frame structure of a cluster of prerecorded information in the embodiment;

FIG. 19 is an explanatory diagram used for describing a process to convert a data series of an LDC sub-block in the embodiment;

FIG. 20 is an explanatory diagram used for describing a process to convert a data series of an LDC sub-block in the embodiment;

FIG. 21 is an explanatory diagram used for describing a process to convert a data series of an LDC sub-block in the embodiment;

FIGS. 22A and 22B are explanatory diagrams showing the configuration of a BIS sub-block in the embodiment;

FIG. 23 is an explanatory diagram used for describing a process to convert a data series of a BIS sub-block in the embodiment;

FIG. 24 is an explanatory diagram used for describing a process to convert a data series of a BIS sub-block in the embodiment;

FIG. 25 is an explanatory diagram used for describing a process to convert a data series of a BIS sub-block in the embodiment;

FIG. 30 is an explanatory diagram showing frame synchronizations of prerecorded information in the embodiment;

FIG. 31 is an explanatory diagram showing a layout of frame synchronizations of prerecorded information in the embodiment;

DETAILED DESCRIPTION OF THE PREFERRED EMBODIMENTS

Figure 1A:
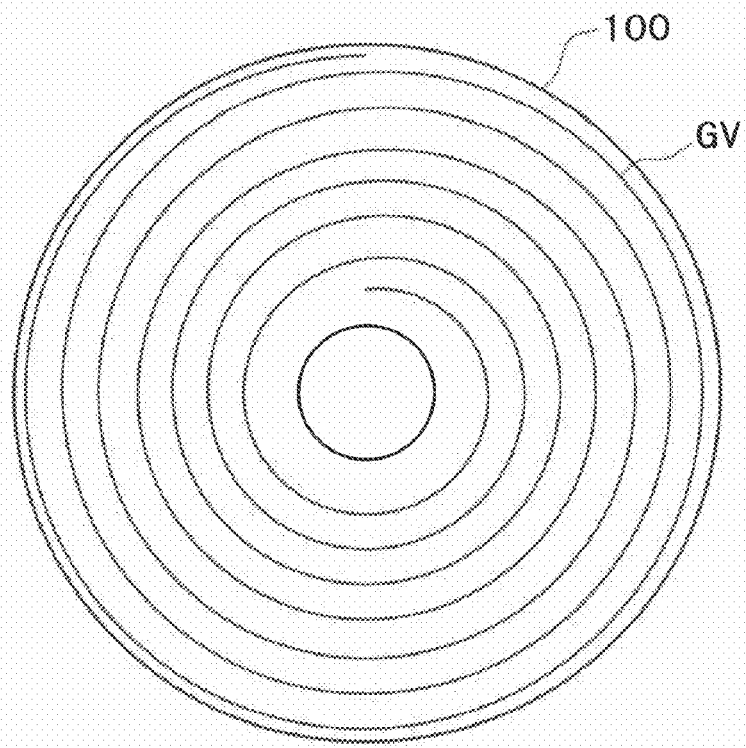
FIGS. 1A and 1B are explanatory diagrams each showing a groove created on a disc implemented by an embodiment of the present invention.

Next, an optical disc implemented by an embodiment of the present invention, a disc drive apparatus (or a recording/reproduction apparatus) for the optical disc, and a method of manufacturing the optical disc are explained in paragraphs arranged in an order shown below.

The optical disc implemented by the embodiment is known typically as a DVR (Data & Video Recording) disc and belongs to a category of discs developed in recent years.

1. Overview of an Embodiment Implementing a DVR Disc Provided by the Invention
2. Physical Characteristics of the Disc
3. ECC Block Structure of User Data
4. ADIP Addresses
5. Prerecorded Information (Shipping-Time Information)
6. Disc Drive Apparatus
7. Disc-Manufacturing Method
8. Modified Versions 1. Overview of an Embodiment Implementing a DVR Disc Provided by the Invention First of all, the following description shows how technical words used in claims of the present invention are associated with technical words used in explanation of an embodiment implementing a DVR system. It is needless to say that the meanings of the technical words used in the claims of the present invention are not limited to the meanings of the technical words used in the explanation of the embodiment.

First data used in claims corresponds to user data used in the explanation of the embodiment. The user data is main data serving as a principle object of recording and reproduction. The user data is recorded in a recording/reproduction area as phase change marks.

Second data used in claims corresponds to an ADIP used in the explanation of the embodiment. The ADIP is pre-address information recorded in the form of groove wobbling in a recording/reproduction area.

Third data used in claims corresponds to shipping-time information used in the explanation of the embodiment. The shipping-time information is prerecorded information recorded in the form of groove wobbling in the reproduction-only area.

A first modulation technique used in claims corresponds to an RLL (1, 7) PP technique used in the explanation of the embodiment.

A second modulation technique used in claims corresponds to an MSK modulation technique used in the explanation of the embodiment.

A third modulation technique used in claims corresponds to a bi-phase modulation technique used in the explanation of the embodiment.

A correction code used in claims corresponds to an LDC (Long Distance Code) and a BIS (Burst Indicating Sub code) used in the explanation of the embodiment.

A first correction code used in claims corresponds to the LDC (Long Distance Code).

A second correction code used in claims corresponds to the BIS.

An error correction block used in claims corresponds to an ECC block using LDC and BIS as described in the explanation of the embodiment.

First and Third sub-blocks used in claims correspond to an LDC sub-block used in the explanation of the embodiment.

Second and forth sub-blocks used in claims correspond to a BIS sub-block used in the explanation of the embodiment.

A data block of user data recorded in a DVR disc as phase-change marks includes a sub-block of actual data and a sub-block of user control data. By the actual data, the user data is meant. The user control data is addition & control information provided for the user data. Address information provided in data separately from the pre-address information referred to as the ADIP can also be included as part of the addition & control information.

In order to assure the ability to correct errors in the entire data block, error correction codes required for the sub-blocks are used. Details of this matter will be described later.

That is to say, for the user data, an LDC sub-block is created to include LDC each used as an error correction code. For the user control data, on the other hand, a BIS sub-block is created to include BIS each used as an error correction code.

A data frame is created to compress pieces of data for which an LDC sub-block and a BIS sub-block are created.

Since it is undesirable to apply as many error correction codes as pieces of data in a data frame for which LDC and BIS sub-blocks containing the error correction codes are created, the data-piece count in the data frame is made about equal to or smaller than a sum of interleave counts of the error correction codes or a sum of code counts.

By the same token, a data block of shipping-time information includes a sub-block of prerecorded data and a sub-block of prerecorded control data. The prerecorded data is actual data prerecorded as shipping-time information. On the other hand, the prerecorded control data is addition & control information prerecorded for the shipping-time information.

In order to assure the ability to correct errors in the entire data block, error correction codes required for the sub-blocks are used. That is to say, in this embodiment, for the actual data prerecorded as shipping-time information, an LDC sub-block is created to include LDC each used as an error correction code. For the prerecorded control data, on the other hand, a BIS sub-block is created to include BIS each used as an error correction code.

Also in the case of a block of the shipping-time information, a data frame is created to compress pieces of data for which an LDC sub-block and a BIS sub-block are created. In addition, the data-piece count in the data frame is made about equal to or smaller than a sum of interleave counts of the error correction codes or a sum of code counts.

In a few words, the sub-blocks of actual data share the same error correction codes, namely, the LDC, regardless of whether the actual data is user data or prerecorded data. On the other hand, the sub-blocks of addition & control information share the same error correction codes, namely, the BIS, without regard to whether the addition & control information is user control data or prerecorded control data.

In accordance with this technique, an actual-data sub-block in a block of user data includes m LDC error correction codes. In an attempt to make the size of a block of data prerecorded as shipping information different from the size of a block of user data to accompany reduction of the recording density of the data prerecorded as shipping-time information, an actual-data sub-block in a block of prerecorded data is created to include n/m LDC error correction codes.

In this case, it is desirable to set the effective data piece count of the actual-data sub-block in a block of user data at a multiple of a power of two such as 2,048 bytes.

Likewise, it is desirable to set the effective data piece count of the actual-data sub-block in a block of data prerecorded as the shipping-time information also at a multiple of a power of two such as 2,048 bytes.

If an EDC or the like is added, the effective data piece count may become equal to a value other than a power of two in some cases. Nevertheless, in order to have both the effective data piece count of the actual-data sub-block in a block of user data and the effective data piece count of the actual-data sub-block in a block of data prerecorded as the shipping-time information equal to a multiple of a power of two, it is necessary for the value of m to be equal to a power of two.

In addition, if both the effective data piece count of the actual-data sub-block in a block of user data and the effective data piece count of the actual-data sub-block in a block of data prerecorded as the shipping-time information are equal to a power of two, that is, n=1, an access to the data can be made with ease.

An addition & control-information sub-block in a block of user data constitutes p BIS error correction codes. In an attempt to change the size of a block of data prerecorded as shipping information and the size of a block of user data to accompany reduction of the recording density of the data prerecorded as shipping-time information, an actual-data sub-block in a block of data prerecorded as the shipping-time information is created to constitutes q/p BIS error correction codes.

Since the addition & control information is merely information provided for actual data, it not necessary to set the value of p at a power of two and q=1.

Since data is created in the reproduction-only area used for recording the shipping-time information by using a stamper, address information can be recorded at the same time as part of the shipping-time information. Thus, the disc drive apparatus is capable of making an access by using this address information.

An sync pattern and a sync ID are provided on a portion of the frame of the shipping-time information while an address unit number is provided on a certain portion of the frame.

To be more specific, in a DVR system, a sync pattern and a sync ID are provided in a portion of data corresponding to an actual-data sub-block in a frame of shipping-time information whereas an address unit number is provided in a portion of data corresponding to an addition & control sub-block in the frame of shipping-time information.

Since pre-address information (or an ADIP) is recorded in advance in the recording/reproduction area for recording user data, an access can actually be made even if only a minimum sync pattern exists. Nevertheless, the sync pattern, the sync ID, and the address unit number do not cause a problem even if they are provided.

In addition, for the user data, frames typically referred to as run-in and run-out frames are required respectively in front of and behind a cluster serving as a rewrite unit. The run-in and run-out frames are used for linking. The run-in frame in front of a specific cluster includes an APC operation area for laser power control, a VFO pattern for PLL leading-in, a sync pattern for synchronization leading-in, and a GAP area between the specific cluster and a cluster immediately preceding the specific cluster. On the other hand, the run-out frame typically includes a post-amble pattern and a GAP area.

Since no other data is recorded onto the reproduction-only area, which is used for recording the shipping-time information, however, the APC area, the GAP area and the like are not required. In addition, since a data series including synchronization information and address information is created contiguously by using a stamper, the VFO pattern for PLL leading-in is also not required either. Thus, even without the run-in frame, frame synchronization, synchronization based on frame numbers and even address synchronization can be established.

In addition, since the following cluster also starts immediately, the data series is continuous, and a post-amble, that is a run-out frame, is not required either.

Thus, in the case of the shipping-time information recorded in the reproduction-only area, the linking frames known as the run-in and run-out frames can be eliminated.

2. Physical Characteristics of the Disc

The embodiment is explained concretely as follows.

First of all, physical characteristics of the disc implemented by the embodiment and a wobbling track created on the disc are described.

The optical disc implemented by the embodiment is known typically as a DVR (Data & Video Recording) disc and belongs to a category of discs developed in recent years. In particular, a new wobbling technique is applied to the optical disc as a DVR technique.

The optical disc implemented by the embodiment is an optical disc onto which data is recorded by adoption of a phase change technique. As for the size of the optical disc, the disc has a diameter of 120 mm and a thickness of 1.2 mm. From the external-appearance point of view, the optical disc implemented by the embodiment is the same as a disc of a CD (Compact Disc) system or a disc of a DVD (Digital Versatile Disc) system as far as the diameter and the thickness are concerned.

A laser beam for recording and reproduction of data has a wavelength of 405 nm. The laser beam is the so-called blue-color laser. The NA of the optical system is set at 0.85.

Tracks along which phase change marks are recorded have a track pitch of 0.32 µm and a linear density of 0.12 µm.

A user-data storage capacity of about 23 Gbyte has been realized.

A groove recording technique is adopted as a recording technique. That is to say, a track is created as a groove in advance on the disc and data is recorded along this groove.

FIG. 1A is an explanatory diagram showing a model of a groove GV created on a disc. As shown in the figure, the groove GV is created to form a spiral-like shape over the disc's surface spread from the innermost circumference to the outermost circumference. As an alternative, the groove GV can be created to form a concentric shape.

Data is recorded and reproduced while the disc is rotating at a CLV (Constant Linear Velocity). Thus, since the groove GV is also rotated at the CLV, the number of wobbling waves per track circle increases if viewed at a point moving in a radial direction from the innermost circumference to the outermost circumference.

Figure 1B:
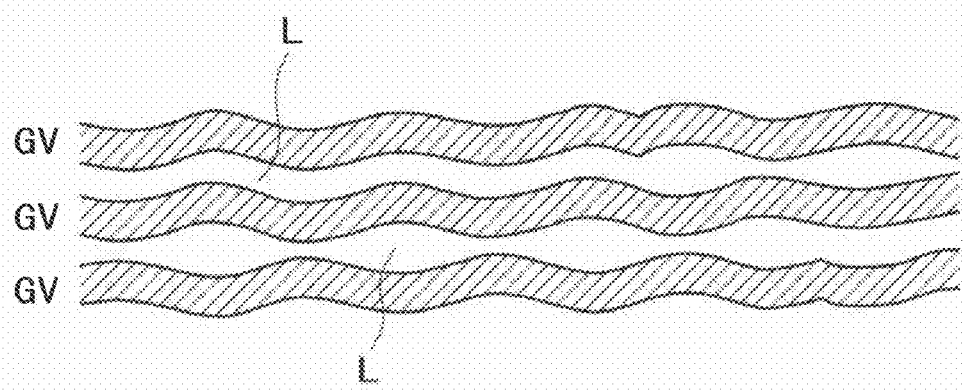

FIG. 1B is an explanatory diagram showing grooves GV each having a wobbling shape expressing physical addresses.

As shown in the figure, the left and right side walls of the groove GV are wobbled to represent a signal generated on the basis of addresses or the like.

A land L is a gap between two adjacent grooves GV. As described above, data is recorded along a groove GV. That is to say, a groove GV is a data track. It is to be noted that data can also be recorded along a land L. In this case, a land L is a data track. As another alternative, data is recorded along a groove GV as well as a land L, which are both data tracks in this case.

Figure 2:
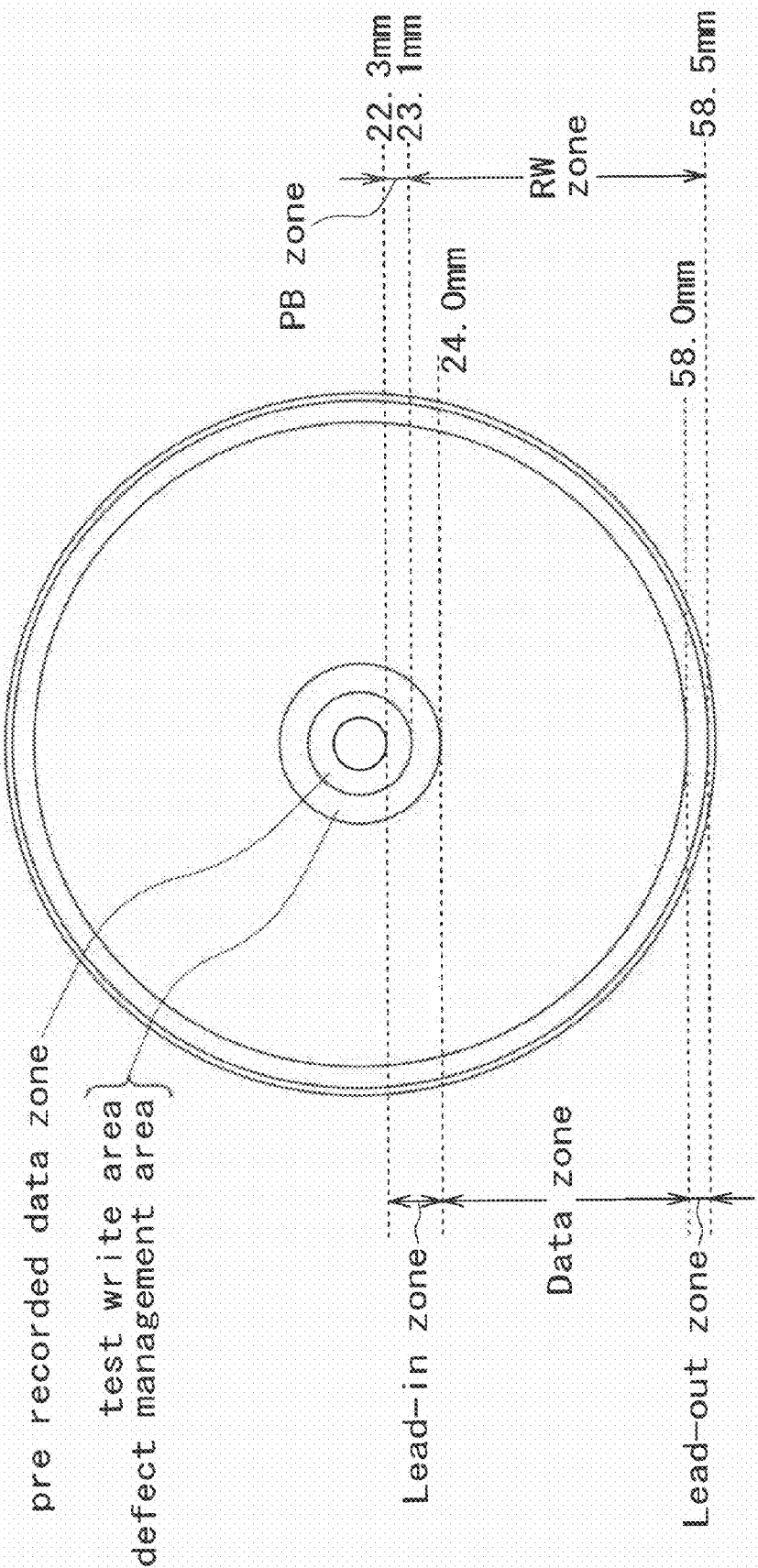
FIG. 2 is an explanatory diagram showing an area configuration of the entire disc implemented by the embodiment.

FIG. 2 is an explanatory diagram showing a layout or an area configuration of the entire disc.

The area on the disc is physically divided sub-areas called, starting from the inner side, a lead-in zone, a data zone, and a lead-out zone.

From a functional point of view, on the other hand, the surface of the disc is divided into a PB zone (or a reproduction-only area) and an RW zone (or a recording/reproduction area). The PB zone is the inner-circumferential side of the lead-in zone, and the RW zone is an area stretched from the outer-circumferential side of the lead-in zone to the lead-out zone.

The lead-in zone is an inner side zone inside a circumference with a radius of 24 mm. A prerecorded data zone is the lead-in zone's area between a circumference with a radius of 22.3 mm and a circumference with a radius of 23.1 mm.

The prerecorded data zone is used for recording shipping-time information (or prerecorded information) in advance as a wobbling shape of a groove created on the disc as a spiral. The shipping-time information is reproduction-only information, which cannot be rewritten. The prerecorded data zone is the PB zone (or the reproduction-only area) cited above.

The lead-in zone's area between a circumference with a radius of 23.1 mm and a circumference with a radius of 24 mm is used as a test write area and a defect management area.

The test write area is used typically as a trial write area for setting conditions for recording and reproduction of phase change marks. The conditions include the power of a laser beam used in recording and reproduction operations.

The defect management area is used for recording and reproduction data for managing information on defects existing on the disc.

A zone between a circumference with a radius of 24.0 mm and a circumference with a radius of 58.0 mm is a data zone. The data zone is an area, which user data is actually recorded onto and reproduced from as phase change marks.

A zone between a circumference with a radius of 58.0 mm and a circumference with a radius of 58.5 mm is the lead-out zone. Much like the lead-in zone, the lead-out zone includes a defect management area and a buffer area allowing an overrun to occur in a seek operation.

An area stretched from the circumference with a radius of 23.1 mm, that is, the start of the test write area, to the lead-out zone is the RW zone (or the recording/reproduction area) cited above.

FIG. 3 is explanatory diagrams showing respectively a track used as the RW zone and a track used as the PB zone. To be more specific, FIG. 3A is a diagram showing the wobbling shape of a groove in the RW zone, and FIG. 3B is a diagram showing the wobbling shape of a groove in the PB zone.

In the RW zone, address information (or an ADIP) is recorded in advance by wobbling the groove created on the disc to form a spiral shape for a tracking purpose.

Information is recorded onto and reproduced from the groove, which includes the embedded address information by phase change marks.

As shown in FIG. 3A, the groove in the RW zone, that is, the groove track including the embedded ADIP address information, has a track pitch TP of 0.32 µm.

On this track, phase change marks each serving as a recording mark are recorded. By adoption of a RLL (1, 7) PP modulation technique or the like, the phase change marks are recorded at a linear density of 0.12 μm/bit or 0.08 μm/channel bit. The RLL stands for Run Length Limited and the PP is an abbreviation of Parity preserve/Prohibit rmtr (repeated minimum transition run length).

Let 1 T represent one channel bit. In this case, the mark length is a value in the range 2 T to 8 T. That is to say, the minimum mark length is 2 T.

As described above, the address information is recorded as the groove's wobbling shape with a wobbling period of 69 T and a wobbling amplitude WA of about 20 nm (peak to peak).

The frequency band of the address information is set not to overlap the frequency band of the phase change marks so that there is no mutual effect on detection of the address information and the phase change marks.

At a bandwidth of 30 KHz, the address information recorded as a wobbling shape has a post-recording CNR (Carrier Noise Ratio) of 30 dB and an address error rate not greater than $1 \times 10^{-3}$. The address error rate is obtained by consideration of effects caused by disturbances such a disc skew, a defocused state, and an external turbulence On the other hand, a track created as the groove in the PB zone shown in FIG. 3B has a track pitch greater than that of the track created as the groove in the RW zone shown in FIG. 3A, and a wobbling amplitude is also greater than that of the track created as the groove in the RW zone shown in FIG. 3A.

To out it concretely, the track shown in FIG. 3B has a track pitch TP of 0.35 μm, a wobbling period of 36 T and a wobbling amplitude WA of 40 nm (peak to peak). The wobbling period of 36 T implies that the linear recording density of the prerecorded information is higher than the linear recording density of the ADIP address information. In addition, since the minimum mark length of the phase change marks is 2 T, the linear recording density of the prerecorded information is lower than the linear recording density of phase change marks.

The track in the PB zone is not used for recording phase change marks.

The wobbling waveform expressing recorded data in the RW zone is sinusoidal, but the wobbling waveform expressing recorded data in the PB zone is sinusoidal or rectangular.

In an operation to record or reproduce phase change marks with ECC (Error Correction Codes) appended to the data, a post-error-correction symbol error rate of $1 \times 10^{-16}$ can be achieved provided that the signal has a high quality such as a CNR of 50 dB at a bandwidth of 30 KHz. Thus, the phase change marks have been known to be usable in an operation to record or reproduce data.

The wobbling CNR of the ADIP address information is 35 dB at a bandwidth of 30 KHz in a state of unrecorded phase change marks.

As address information, the signal quality of this order is considered to be sufficient if interpolation protection based on the so-called contiguity distinction is carried out. In the case of the prerecorded information to be stored in the PB zone, however, it is desirable to assure a signal quality equivalent to or better than a CNR of 50 dB for the phase change marks. For this reason, in the PB zone, a groove physically different from the groove in the RW zone as shown in FIG. 3B is created.

In the first place, by increasing the track pitch, cross talks from adjacent tracks can be suppressed. In the second place, by doubling the wobbling amplitude, the CNR can be improved by +6 dB.

In addition, by forming a rectangular wobbling waveform, the CNR can be further improved by +2 dB. These combined improvements result in a CNR of 43 dB (=35 dB+6 dB+2 dB).

The difference in wobbling recording band between the zone for storing the phase change marks and the zone for storing the prerecorded data is wobbling period of 18 T, which is half the wobbling period of 36 T. At the 2 T minimum mark length of the phase change marks, another CNR improvement of 9.5 dB is gained.

As a result, the CNR of the prerecorded information is equivalent to 52.5 dB (=43 dB+9.5 dB). Thus, even if the cross talks from the adjacent tracks are estimated to give a CNR deterioration of −2 dB, the CNR is still equivalent to 50.5 dB (=52.5 dB−2 dB). That is to say, it is possible to assure a signal quality equivalent to or better than the CNR of 50 dB for the phase change marks so that the wobbling signal can be said to be a sufficiently suitable signal to be used in operations to record and reproduce the prerecorded information.

3. ECC Block Structure of User Data

An ECC block structure of user data recorded in the RW zone (or the recording/reproduction area) as phase change marks is explained by referring to FIG. 4.

A data block of user data physically constitutes roughly 32 sectors. From a content point of view, the data block includes a sub-block of user data and a sub-block of user control data.

As shown in FIG. 4, the sub-block of user data forms the unit having a size of 64 Kbytes (=2,048 bytes×32 sectors).

A 4 bytes EDC (Error Detection Code) is added to each sector to form a data frame unit. 32 data frame units form a data frame having a size of 2,052 bytes×32 sectors. The data frame is further scrambled to produce a scrambled data frame.

Then, the scrambled data frame is subjected to a Reed-Solomon encoding process to generate a data block of 216 rows and 304 columns. Thirty-two rows of parity are further added to the data block to generate an LDC (Long Distance Code) sub-block. The LDC is a correction code for a long inter-code distance. The LDC sub-block is an RS (248, 216, 33)×304 block.

Then, an LDC cluster of 496 rows×152 bytes is formed from the LDC sub-block.

FIGS. 5A and 5B are diagrams showing a process to encode the sub-block of user data into the LDC sub-block.

The 64 Kbytes user data shown in FIG. 5A is subjected to an ECC encoding process to produce the LDC sub-block shown in FIG. 5B. To put it in detail, a 4 bytes EDC (Error Detection Code) is added to each 2,048 bytes sector of the main data (the user data). The 32 sectors of the user data are then encoded into an LDC sub-block. As mentioned above, the LDC sub-block is an RS (Reed Solomon) code with an RS (248, 216, 33), a code length of 248 nibbles, a data size of 216 nibbles, a code distance of 33 nibbles, and has a block size of 304 code words.

On the other hand, the sub-block of user control data has a size of 18 bytes×32 units (576 bytes) as shown in FIG. 4. Address unit numbers having a size of 9 bytes×16 addresses (144 bytes) are added to the sub-block of user control data to generate an encoding unit having a size of 720 bytes (=576 bytes+144 bytes).

The 720 bytes are subjected to the Reed Solomon encoding process to produce an access block of 30 rows×24 columns.

Then, 32 rows of parity are added to form a BIS (Burst Indicating Sub code) sub-block. A BIS is a sub code indicating the position of a burst error of an optical disc. The BIS sub-block is an RS (62, 30, 33)×24 block. Then, a BIS cluster of 496 rows×3 bytes is formed from the BIS sub-block.

FIGS. 5C and 5D are diagrams showing a process to encode the user control data and the address unit number, which have a total size of 720 bytes, into the BIS sub-block.

That is to say, the 720 bytes of data shown in FIG. 5C are subjected to an ECC encoding process to generate the BIS sub-block shown in FIG. 5D. As mentioned above, the BIS sub-block is the RS (Reed Solomon) code with and RS (62, 30, 33), a code length of 62 nibbles, a data size of 30 nibbles, a code distance of 33 nibbles, and has a block size of 24 code words.

As shown in FIG. 4, the LDC and BIS clusters, which are each used as a recording/reproduction unit, each forms 496 rows each constituting a data frame. A data frame of the LDC cluster forms 152 bytes while a data frame of the BIS cluster forms 3 bytes.

Thus, a combined data frame forms 155 bytes (=152 bytes+3 bytes). As shown in the figure, in the combined data frame, four LDC fields each having a size of 38 bytes and three BIS fields each having a size of 1 byte are arranged alternately to form the 155 bytes data frame on one row. 496 rows or 496 data frames each having a size of 155 bytes (=1,240 bits) constitute an ECC block.

Each of the data frames is subjected to an RLL (1, 7) PP modulation process, in which dcc bits and a frame sync are added to generate a recording frame. A dcc bit is a bit for making the frame free from DC components. To put it in detail, data (1,240 bits) obtained as a result of the modulation process is divided into that a start group placed at the beginning of the frame is 25 bits and 27 groups following the start group is 45 bits, and then, a dcc with a size of 1 bit is inserted into a location right behind each of the groups. On the other hand, the frame sync having a size of 20 bits is placed at a location in front of the start group to produce the recording frame having a size of 1,288 bits (1,240 bits of the original frame+20 bits of the frame sync+28 bits of dcc). The 1,288 bits of the recording frame are subjected to the RLL (1, 7) PP modulation process to generate 1,932 channel bits of a modulated recording frame. In the RLL (1, 7) PP modulation process, every 2 data bits of the recording frame are converted into 3 channel bits of the modulated recording frame.

Such recording frames constitute a data structure to be recorded onto a track in the RW zone on the disc.

In the case of a DVR disc, the recording density is thought to be about 0.08 μm per channel bit output by the RLL (1, 7) PP modulation process.

Since the BIS is a code having an extremely excellent an error correction power in comparison with the LDC, almost all errors are corrected. That is to say, the BIS is a code using a code distance of 33 for a code length of 62.

Symbols serving as error pointers provided by erroneous BIS can be used as follows.

In a decoding process using ECC, BIS are decoded first. Assume that two errors are detected in consecutive BIS (or the sync frame) in the data frame structure shown in FIG. 4. In this case, the 38 bytes data sandwiched by the consecutive BIS is regarded as a burst error. Error pointers are added to the 38 bytes data. Then, a pointer erasure correction process based on LDC is carried out by using these error pointers.

In this way, the error correction power is increased over the power of the error correction using only LDC.

BIS include, among other data, address information. These addresses can be used for a case in which address information is not included in a wobbling groove as is the case with a ROM-type disc.

Figure 6:
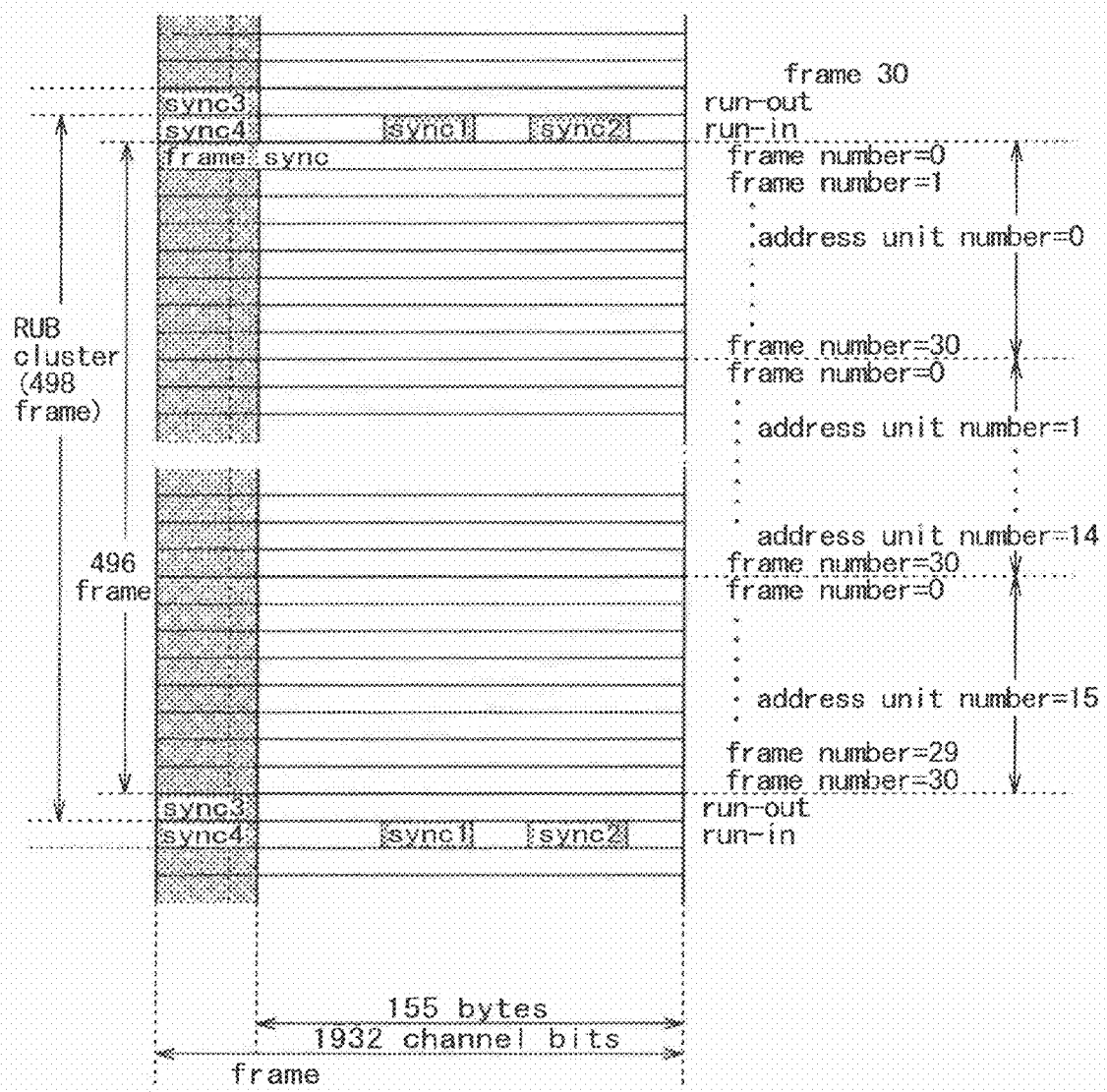
FIG. 6 is an explanatory diagram showing a RUB frame structure of phase change marks in the embodiment.

FIG. 6 is an explanatory diagram showing the structure of a cluster including data frames.

Each row shown in the figure corresponds to a data frame having a size of 155 bytes as described above. As explained earlier, each data frame is modulated to produce a recording frame having a size of 1,932 channel bits. 496 rows or 496 frames constitute an ECC block. A run-in frame and a run-out frame are added to the ECC block respectively before and after the 496 frames to form a RUB (Recording Unit Block) having 498 frames. The RUB is the cluster cited above. The run-in and run-out frames are each used as a linking frame.

In addition, as described above, 16 addresses are each added as an address unit number. The cluster's LDC portion excluding the run-in and run-out frames includes 496 frames, which are divided into 16 groups each having 31 frames, namely, frame 0 to frame 30. The 16 addresses, namely, having unit numbers 0 to 15, are assigned to the 16 groups on a one-to-one basis.

4. ADIP Addresses

The following description explains ADIP addresses recorded as a groove wobbling shape in the RW zone.

FIG. 7 is an explanatory diagram showing use of an MSK (Minimum Shift Keying) technique, which is one of FSK modulation methods, as a technique of modulating ADIP addresses that the grove is wobbled.

As a data detection unit, two wobble segments are taken. It is to be noted that a wobble segment is a wobble period defined as the reciprocal of a carrier frequency.

Data such as an address is subjected to a differential encoding process prior to a recording process in a unit of one wobble (or window length units shown in FIG. 7A). To put it in detail, the differential encoding process encodes input data having a value of "one" into prerecorded data also having a value of "one" during a wobble period between rising and falling edges prior to the recording process as shown in FIG. 7B.

Then, the prerecorded data is subjected to the MSK modulation process to generate an MSK stream shown in FIG. 7C. To put it in detail, prerecorded data having a value of "zero" is modulated into a carrier cos ωt or −cos ωt. On the other hand, prerecorded data having a value of "one" is modulated into a carrier cos 1.5 ωt or −cos 1.5 ωt with a frequency 1.5 times the frequency of the carrier obtained as a result of the MSK modulation process carried out on prerecorded data having a value of "zero".

Assume that one channel bit of recorded or reproduced phase change data corresponds to one channel. In this case, the period of the carrier is capable of accommodating 69 channels as shown in FIG. 7C.

By the way, 1 data bit of an ADIP completing an MSK modulation process occupies 56 wobble periods while a wobble period is capable of accommodating 69 channel bits obtained as a result of the RLL (1, 7) PP modulation process applied to user data as is explained earlier by referring to FIG. 3A.

Thus, the recording density of ADIP data bits is $1/2{,}576$ times the recording density of user data obtained as a result of the RLL (1, 7) PP modulation process.

In the case of this embodiment, for one RUB (Recording Unit Block) or one recording cluster, which is used as a recording unit of the user data described above, three addresses can be included as ADIP addresses.

FIG. 8 is an explanatory diagram showing a state of inclusion of the 3 address blocks including the 3 addresses in 1 RUB. As shown in FIG. 6, a RUB (or a recording cluster) includes 496 frames, which form an ECC block, and 2 frames, namely, the run-in and run-out frames. Thus, a RUB includes a total of 498 frames, serving as a recording unit.

As shown in FIG. 8A, in a segment corresponding to 1 RUB, 3 ADIP address blocks are included. An address block consists of 83 bits.

FIG. 8B is a diagram showing the configuration of an address blocks. The address block consisting of 83 bits includes a sync part (or a synchronization signal part) having a size of 8 bits and a data part having a size of 75 bits.

The sync part having a size of 8 bits includes four units each consisting of 1 monotone bit and 1 sync bit.

On the other hand, the data part having a size of 75 bits includes 15 ADIP block units each consisting of 1 monotone bit and 4 ADIP bits.

One monotone bit, one sync bit, and one ADIP bit each occupies 56 wobble periods. At the head of the bit, an MSK mark exists to serve as a bit-sync.

Wobble periods each defined as the reciprocal of the carrier frequency are created for the monotone bit, following the MSK mark of the monotone bit. Details of the sync bit and the ADIP bit will be described later. Anyway, wobble periods of an MSK modulation waveform are created for the sync bit, following the MSK mark of the sync bit. By the same token, wobble periods of an MSK modulation waveform are created for the ADIP bit, following the MSK mark of the ADIP bit.

FIG. 9 is an explanatory diagram showing the configuration of the sync part.

Figure 9A:
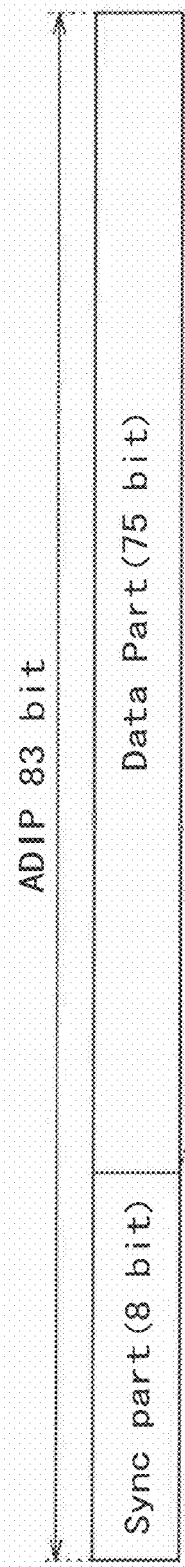
FIGS. 9A and 9B are explanatory diagrams showing a sync part in the embodiment.
Figure 9B:
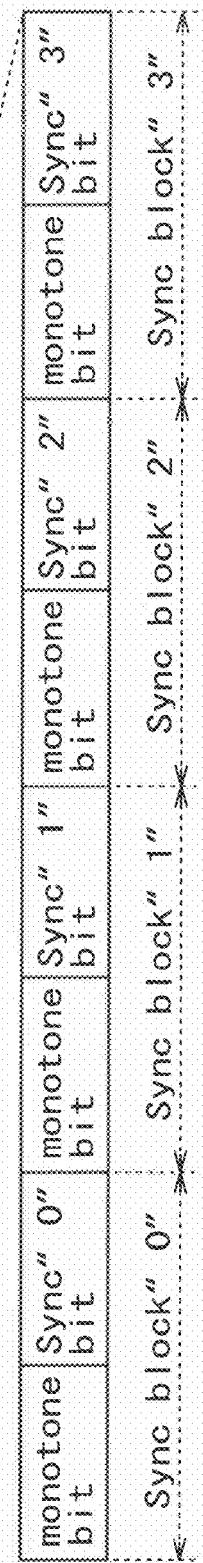

As is obvious from FIGS. 9A and 9B, the sync part having a size of 8 bits includes four sync blocks, namely, sync blocks "0", "1", "2", and "3", each consisting of two bits, namely, a monotone bit and a sync bit.

To be more specific, sync block "0" constitutes of a monotone bit and a sync "0" bit, sync block "1" constitutes of a monotone bit and a sync "1" bit, sync block "2" constitutes of a monotone bit and a sync "2" bit and sync block "3" constitutes of a monotone bit and a sync "3" bit.

As described above, a monotone bit in each sync block is a waveform over a series of wobble periods of a carrier having a single frequency. To put it in detail, a monotone bit includes 56 wobble periods as shown in FIG. 10A. At the head of the 56 wobble periods, an MSK mark bs exists to serve as a bit-sync bs. The remaining wobble periods each defined as the reciprocal of the single carrier frequency are created for the monotone bit, following the MSK mark of the monotone bit. It is to be noted that the MSK mark pattern is shown beneath a wobble period in each of FIGS. 10A to 10E.

As described above, there are 4 kinds of sync bit, namely, the sync "0" bit, the sync "1" bit, the sync "2" bit, and the sync "3" bit. The sync "0" bit, the sync "1" bit, the sync "2" bit, and the sync "3" bit are converted into wobble waveform patterns shown in FIGS. 10B, 10C, 10D, and 10E respectively.

In the case of the wobble waveform pattern for the sync "0" bit shown in FIG. 10B, an MSK mark exists at the beginning to serve as a bit-sync bs. The head MSK mark is followed by a second MSK mark separated from the head MSK by 16 wobble periods. Thereafter, successive MSK marks follow the second MSK mark at intervals of 10 wobble periods.

In the case of the wobble waveform pattern for the sync "n", the second MSK mark exists at a position lagging behind the second MSK mark of the sync "n−1" bit by 2 wobble periods and, thereafter, successive marks follow at positions lagging behind the counterpart successive MSK marks of the sync "n−1" bit by two wobble periods, where n=1 to 3.

To be more specific, in the case of the wobble waveform pattern for the sync "1" bit shown in FIG. 10C, an MSK mark exists at the beginning to serve as a bit-sync bs. The head MSK mark bs is followed by a second MSK mark separated from the head MSK by 18 wobble periods. Thereafter, successive MSK marks follow the second MSK mark at intervals of 10 wobble periods.

By the same token, in the case of the wobble waveform pattern for the sync "2" bit shown in FIG. 10D, an MSK mark exists at the beginning to serve as a bit-sync. The head MSK mark is followed by a second MSK mark separated from the head MSK bs by 20 wobble periods. Thereafter, successive MSK marks follow the second MSK mark at intervals of 10 wobble periods.

In the same way, in the case of the wobble waveform pattern for the sync "3" bit shown in FIG. 10E, an MSK mark exists at the beginning to serve as a bit-sync bs. The head MSK mark is followed by a second MSK mark separated from the head MSK by 22 wobble periods. Thereafter, successive MSK marks follow the second MSK mark at intervals of 10 wobble periods.

Each sync pattern includes a pattern unique to a monotone bit and a sync bit and ADIP bits to be described later. As described above, there are four different sync-bit patterns. By including each of these different sync-bit pattern in every sync block of a sync part, the disc drive apparatus is capable of detecting and recognizing any of these sync-bit patterns included in the sync blocks and as well as establishing synchronization.

Figures 11A, 11B:
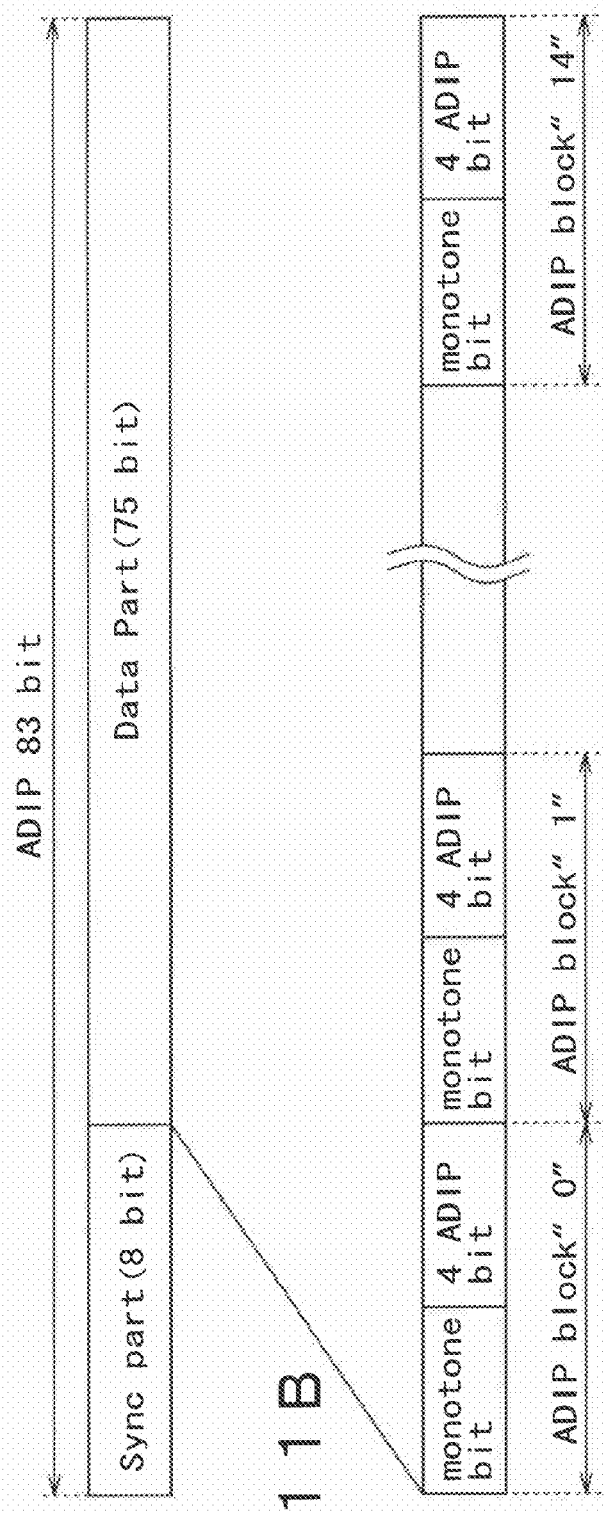
FIGS. 11A to 11B are explanatory diagrams showing a data part in the embodiment.

By referring to FIG. 11, the following description explains the data part of an address block. As shown in FIGS. 11A and 11B, the data part includes 15 ADIP blocks, namely, ADIP blocks "0" to "14", which each consist of 5 bits.

Each of the 5 bit ADIP blocks includes one monotone bit and 4 ADIP bits.

Much like the sync block, 1 monotone bit of the ADIP block occupies 56 wobble periods. At the head of the bit, an MSK mark exists to serve as a bit-sync bs. Wobble periods each defined as the reciprocal of the carrier frequency are created for the monotone bit, following the MSK mark of the monotone bit. A waveform representing the MSK mark and the following wobble periods is shown in FIG. 12A.

Since an ADIP block includes 4 ADIP bits, the 15 ADIP blocks can accommodate 60 ADIP bits of address information.

Wobble waveform patterns of "1" and "0" ADIP bits are shown in FIGS. 12B and 12C respectively.

As shown in FIG. 12B, in the case of the wobble waveform pattern of the "1" ADIP bit, an MSK mark exists at the beginning to serve as a bit-sync bs. The head MSK mark is followed by a second MSK mark separated from the head MSK by 12 wobble periods.

As shown in FIG. 12C, in the case of the wobble waveform pattern of the "0" ADIP bit, an MSK mark also exists at the beginning to serve as a bit-sync bs. However, the head MSK mark is followed by a second MSK mark separated from the head MSK by 14 wobble periods.

As described above, MSK-modulated data is recorded along a wobbling groove. FIG. 13 is a diagram showing an address format of the ADIP information recorded as described above.

FIG. 13 also shows a method of correcting errors in ADIP address information.

The actual ADIP address information has a size of 36 bits, to which 24 parity bits are added.

The ADIP address information with a size of 36 bits includes a 3 layer number bits (namely, layer number bit 0 to layer number bit 2), which are used for multi-layer recording purposes, 19 RUB (Recording Unit Block) bits (namely, RUB bit 0 to RUB bit 18), 2 address number bits (namely, address number bit 0 to address number bit 1), and 12 auxiliary data bits. The 2 address number bits are used for identifying 3 address blocks for 1 RUB. The auxiliary data includes the ID of the disc containing stored recording conditions such as the power of a recording/reproduction laser.

The ECC unit of address data is the unit constituting a total of 60 bits (36 bits+24 parity bits) described above. As shown in the figure, the 60 bits are 15 nibbles, namely, nibble 0 to nibble 14, where a nibble constitutes of 4 bits.

As an error correction technique, the nibble-based Reed-Solomon encoding RS (15, 9, 7) technique is adopted. In accordance with this technique, 4 bits are treated as a symbol. Notation (15, 9, 7) means a code length of 15 nibbles, a data size of 9 nibbles, and a code distance of 6 nibbles.

5. Prerecorded Information (Shipping-Time Information)

FIGS. 14A to 14K are explanatory diagrams showing a method of modulating prerecorded information (or shipping-time information) for forming a wobbling groove in the prerecorded data zone.

As a modulation technique, a bi-phase modulation technique such as an FM code modulation technique is adopted.

FIG. 14A shows values of a data bit and FIG. 14B shows a channel clock signal. FIG. 14C shows FM codes and FIG. 14D shows wobble waveforms.

One data bit is 2 ch (2 channel clock). The FM code for a data bit of "1" is represented by a frequency ½ times the frequency of the channel block.

The FM code for a data bit of "0" is represented by a frequency ½ times the frequency of the FM code for a data bit of "1".

A wobble waveform recorded as a groove wobbling shape can be a rectangular waveform directly representing the FM code. As an alternative, a waveform recorded as a groove wobbling shape can be a sinusoidal waveform shown in FIG. 14D.

It is to be noted that the polarities of the patterns of the FM code and the wobble waveform, which are shown in FIGS. 14C and 14D respectively, can be inverted to result in patterns shown in FIGS. 14E and 14F respectively.

Let the rules of the FM code modulation described above be applied to a data bit stream of "10110010" shown in FIG. 14G. In this case, the modulation produces an FM code waveform and a wobble waveform (sinusoidal waveform), which are shown in FIGS. 14H and 14I respectively.

It is to be noted that the modulation may also produce an FM code waveform and a sinusoidal wobble waveform, which are shown in FIGS. 14J and 14K respectively, by inverting the polarities of the patterns of the FM code and the wobble waveform in FIGS. 14H and 14I respectively.

Figure 15:
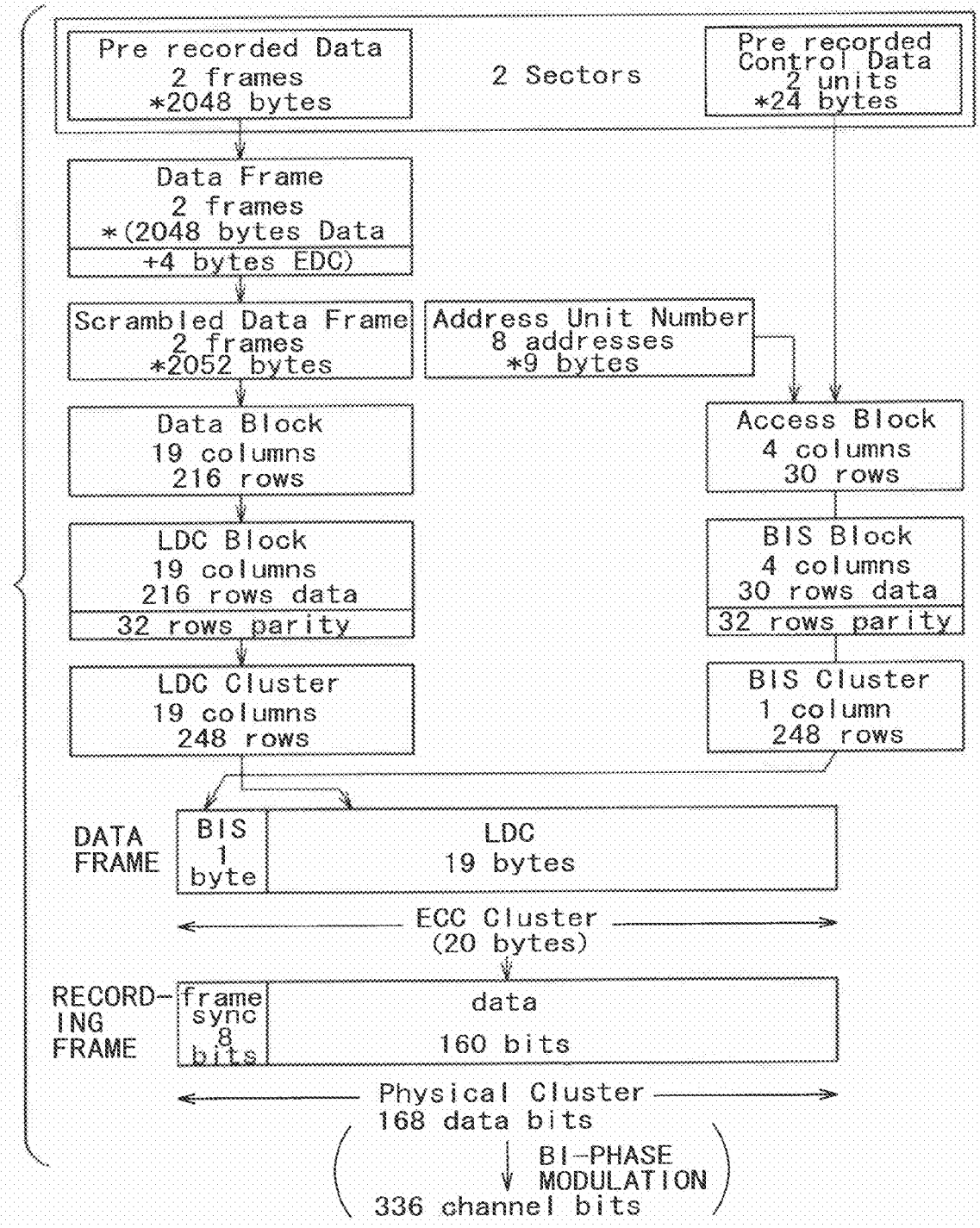
FIG. 15 is an explanatory diagram showing an ECC block of prerecorded information and data frames of the embodiment.

The structure of an ECC block of shipping-time information is described by referring to FIG. 15. The ECC data block of shipping-time information physically comprises roughly two sectors. From a content point of view, the data block includes a sub-block of actual shipping-time information (or prerecorded data) and a sub-block of control data related to the actual shipping time information (prerecorded control data).

As shown in FIG. 15, the sub-block of prerecorded data comprises two units each occupying a sector having a size of 2 K bytes. The two units form the sub-block having a size of 4 K byte (=2,048 bytes/sector×2 sectors).

A 4 bytes EDC (Error Detection Code) is added to each sector to form a data-frame unit. 2 data-frame units form a data frame having a size of 2,052 (=2,048+4) bytes/data-frame unit×2 data-frame units. The data frame is further scrambled to produce a scrambled data frame.

Then, the scrambled data frame is subjected to a Reed-Solomon encoding process to generate a data block of 216 rows and 19 columns. 32 rows of parity are further added to the data block to generate an LDC (Long Distance Code) sub-block of (216+32) rows and 19 columns. The LDC sub-block is an RS (248, 216, 33)×19 block.

Then, an LDC cluster of 248 rows×19 columns (19 bytes) is formed from the LDC sub-block.

FIGS. 16A and 16B are diagrams showing a process to encode the sub-block of prerecorded data into the LDC sub-block.

The 4 K bytes prerecorded data shown in FIG. 16A is subjected to an ECC encoding process to produce the LDC sub-block shown in FIG. 16B. To put it in detail, a 4-byte EDC (Error Detection Code) is added to each 2,048-byte sector of the prerecorded data. The two sectors of the prerecorded data are then encoded into an LDC sub-block. As mentioned above, the LDC sub-block is an RS (248, 216, 33)×19 block. An RS (248, 216, 33)×19 block is a block, which is composed of the RS (Reed-Solomon) code with a code length of 248 nibbles, a data size of 216 nibbles and a code distance of 33 nibbles and has a block size of 19 code words.

On the other hand, the sub-block of prerecorded control data has a size of 48 bytes (=24 bytes/unit×2 units) as shown in FIG. 15. Address unit numbers having a size of 72 bytes (9 bytes/address×8 addresses) are added to the sub-block of prerecorded control data to generate an encoding unit having a size of 120 bytes (=48 bytes+72 bytes).

The 120 bytes are subjected to the Reed-Solomon encoding process to produce an access block of 30 rows×4 columns.

Then, 32 rows of parity are added to form a BIS (Burst-Indicating Sub code) sub-block. The BIS sub-block is an RS (62, 30, 33)×4 block. Then, a BIS cluster of 248 rows×1 column (1 byte) is formed from the BIS sub-block.

FIGS. 16C and 16D are diagrams showing a process to encode the prerecorded control data and the address unit number, which have a total size of 120 bytes, into the BIS sub-block.

That is to say, the 120 bytes of data shown in FIG. 16C are subjected to an ECC encoding process to generate the BIS sub-block shown in FIG. 16D. As mentioned above, the BIS sub-block is an RS (62, 30, 33)×4 block. An RS (62, 30, 33)×4 block is a block, which is composed of the RS (Reed-Solomon) code with a code length of 62 nibbles, a data size of 30 nibbles and a code distance of 33 nibbles and has a block size of four code words.

As shown in FIG. 15, the LDC and BIS clusters, each comprises 248 rows each constituting a data frame. A data frame of the LDC cluster comprises 19 bytes while a data frame of the BIS cluster comprises 1 byte.

Thus, a combined data frame comprises 20 bytes (=19 bytes+1 byte). As shown in the figure, the BIS having a size of 1 byte is placed at the head of the combined data frame. The BS is followed by the LDC having a size of 19 bytes. 248 rows or 248 data frames each having a size of 20 bytes (=160 bits) constitute an ECC block.

Each of the data frames is subjected to a bi-phase modulation process, in which a frame sync is added to generate a recording frame. To put it in detail, the frame sync having a size of 8 bits is inserted into the head of 20-byte (160-bit) data obtained as a result of the bi-phase modulation process to produce a structure consisting of 336 channel bits as a final result of the bi-phase modulation process.

It is to be noted that, since there is no DC component in the case of the bi-phase modulation, it is not necessary to add dcc bits to the data frame.

Such recording frames constitute a data structure to be recorded onto a track as a wobbling groove in the PB zone on the disc.

To put it in detail, the prerecorded information used as shipping-time information is recorded onto the PB zone, which is an area between a circumference with a radius of 22.3 mm and a circumference with a radius of 23.1 mm in the case of a disc having a diameter of 12 cm as described earlier by referring to FIG. 2.

To consider merely a condition requiring that a data block of shipping-time information shall be recorded in the format described above into the PB zone's area not exceeding the circle of a circumference on the disc, the recording density of channel bits can be made less dense to a value of about 1.72 μm.

That is to say, the recording density of channel bits can be reduced to about ⅛ times the recording density of user data obtained as a result of the modulation adopting the RLL (1, 7) PP technique. As a result, the S/N ratio of a signal representing the channel bits can be improved.

Since the BIS is a code having an extremely excellent error correction power in comparison with the LDC, almost all errors are corrected. Thus, symbols serving as error pointers provided by erroneous BIS can be used as follows.

In a decoding process using ECC, BIS are decoded first. Assume that two errors are detected in consecutive BIS. In this case, the two errors are regarded as a burst error in the 19-byte data sandwiched by the consecutive BIS. Error pointers each pointing to one of the errors are added to the 19-byte data. Then, a pointer erasure correction process based on LDC is carried out by using these error pointers.

In this way, the error correction power is increased over the power of the error correction using only LDC.

BIS include, among other data, address information. In a prerecorded data zone, prerecorded information is stored as a groove wobbling shape. Thus, since the groove wobbling shape does not express address information, the address information included in BIS can be used in making an access.

As is obvious from FIG. 15 (or FIGS. 16A to 16D) and FIG. 4 (or FIGS. 5A to 5D), the ECC format of user data stored as phase change marks uses the same codes as the ECC format of shipping-time information.

The fact that the ECC formats share the same codes implies that the ECC decoding process of shipping-time information (or prerecorded information) can be carried out by the circuit system for performing the ECC decoding process of reproduction of user data stored as phase change marks, and also means that the hardware configuration of the disc drive apparatus can be made more efficient.

FIG. 17 is an explanatory diagram showing the structure of a cluster comprising data frames.

Each row shown in the figure corresponds to a data frame having a size of 20 bytes as described above. As explained earlier, each data frame is modulated to produce a recording frame having a size of 336 channel bits. 248 rows or 248 frames constitute an ECC block. A run-in frame and a run out frame are added to the ECC block respectively before and after the 248 frames to form the aforementioned cluster having 250 frames. The run-in and run out frames are each used as a linking frame.

In addition, as described above, 8 addresses are each added as an address unit number. The cluster's LDC portion excluding the run-in and run out frames comprises 248 frames, which are divided into eight groups each having 31 frames, namely, frame 0 to frame 30. The 8 addresses, namely, addresses having unit numbers 0 to 7, are assigned to the eight groups on a one-to-one basis.

It is to be noted that the prerecorded data's cluster structure shown in FIG. 17 is a typical cluster structure obtained by adding the linking frames in conformity with the cluster structure of user data. The prerecorded data's cluster structure conforming to the cluster structure of user data is amenable to the design of the circuit configuration of a decode processing system employed in the disc drive apparatus.

However, it is not always necessary to design the cluster structure of the prerecorded data (or the shipping-time information) in conformity with the cluster structure of user data if the unconformity does not cause a problem.

Figure 18:
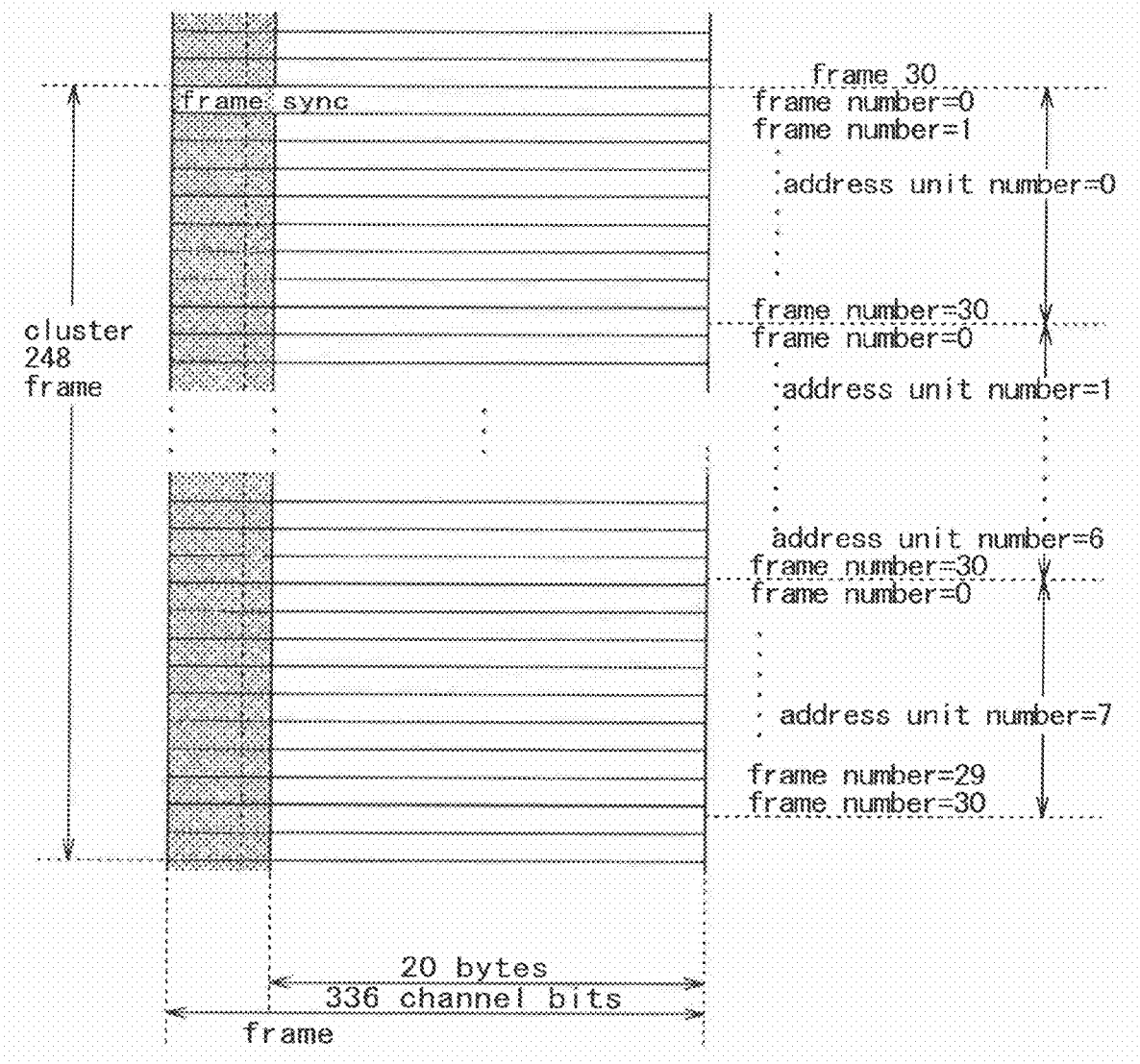
FIG. 18 is an explanatory diagram showing the frame structure of a cluster of prerecorded information in the embodiment.

That is to say, since the shipping-time information is reproduction-only information, which is never rewritten, the linking frames are not required. Thus, with the linking frames eliminated, a cluster comprising only 248 frames as shown in FIG. 18 is also conceivable.

By referring to FIGS. 19 to 26, the following description explains data-series conversion processing such as an interleaving process carried out on LDC and BIS sub-blocks.

Figure 26:
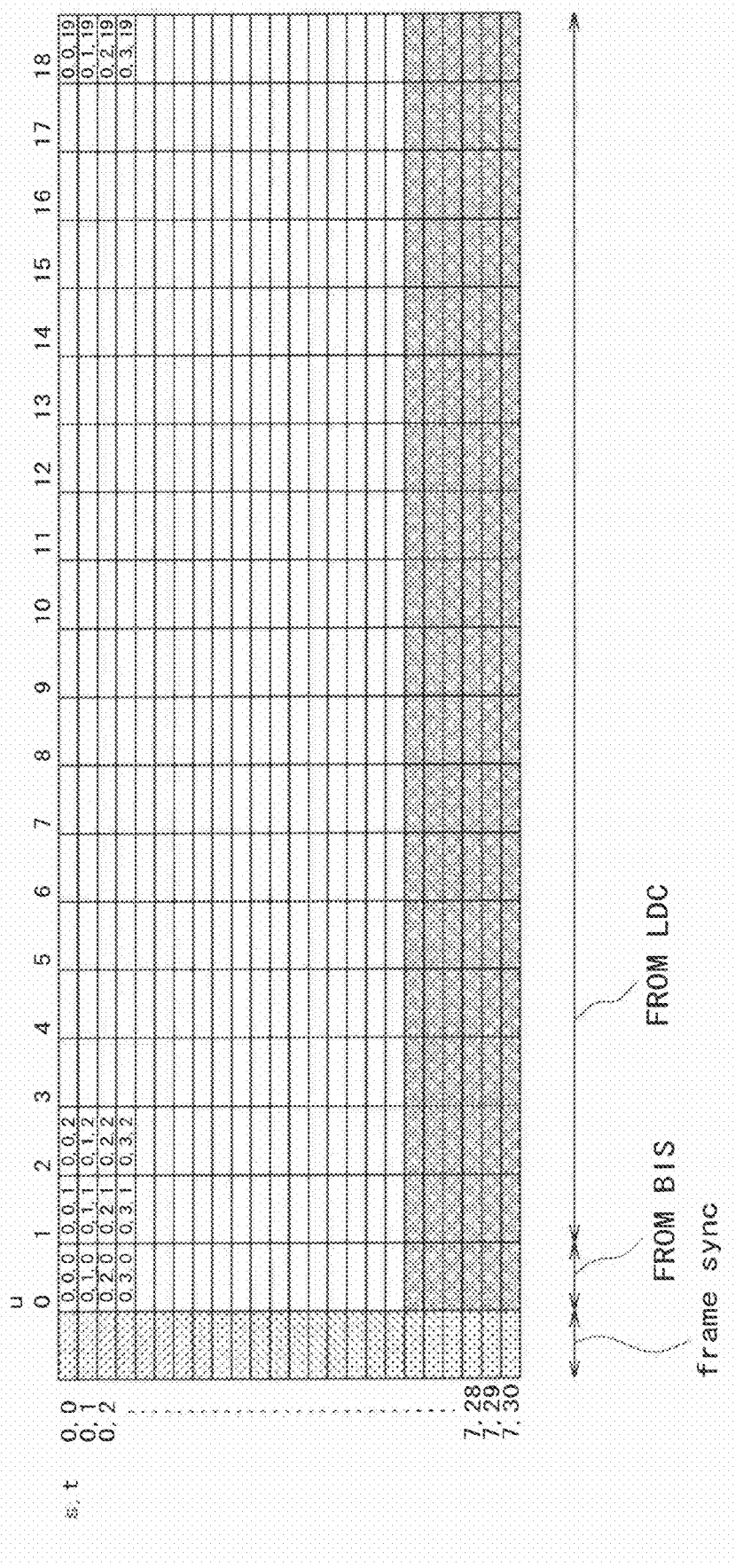
FIG. 26 is an explanatory diagram used for describing the frame structure, which is carried out when data of LDC and BIS sub-blocks is recorded onto a disc.

FIGS. 19 to 21 are explanatory diagrams used for describing conversion processing carried out on an LDC sub-block. On the other hand, FIGS. 22A to 25 are explanatory diagrams used for describing conversion processing carried out on a BIS sub-block. FIG. 26 is an explanatory diagram used for describing conversion processing, which is carried out when data of LDC and BIS sub-blocks is recorded onto a disc.

FIG. 19 is an explanatory diagram used for describing a process to convert prerecorded data C(g, h) used as actual shipping-time information into data D(i, j) recorded on a memory, where the subscript g in the range $0 \leq g < 2$ denotes a unit number and the subscript h in the range $0 \leq h < 2,052$ denotes prerecorded data number. The conversion processing is carried out on the basis of conversion equations using the unit number g and the prerecorded data number h as follows:

$$i = (g \times 2,052 + h) \% 216$$

$$j = (g \times 2,052 + h) / 216$$

where symbol "/" denotes a division operator for finding a quotient j and symbol "%" denotes a division operator for finding a division remainder i.

C(g, 2,048) to C(g, 2,051) are EDC (Error Detection Codes) for C(g, 0) to C(g, 2,047).

The (2,052×2)-byte prerecorded data including EDC as shown in FIG. 15 is converted into data D (i, j) loaded into a memory as shown in FIG. 19 where $0 \leq i \leq 215$ and $0 \leq j \leq 18$. Notations "0, 0" to "1, 2051" shown in FIG. 19 denote the prerecorded data C(g, h).

FIG. 20 is a diagram showing codes of the prerecorded data's memory data D(i, j) loaded into a memory as described above where the subscript i is a code number and the subscript j is a byte number.

A hatched portion corresponding to the subscript i's values in the range $216 \leq i \leq 247$ represents 32 added rows of parity.

FIG. 21 is a diagram showing positions b(s, t, u) obtained as a result of a conversion process carried out on the memory data D(i, j) like the one shown in FIG. 20 where the subscript s is an AUN (Address Unit Number), the subscript t is a frame number and the subscript u is a byte number.

The conversion process is carried out on the basis of conversion equations using the address unit number s, the frame number t and the byte number u as follows:

$$i=(s\times 31+t)$$

$$j=(s\times 31+t+u-1)\%19$$

where $0\leq s<8$, $0\leq t<31$ and $1\leq u<20$.

FIGS. 22 to 25 are explanatory diagrams used for describing conversion processing carried out on prerecorded control data used as addition & control information for the shipping-time information.

FIG. 22 is an explanatory diagram showing information included in a BIS sub-block.

As described earlier, the BIS information comprises address information and prerecorded control data.

The address information in the BIS information is shown in FIG. 22A. As shown in the figure, an address in one ECC block comprises eight address fields, namely, address field #0 to address field #7. Each of the address fields comprises 9 bytes. For example, address field #0 comprises 9 bytes, namely, byte 0-0 to byte 0-8.

The 4 MSB (Most Significant Bytes) of each address field are used for storing an address value showing an ECC block address called an AUN (Address Unit Number).

The 3 LSB (Least Significant Bits) of the 5th byte in each address field is used for storing the number of the address field.

The descendant 4 LSB (Least Significant Bytes) of each address field are used for storing parity bits for the address field.

On the other hand, the prerecorded control data in the BIS information is shown in FIG. 22B. As shown in the figure, the prerecorded control data in one ECC block comprises 2 units, namely, unit #0 and unit #1, which each consist of 24 bytes. For example, unit #0 is composed of 24 bytes, namely, byte 0-0 to byte 0-23.

This prerecorded control data is reserved for future use.

Figure 23:
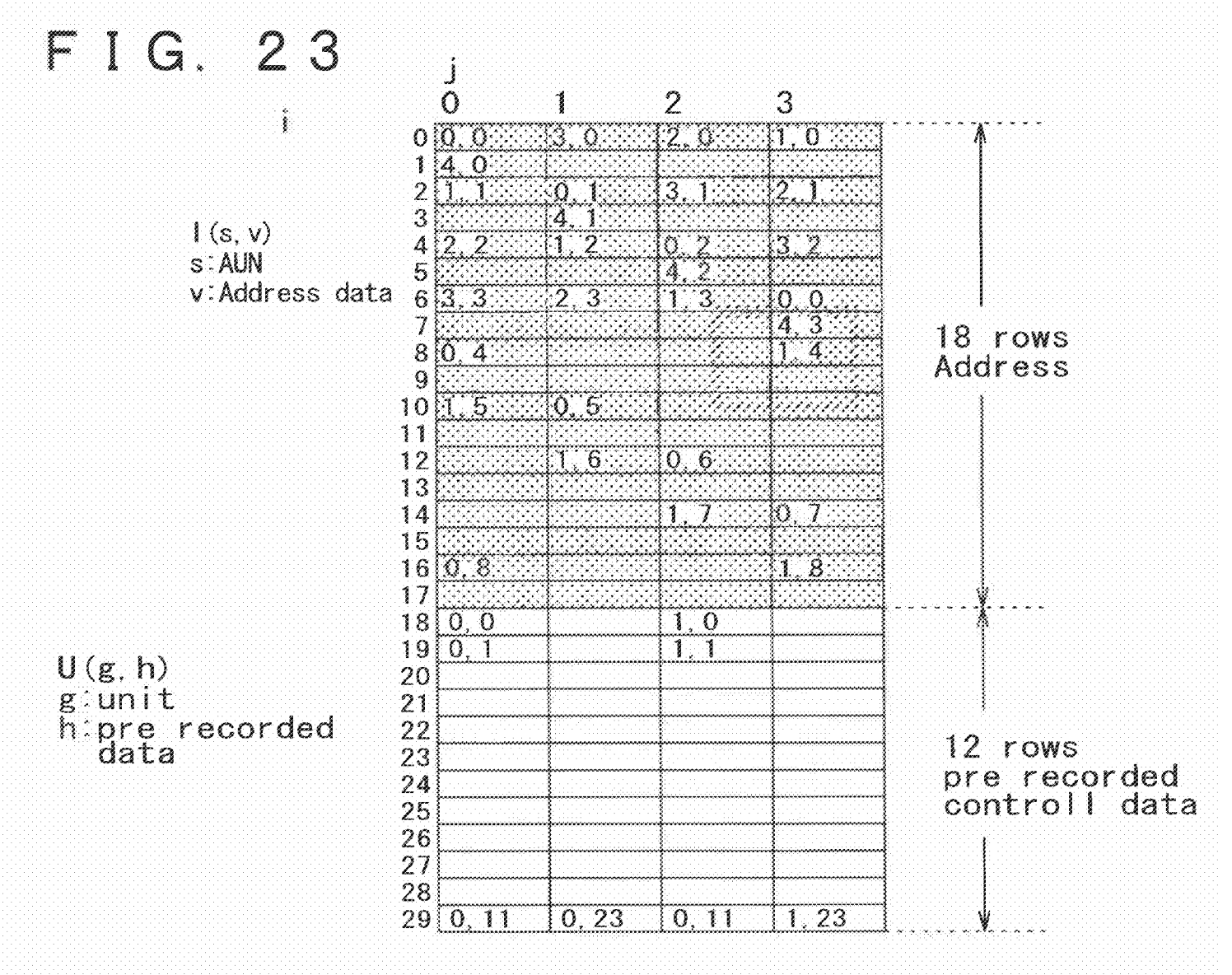

FIG. 23 is an explanatory diagram used for describing processing to convert the BIS sub-block's address information I(s, v) and prerecorded control data U(g, h) into memory data B(i, j).

In the address information I(s, v), the subscript s is an AUN (Address Unit Number) in the range #0 to #7 and the subscript v is an address number, that is, a byte number in the range 0 to 8.

In the prerecorded control data U(g, h), on the other hand, the subscript g is a unit number in the range #0 to #1 and the subscript h is a data number, that is, a byte number in the range 0 to 23.

The conversion processing for the address information is carried out on the basis of conversion equations using the address unit number s and the byte number v as follows:

$$i = ((s\times 31 + v)\%31)\times 2 + ((s\times 31 + v)/124)$$
$$= (v\%31)\times 2 + (s/4)$$
$$j = (s\times 31 + v)\%4$$

where $0\leq s<8$ and $0\leq v<9$. The address information is loaded into a memory, by being interleaved in a range of 18 rows, that is, in the range $0\leq i\leq 17$.

As for the prerecorded control data, the conversion processing is carried out on the basis of conversion equations using the unit number g and the byte number h as follows:

$$i=(g\times 24+h)\%12+18$$

$$j=(g\times 24+h)/12$$

where $0\leq g<2$ and $0\leq h<24$. The prerecorded control data is loaded into a memory in a range of 12 rows, that is, in the range $18\leq i\leq 29$.

Figure 24:
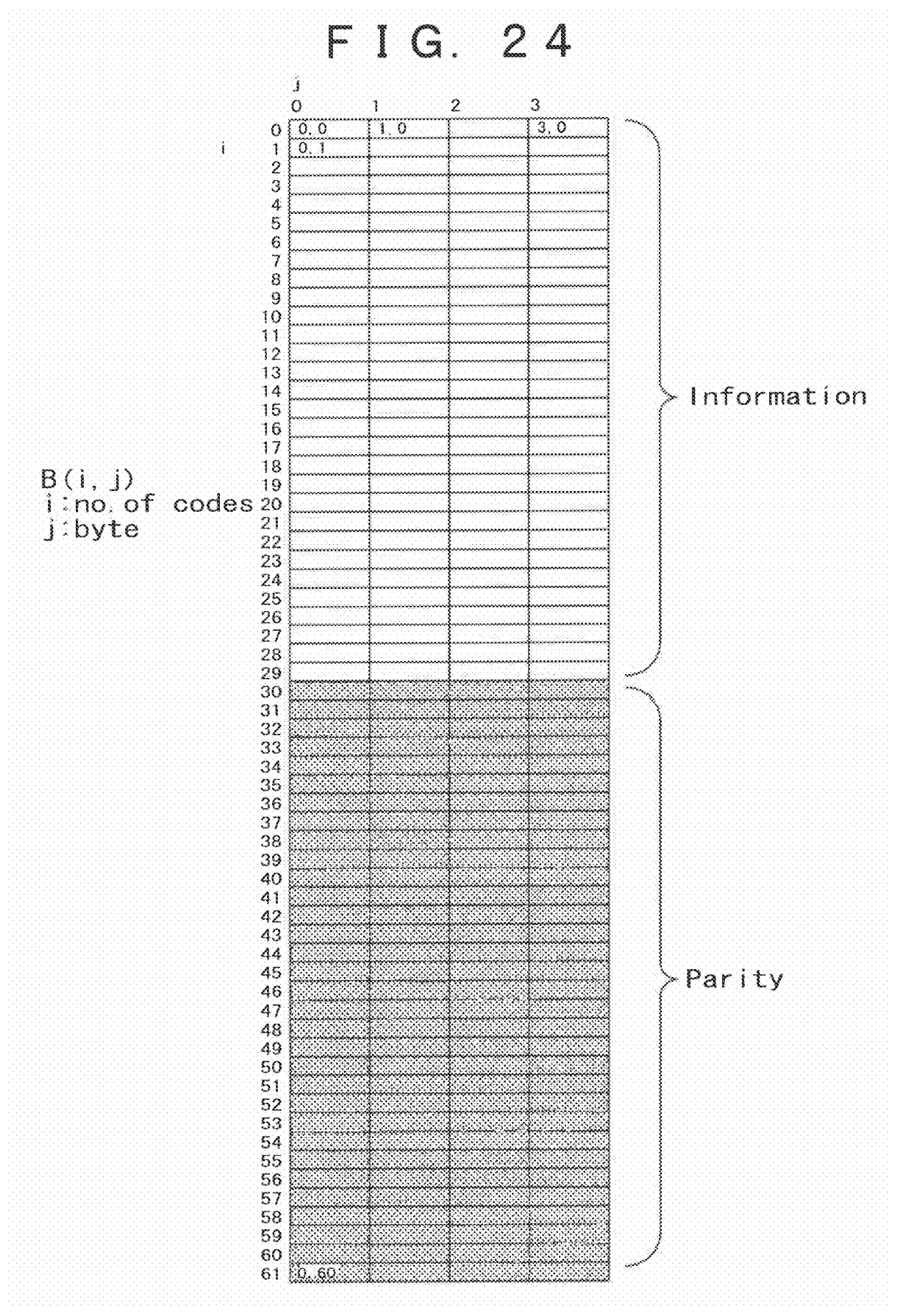

FIG. 24 is a diagram showing address information and prerecorded control data, which are loaded in a memory as described above, in terms of memory data B(i, j) where the subscripts i and j are a code number and a byte number respectively.

A hatched portion corresponding to the value of subscript i in the range $30\leq i\leq 61$ represents 32 added rows of parity.

FIG. 25 is a diagram showing processing to convert the memory data B(i, j) like the one shown in FIG. 24 into positions b(s, t, u) on the disc where the subscripts s, t and u are an AUN (Address Unit Number), a frame number and a byte number respectively.

The conversion processing is carried out on the basis of conversion equations using the address unit number s, the frame number t and the byte number u set at 0 as follows:

$$i = ((s\times 31 + t)\%31)\times 2 + ((s\times 31 + t)/124)$$
$$= (t\%31)\times 2 + (s/4)$$
$$j = (s\times 31 + t)\%4$$

where $0\leq s<8$, $0\leq t<31$ and $u=0$.

The data at the positions b(s, t, u) shown in FIG. 21 to represent results of a process to convert an LDC sub-block and the data at the positions b(s, t, u) shown in FIG. 25 to represent results of a process to convert an BIS sub-block jointly form frames recorded on the disc as shown in FIG. 26.

It is to be noted that the conversion rules of data processing to convert shipping-time information are also applicable to user data as well.

By the way, the above description explains the shipping-time information's typical case in which an ECC block is constructed as a 4 K bytes unit of prerecorded data. However, an ECC block constructed as an 8 K bytes unit of prerecorded data is also conceivable.

Figure 27:
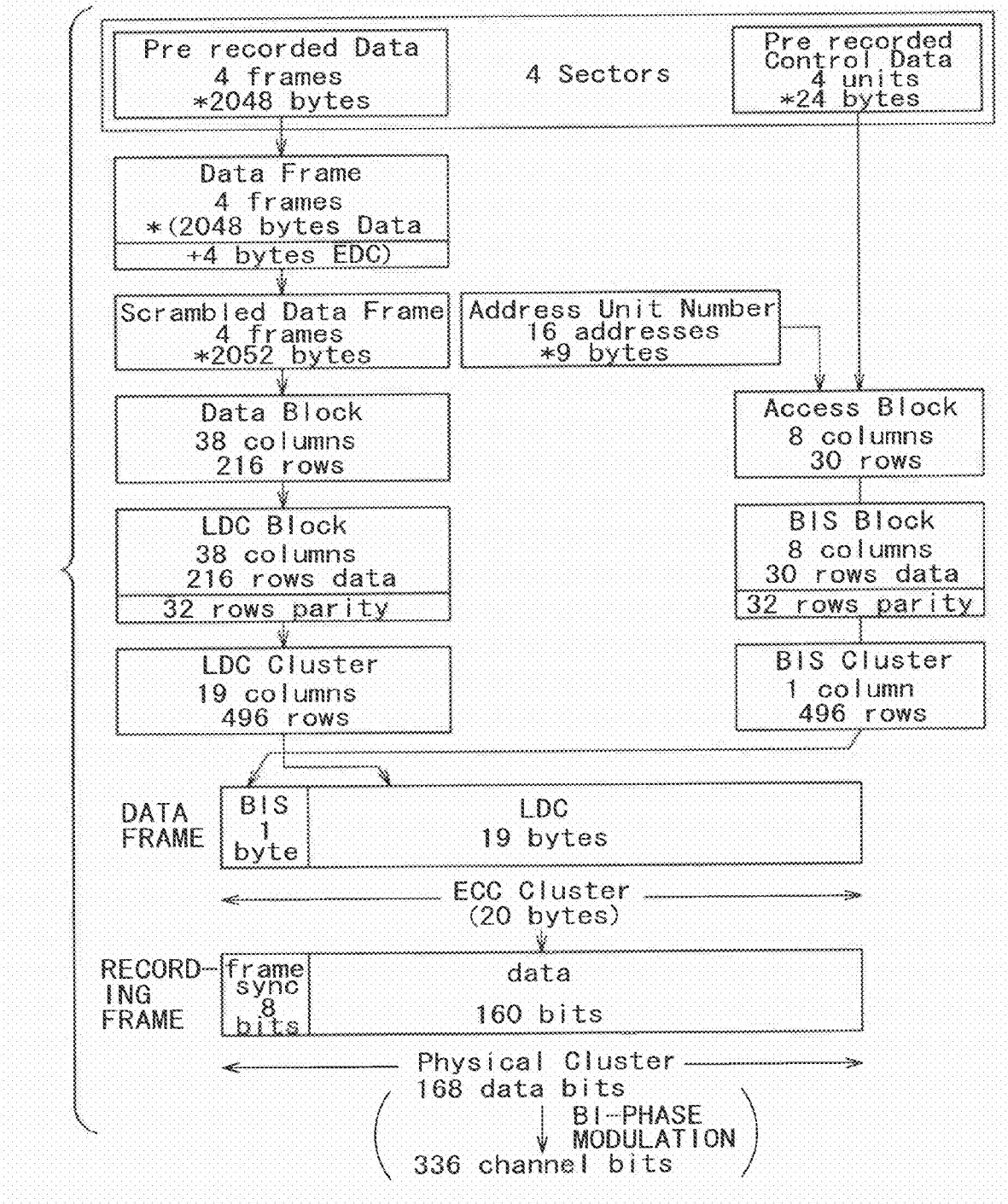
FIG. 27 is an explanatory diagram showing an ECC block of prerecorded information and data frames of the embodiment.

The structure of an ECC block constructed as an 8 K bytes unit of prerecorded data is explained by referring to FIG. 27.

In this case, the ECC data block of shipping-time information physically comprises roughly four sectors.

Thus, the sub-block of prerecorded data includes four frames each occupying a sector having a size of 2 K bytes. The four frames form the sub-block having a size of 8 K bytes (=2,048 bytes/sector×4 sectors).

A 4-byte EDC (Error Detection Code) is added to each sector to form a data-frame unit. 4 data-frame units form a data frame having a size of 2,052 (=2,048+4) bytes/data-frame unit×4 data-frame units. The data frame is further scrambled to produce a scrambled data frame.

Then, the scrambled data frame is subjected to a Reed-Solomon encoding process to generate a data block of 216 rows and 38 columns. 32 rows of parity are further added to the data block to generate an LDC (Long Distance Code) sub-block of (216+32) rows and 38 columns. The LDC sub-block is an RS (248, 216, 33)×38 block, which is composed of the RS (Reed-Solomon) code with a code length of 248 nibbles, a data size of 216 nibbles and a code distance of 33 nibbles and has a block size of 38 code words.

Then, an LDC cluster of 496 rows×19 columns (19 bytes) is formed from the LDC sub-block.

On the other hand, the sub-block of prerecorded control data has a size of 96 bytes (=24 bytes/unit×4 units). Address unit numbers having a size of 144 bytes (9 bytes/address×16 addresses) are added to the sub-block of prerecorded control data to generate an encoding unit having a size of 240 bytes (=96 bytes+144 bytes).

The 240 bytes are subjected to the Reed-Solomon encoding process to produce an access block of 30 rows×8 columns.

Then, 32 rows of parity are added to form a BIS (Burst-Indicating Sub code) sub-block. The code words is 8. The BIS sub-block is an RS (62, 30, 33)×8 block which is composed of the RS (Reed-Solomon) code with a code length of 62 nibbles, a data size of 30 nibbles and a code distance of 33 nibbles and has a block size of eight code words. Then, a BIS cluster of 496 rows×1 column (1 byte) is formed from the BIS sub-block.

The LDC and BIS clusters each includes 498 rows each constituting a data frame. A data frame of the LDC cluster comprises 19 bytes while a data frame of the BIS cluster comprises 1 byte.

Thus, a combined data frame comprises 20 bytes (=19 bytes+1 byte). As shown in the figure, the BIS having a size of 1 byte is placed at the head of the combined data frame. The BIS is followed by the LDC having a size of 19 bytes. 496 rows or 496 data frames each having a size of 20 bytes constitute an ECC block.

Each of the data frames is subjected to a bi-phase modulation process, in which a frame sync is added to generate a recording frame. To put it in detail, the frame sync having a size of 8 bits is inserted into the head of 20-byte (160-bit) data obtained as a result of the bi-phase modulation process to produce a structure consisting of 336 channel bits as a final result of the bi-phase modulation process.

It is to be noted that, since there is no DC component in the case of the bi-phase modulation, it is not necessary to add dcc bits to the data frame.

Such recording frames constitute a data structure to be recorded as a wobbling groove onto a track in the PB zone on the disc.

To put it in detail, the prerecorded information used as shipping-time information is recorded onto the PB zone, which is an area between a circumference with a radius of 22.3 mm and a circumference with a radius of 23.1 mm in the case of a disc having a diameter of 12 cm as described earlier by referring to FIG. 2.

To consider merely a condition requiring that a data block of shipping-time information shall be recorded in the format described above into the PB zone's area not exceeding the circle of a circumference on the disc, the recording density of channel bits can be made less densely to a value of about 0.86 µm. That is to say, the recording density of channel bits can be reduced to about 1/14 times the recording density of user data obtained as a result of the modulation adopting the RLL (1, 7) PP technique. As a result, the S/N ratio of a signal representing the channel bits can be improved.

In addition, also in this case, the ECC format of user data stored as phase change marks uses the same codes as the ECC format of shipping-time information.

Figure 28:
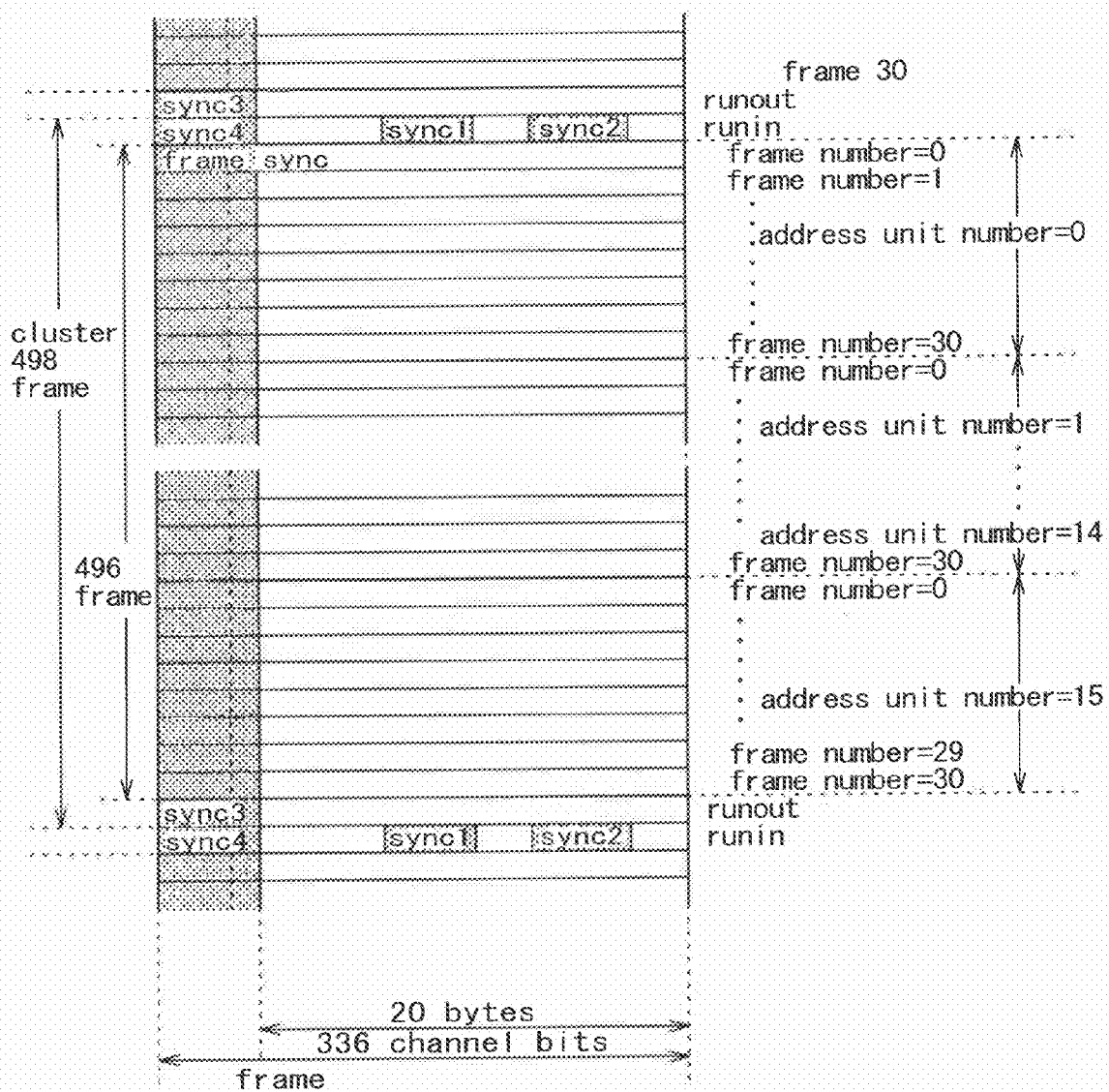
FIG. 28 is an explanatory diagram showing the frame structure of a cluster of prerecorded information in the embodiment.

FIG. 28 is a diagram showing the structure of a cluster comprising data frames.

Each row shown in the figure corresponds to a data frame having a size of 20 bytes as described above. As explained earlier, each data frame is modulated to produce a recording frame having a size of 336 channel bits. 496 rows or 496 frames constitute an ECC block. A run-in frame and a run out frame are added to the ECC block respectively before and after the 496 frames to form the aforementioned cluster having 498 frames. The run-in and run out frames are each used as a linking frame.

In addition, as described above, 16 addresses are each added as an address unit number. The cluster's LDC portion excluding the run-in and run out frames comprises 496 frames, which are divided into 16 groups each having 31 frames, namely, frame 0 to frame 30. The 16 addresses, namely, addresses having unit numbers 0 to 15, are assigned to the 16 groups on a one-to-one basis.

It is to be noted that the prerecorded data's cluster structure shown in FIG. 28 is a typical cluster structure obtained by adding the linking frames in conformity with the cluster structure of user data. The prerecorded data's cluster structure conforming to the cluster structure of user data is amenable to the design of the circuit configuration of a decode processing system employed in the disc drive apparatus.

However, it is not always necessary to design the cluster structure of the prerecorded data (or the shipping-time information) in conformity with the cluster structure of user data if the unconformity does not cause a problem.

Figure 29:
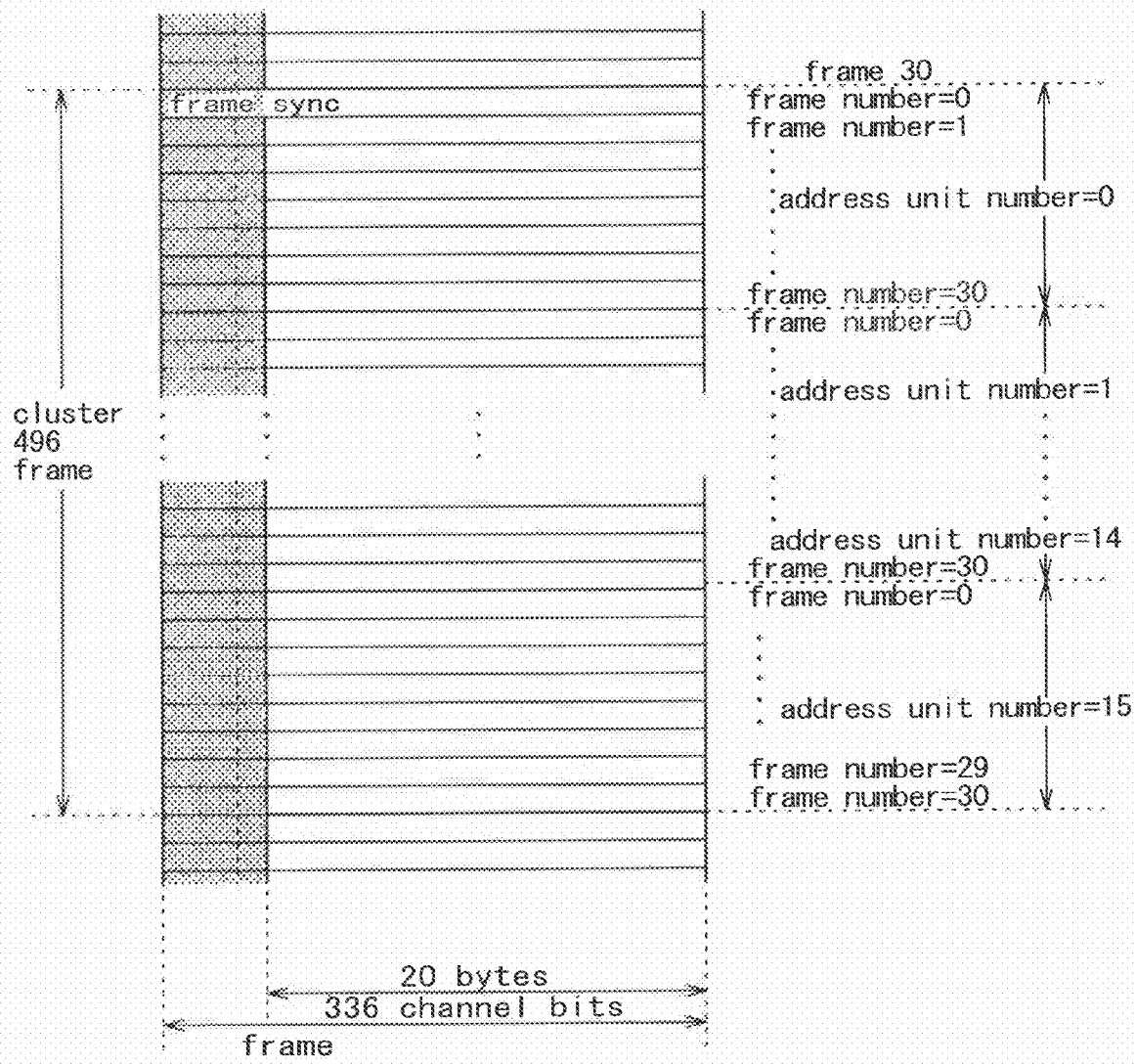
FIG. 29 is an explanatory diagram showing the frame structure of a cluster of prerecorded information in the embodiment.

That is to say, since the shipping-time information is reproduction-only information, which is never rewritten, the linking frames are not required. Thus, with the linking frames eliminated, a cluster comprising only 496 frames as shown in FIG. 29 is also conceivable.

FIGS. 30 and 31 are explanatory diagrams showing frame synchronizations of the 4 K bytes or 8 K bytes ECC block of shipping time information.

As shown in FIG. 30, there are seven types of frame synchronization FS, namely, FS0 to FS6. Each of the frame synchronizations FS0 to FS6 is an out-of-rule pattern of the FM-code modulation. The pattern consists of 16 channel bits. Eight of the 16 channel bits are "11001001" serving as a sync body. The remaining 8 channel bits form a sync ID identifying the frame sync.

Expressed in terms of data bits, for example, the sync ID of the frame sync FS0 is 3 bits "000" and 1 parity bit, which is 0 in this case. These 3 data bits and the parity bit are subjected to an FM code modulation process to result in the 8 channel bits "10101010".

The 8 channel bits for each of the other frame synchronizations FS1 to FS7 are obtained in the same way as the frame sync FS0. That is to say, the 3 data bits "000" and 1 parity bit of each frame sync are subjected to an FM code modulation process to result in 8 channel bits for the frame sync.

Thus, the code distance of the bit data becomes 2 nibbles or longer so that a 1-bit error will not cause a sync ID to be interpreted as another sync ID.

In an operation to record a frame sync FS, the frame sync FS is subjected to an NRZI conversion before being recorded.

FIG. 31 is a diagram showing mapping of frame synchronizations.

As described above, in the case of an ECC block built as a 4 K bytes unit, one ECC block including 248 frames is divided into eight groups each having 31 frames. In the case of an ECC block built as a 8 K bytes unit, on the other hand, one ECC block including 496 frames is divided into 16 groups each having 31 frames. In either case, an ECC block is divided into groups each having 31 frames.

Frame numbers 0 to 30 are assigned to respectively the 31 frames of each group. For frame number 0, a FS0 is used as a special frame sync not used for other frame numbers. Thus, the frame sync FS0 allows the beginning of an address frame to be detected and, hence, address synchronization to be established.

The frame synchronizations FS1 to FS6 are assigned to frame numbers 1 to 30 as shown in FIG. 31. This assignment of the frame synchronizations FS1 to FS6 allows the beginning of an address frame to be detected even if the frame sync FS0 is not detected.

6. Disc Drive Apparatus

The following description explains a disc drive apparatus capable of recording and reproducing data onto and from the disc described above.

Figure 32:
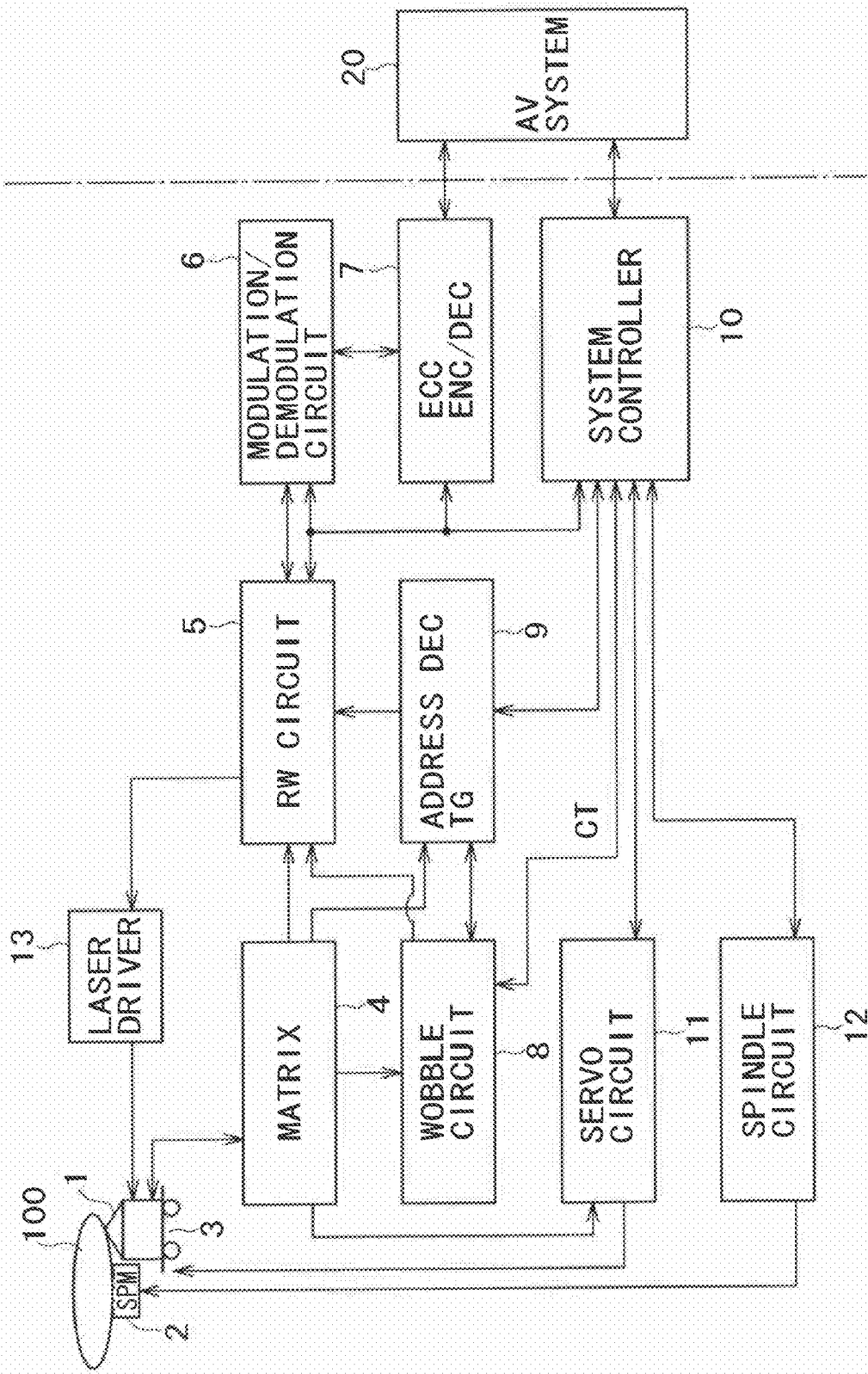
FIG. 32 is a block diagram showing a typical configuration of a disc drive apparatus provided by the embodiment.

FIG. 32 is a block diagram showing the configuration of the disc drive apparatus. A disc 100 shown in FIG. 32 is the disc implemented by the embodiment described above.

The disc 100 is mounted on a turntable not shown in the figure. In recording and reproduction operations, the disc 100 is driven into rotation by a spindle motor 2 at a constant linear velocity (CLV).

Then, an optical pickup 1 reads out ADIP information embedded in the RW zone of the disc 100 as a wobbling shape of a groove track. In addition, the optical pickup 1 also reads out prerecorded information embedded in the PB zone of the disc 100 as a wobbling shape of a groove track.

In a recording operation, the optical pickup 1 records user data into the RW zone as phase change marks. In a reproduction operation, on the other hand, the optical pickup 1 reads out the recording phase change marks.

The optical pickup 1 includes a laser diode, a photodetector, an objective lens and an optical system, which is not shown in the figure. The laser diode serves as a laser-beam source. The photodetector detects a reflected beam. The objective lens serves as an output end of a laser beam. The optical system makes the laser beam radiate the recording surface of the disc 100 by way of the objective lens and leads the reflected beam to the photodetector.

The laser diode outputs the so-called blue-color laser having a wavelength of 405 nm. The optical system has an NA of 0.85.

The objective lens is held in the optical pickup 1 by a 2-shaft mechanism in such a way that the lens can be moved in tracking and focus directions. The entire optical pickup 1 itself can be moved by a thread mechanism 3 in the radial direction of the disc 100. The laser diode employed in the optical pickup 1 is driven by a drive signal, that is, by a drive current, output by a laser driver 13 to generate a laser.

Information conveyed by a beam reflected from the disc 100 is detected by the photodetector, which converts the information into an electrical signal and outputs the signal to a matrix circuit 4. The matrix circuit 4 includes a current-to-voltage conversion circuit and a matrix-processing/amplification circuit. The current-to-voltage conversion circuit converts currents output by a plurality of a light-receiving devices each serving as a photodetection means into a voltage. The matrix-processing/amplification circuit carries out matrix processing on the voltage received from the current-to-voltage conversion circuit to generate required signals such as a high-frequency signal (or a reproduced-data signal), a focus error signal and a tracking error signal. The high-frequency signal represents reproduced data. The focus error signal and the tracking error signal are used for execution of servo control. In addition, the matrix-processing/amplification circuit also generates a signal representing a wobbling shape of the groove, that is, a push-pull signal obtained as a result of detecting the wobbling shape of the groove.

The matrix circuit 4 outputs the reproduced-data signal to a reader/writer circuit 5, the focus error signal as well as the tracking error signal to a servo circuit 11 and the push-pull signal to a wobble circuit 8.

The reader/writer circuit 5 carries out processes on the reproduced-data signal to reproduce data read out as phase change marks and outputs the data to a modulation/demodulation circuit 6. The processes include binary conversion processing and reproduction clock generation processing based on a PLL technique.

The modulation/demodulation circuit 6 includes a functional member serving as a decoder in a reproduction operation and a functional member serving as an encoder in a recording operation. In a reproduction operation, the modulation/demodulation circuit 6 carries out a process to demodulate run-length limited codes on the basis of a reproduction clock signal as a decoding process.

An ECC encoder/decoder 7 carries out an ECC encoding process to add error correction codes to data to be recorded in a recording operation. In a reproduction operation, on the other hand, the ECC encoder/decoder 7 carries out an ECC decoding process to correct errors of reproduced data. To put it in detail, in a reproduction operation, data demodulated by the modulation/demodulation circuit 6 is stored in an internal memory. The data stored in the internal memory is then subjected to processes such as error detection/correction processing and de-interleave processing to generate reproduced data.

The reproduced data completing the ECC decoding process carried out by the ECC encoder/decoder 7 is finally read out to be transferred to an AV (Audio-Visual) system 20 in accordance with a command issued by a system controller 10.

The push-pull signal output by the matrix circuit 4 as a signal representing the wobbling shape of the groove is processed by the wobble circuit 8. To be more specific, in the wobble circuit 8, the push-pull signal conveying ADIP information is subjected to an MSK demodulation process to generate a data stream composing an ADIP address as a result of demodulation. The data stream is supplied to an address decoder 9.

The address decoder 9 decodes the data stream received thereby to produce an address value, and supplies the address value to the system controller 10.

The wobble circuit 8 also carries out a clock generation process based on a PLL technique on the push-pull signal representing the wobbling shape of the groove to generate a clock signal. For example, the generated clock signal is an encoding clock signal supplied to a variety of components to be used in a recording operation.

The push-pull signal output by the matrix circuit 4 to the wobble circuit 8 as a signal representing the wobbling shape of the groove is a push-pull signal conveying prerecorded information read out from the PB zone. In the wobble circuit 8, such a push-pull signal is subjected to a band-pass filtering process and an FM-code demodulation process before being supplied to the reader/writer circuit 5 as an FM code stream. In the reader/writer circuit 5, the FM code stream is subjected to a waveform reshaping process before being supplied to the ECC encoder/decoder 7, which carries out ECC decoding and de-interleaving processes to extract prerecorded information (that is, shipping-time information). The extracted shipping-time information is finally supplied to the system controller 10.

The system controller 10 carries out processing such as various setting and copy-right protection based on read-out prerecorded information.

The system controller 10 also outputs a control signal CT to the wobble circuit 8. The control signal CT drives the wobble circuit 8 to switch processing from a process to demodulate ADIP information to a process to demodulate shipping-time information or vice versa.

Figure 33:
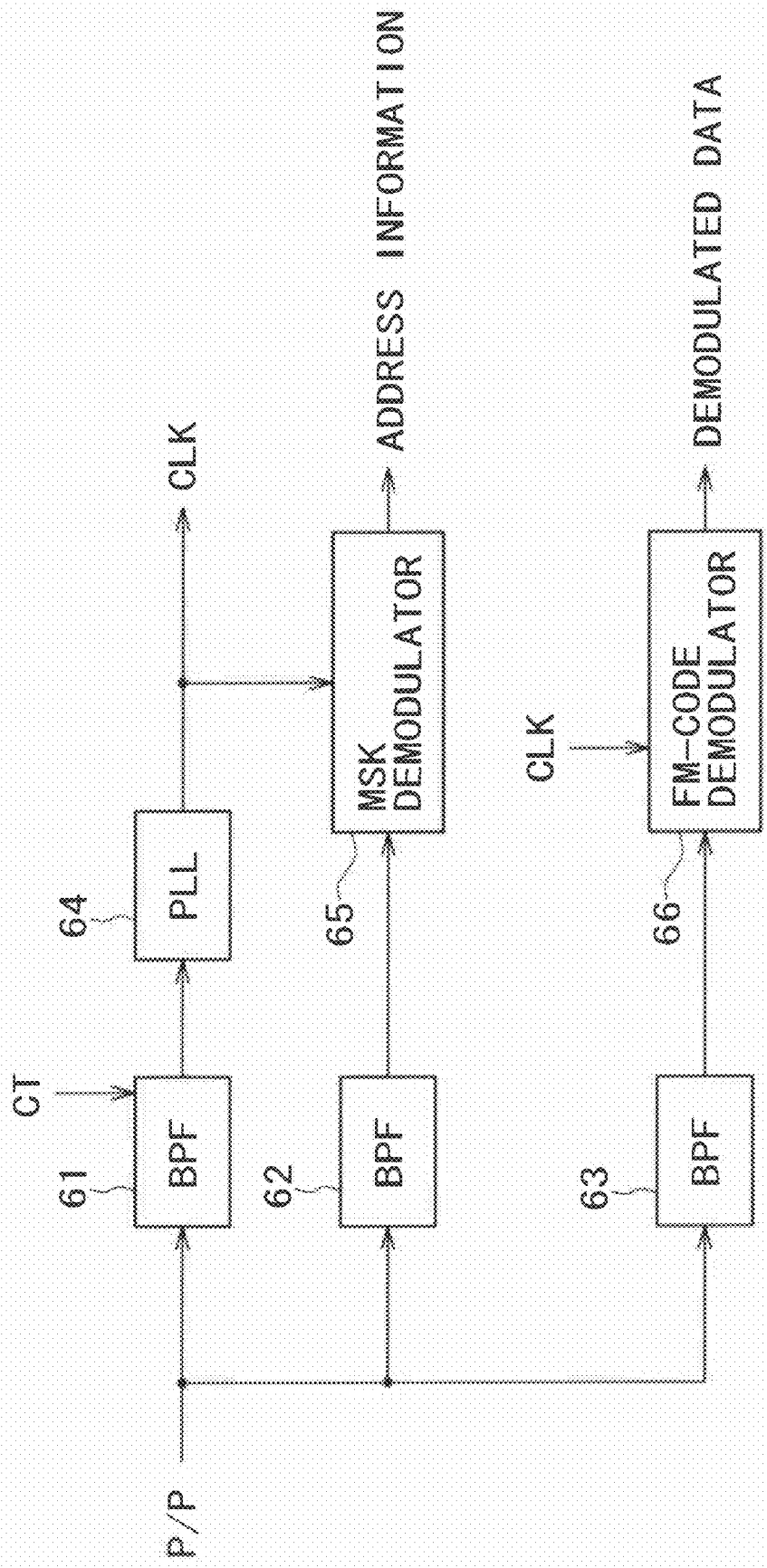
FIG. 33 is a block diagram showing a typical configuration of a wobble circuit employed in the disc drive apparatus provided by the embodiment.

FIG. 33 is a block diagram showing a typical configuration of the wobble circuit 8.

The push-pull signal PP received from the matrix circuit 4 is passed on to a PLL unit 64 by way of a band-pass filter 61. Typically, the PLL unit 64 carries out a binary conversion process on the push-pull signal PP's carrier component passed on by the band-pass filter 61 prior to a PLL process to generate a clock signal CLK based on the wobbling shape of the groove. As mentioned above, the push-pull signal PP represents the wobbling shape of the groove.

As described earlier by referring to FIG. 3, however, the wobbling period of the RW zone is 69 T while the wobbling period of the PB zone is 36 T. That is to say, the wobbling carrier frequency of the RW zone is different from that of the PB zone.

For this reason, the system controller 10 outputs the control signal CT for switching the band-pass filter 61 from a pass band for the operation to record or reproduce data onto or from the RW zone to a pass band for the operation to reproduce data from the BP zone or vice versa.

As a result, the PLL unit 64 generates the clock signal CLK with a frequency corresponding to the wobbling period of 69 T in an operation to record or reproduce data onto or from the RW zone or a frequency corresponding to the wobbling period of 36 T in an operation to reproduce data from the PB zone.

The push-pull signal PP received from the matrix circuit 4 is also supplied to a band-pass filter 62 for extracting a component having a carrier frequency and a component having a frequency 1.5 times the carrier frequency. These components are supplied to an MSK demodulator 65. The MSK demodulator 65 carries out MSK demodulation processing by performing, among other processes, a process to multiply an MSK-modulated wave by the carrier component and a filtering process. As result of the MSK demodulation processing, the MSK demodulator 65 outputs modulated data conveying an ADIP address to the address decoder 9, which decodes the data to produce the value of the ADIP address. It is to be noted that the MSK demodulation processing is based on the clock signal CLK having the frequency corresponding to the wobbling period of 69 T.

The push-pull signal PP received from the matrix circuit 4 is also supplied to a band-pass filter 63 for extracting a bi-phase-modulated (FM-modulated) signal component to be supplied to an FM-code demodulator 66, which then demodulates the signal component. A signal obtained as a result of demodulation is supplied to the reader/writer circuit 5. It is to be noted that the MSK demodulation processing is based on the clock signal CLK having the frequency corresponding to the wobbling period of 36 T.

As described above, the system controller 10 outputs the control signal CT to the wobble circuit 8 having such a configuration, controlling an operation to switch the clock signal CLK from the frequency corresponding to the wobbling period of 36 T to the frequency corresponding to the wobbling period of 69 T or vice versa. That is to say, in an operation to reproduce data from the PB zone of the disc 100, the FM-code demodulator 66 is driven to carry out a demodulation process for reproducing shipping-time information. In an operation to reproduce data from the RW zone of the disc 100, on the other hand, the MSK demodulator 65 is driven to carry out a demodulation process for reproducing an ADIP address.

In a recording operation of the disc drive apparatus shown in FIG. 32, data to be recorded is received from the AV system 20. The data to be recorded is stored in a buffer employed in the ECC encoder/decoder 7.

The ECC encoder/decoder 7 encodes the buffered data to be recorded by carrying out processing including a process to add error correction codes, an interleaving process, and a process to add sub codes. That is to say, the ECC encoder/decoder 7 carries out the encoding processes to generate an ECC block explained earlier by referring to FIG. 4.

Then, the data completing the ECC encoding processes is subjected to a modulation process adopting an RLL (1, 7) PP technique in the modulation/demodulation circuit 6 before being supplied to the reader/writer circuit 5.

An encoding clock signal to serve as a reference clock signal for these encoding processes carried out in a recording operation is a clock signal generated from the push-pull signal representing the wobbling shape of the groove as described above.

In the reader/writer circuit 5, the encoding processes' result representing data to be recorded is subjected to recording compensation processing including a process to finely adjust a recording power to a value optimum for characteristics of a recording layer on the disc 100, the shape of the spot of the laser beam, the recording linear velocity and the like, and a process to adjust the waveform of laser drive pulses. Then, the data to be recorded is supplied to the laser driver 13 as the laser drive pulses.

The laser driver 13 passes on the laser drive pulses to the laser diode employed in the optical pickup 1, to drive the diode to generate a laser beam. As a result, pits (or phase change marks) representing the data to be recorded are created on the disc 100.

It is to be noted that the laser driver 13 has the so-called APC (Auto Power Control) circuit for controlling a laser output at a constant level independent of the ambient temperature and other factors by monitoring the power of the laser output from an output generated by a laser-power-monitoring detector provided in the optical pickup 1. To put it in detail, the APC circuit adjusts the laser output to a target value set for a recording or reproduction operation. The target values of the laser outputs for recording and reproduction operations are set by the system controller 10.

The servo circuit 11 generates a variety of servo drive signals such as focus, tracking, and thread signals based on the focus error signal and the tracking error signal, which are received from the matrix circuit 4, carrying out servo operations.

To put it in detail, the servo circuit 11 generates a focus drive signal and a tracking drive signal in accordance with the focus error signal and the tracking error signal to drive respectively a focus coil and a tracking coil, which are employed in the two-shaft mechanism of the optical pickup 1. Thus, the optical pickup 1, the matrix circuit 4, the servo circuit 11, and the two-shaft mechanism form a tracking servo loop and a focus servo loop.

In addition, the servo circuit 11 turns off the tracking servo loop and outputs a jump drive signal to carry out a track jump operation in accordance with a track jump command received from the system controller 10.

Furthermore, the servo circuit 11 generates a thread drive signal based on a thread error signal obtained as a low-frequency component of the tracking error signal and an access execution control signal received from the system controller 10. The thread drive signal drives the thread mechanism 3. The thread mechanism 3 is a mechanism including a main shaft for holding the optical pickup 1, a thread motor, and a transmission gear, which are not shown in the figure. The thread motor is driven in accordance with the thread drive signal to slide the optical pickup 1 by a required distance.

The spindle servo circuit 12 executes control to rotate the spindle motor 2 at a CLV.

As information on the present revolution speed of the spindle motor 2, the spindle servo circuit 12 receives a clock signal obtained as a result of a PLL process carried out on the signal representing the wobbling shape of the groove. The spindle servo circuit 12 compares the information on the present revolution speed with information on a predetermined reference CLV to generate a spindle error signal.

In addition, in an operation to reproduce data, a reproduction clock signal generated by a PLL unit employed in the reader/writer circuit 5 (that is, a clock signal serving as a reference signal in a decoding process) is used as information on the revolution speed of the spindle motor 2. By comparing this information on the revolution speed with information on the CLV reference speed, a spindle error signal can also be generated.

Then, the spindle servo circuit 12 outputs a spindle drive signal in accordance with the spindle error signal to realize CLV rotation of the spindle motor 2.

In addition, the spindle servo circuit 12 may also generate a spindle drive signal in accordance with the a spindle kick/brake control signal received from the system controller 10 in order to implement operations such as an activation, a termination, an acceleration, a deceleration, and others of the spindle motor 2.

The variety of operations carried out by the servo system and the recording/reproduction system as described above are controlled by the system controller 10 based on a microcomputer.

The system controller 10 performs various kinds of processing in accordance with commands issued by the AV system 20.

When the AV system 20 issues a write command for storing data to the system controller 10, for example, the system controller 10 first of all moves the optical pickup 1 to an address at which the data is to be written. Then, the ECC encoder/decoder 7 and the demodulation circuit 6 are driven to carry out the encoding processes on the data received from the AV system 20. Examples of the data include video and audio data conforming to any of a variety of techniques such as the MPEG2 technique. Finally, laser drive pulses generated by the reader/writer circuit 5 are supplied to the laser driver 13 in order to record the data.

In addition, when the AV system 20 issues a read command to the system controller 10, making a request for a transfer of certain data such as MPEG2 video data recorded on the disc 100 to the AV system 20, for example, a seek operation is first of all controlled with the read command's specified address set as a target from which the data is to be transferred. That is to say, a seek command specifying the address is issued to the servo circuit 11 to drive the optical pickup 1 into an operation of making an access to the target indicated by the address specified in the seek command.

Then, operation control is executed to transfer the data in a segment specified in the read command to the AV system 20. To put it in detail, the requested data is read out from the disc 100, subjected to processes such as decoding and buffering carried out by the reader/writer circuit 5, the demodulation circuit 6, and the ECC encoder/decoder 7 and supplied to the AV system 20.

It is to be noted that, in operations to record and reproduce data as phase change marks onto and from the disc 100, the system controller 10 controls the recording and reproduction operations by using an ADIP address detected by the wobble circuit 8 and the address decoder 9.

In addition, the system controller 10 gives a command to the ECC encoder/decoder 7 to carry out an error correction decoding process on an ECC block having the structure explained earlier by referring to FIG. 4.

Furthermore, at a predetermined time such as a time the disc 100 is mounted on the disc drive apparatus, the system controller 10 executes control to read out shipping-time information (that is, prerecorded information) recorded as a wobbling shape of the groove in the PB zone on the disc 100.

In this case, first of all, control of a seek operation with the PB zone set as a target is executed. That is to say, a command is issued to the servo circuit 11 to move the optical pickup 1 in an access to the innermost circumference of the disc 100.

Then, the optical pickup 1 is driven to move along a reproduction trace to obtain a push-pull signal represented by a reflected beam information. Finally, the wobble circuit 8, the reader/writer 5, and the ECC encoder/decoder 7 are driven to carry out decoding processes to obtain the reproduced data as prerecorded information.

It is to be noted that the system controller 10 also gives a command to the ECC encoder/decoder 7 to carry out an error correction decoding process on an ECC block having the structure explained earlier by referring to FIG. 15 or FIG. 27.

In addition, the system controller 10 also carries out processes such as processing to set a laser power and copy protection processing on the basis of the prerecorded information read out from the disc 100 as described above.

It is to be noted that, in an operation to reproduce prerecorded information from the PB zone, the system controller 10 controls accesses and reproductions by using address information included in a BIS cluster read out as the prerecorded information.

By the way, in the typical configuration shown in FIG. 32, the AV system 20 is connected to the disc drive apparatus 30. It is to be noted, however, that the disc drive apparatus provided by the present invention can also be connected to a personal computer or another piece of equipment.

In addition, the disc drive apparatus provided by the present invention can also be connected to no piece of equipment. In this case, the disc drive apparatus is provided with an operation unit and a display unit. The configuration of a member serving as an interface for inputting and outputting data is also different from that shown in FIG. 32. In the case of such a standalone disc drive apparatus, recording and reproduction processing is carried out in accordance with operations performed by the user, and a terminal unit for inputting and outputting various kinds of data needs to be provided.

It is needless to say that there are many conceivable configurations other than the typical configuration. For example, implementations of the disc drive apparatus provided by the present invention as a recording-only apparatus and a reproduction-only apparatus are also thinkable.

7. Disc-Manufacturing Method

The following description explains a method of manufacturing the disc provided by the present invention.

Processes of manufacturing the disc are classified into two big categories, namely, the so-called mastering process and the so-called replication process. The mastering process is a series of process up to completion of a metallic master disc called a stamper to be used in the replication process. On the other hand, the replication process is a process using the stamper to mass-produce optical discs as copies of the stamper.

To put it concretely, in the mastering process, a photo resist material is applied as a light-sensitive film to a ground glass substrate. Then, the so-called cutting process is carried out to create pits and grooves by adoption of a technique of exposure of this light-sensitive film to a laser beam.

In the case of this embodiment, the cutting process is carried out to create a groove having a wobbling shape based on prerecorded information in a portion corresponding to the PB zone on the innermost-circumference side of the disc and a groove having a wobbling shape based on ADIP addresses in a portion corresponding to the RW zone of the disc.

The prerecorded information to be recorded in the PB zone is prepared in processing called a pre-mastering process.

As the cutting process is completed, predetermined processing such as a development process is carried out. After the development process, information is transferred to the metallic surface of the glass substrate by adoption of an electrocasting technique or the like to create a stamper, which will be required later in making discs as copies of the stamper.

In the replication process following the mastering process, a final disc product is made by carrying out processing including the steps of transferring information to a resin substrate by adoption of typically an injection method using this stamper, generating a reflective film on the resin substrate, and fabricating the resin substrate into the required shape of the disc.

Figure 34:
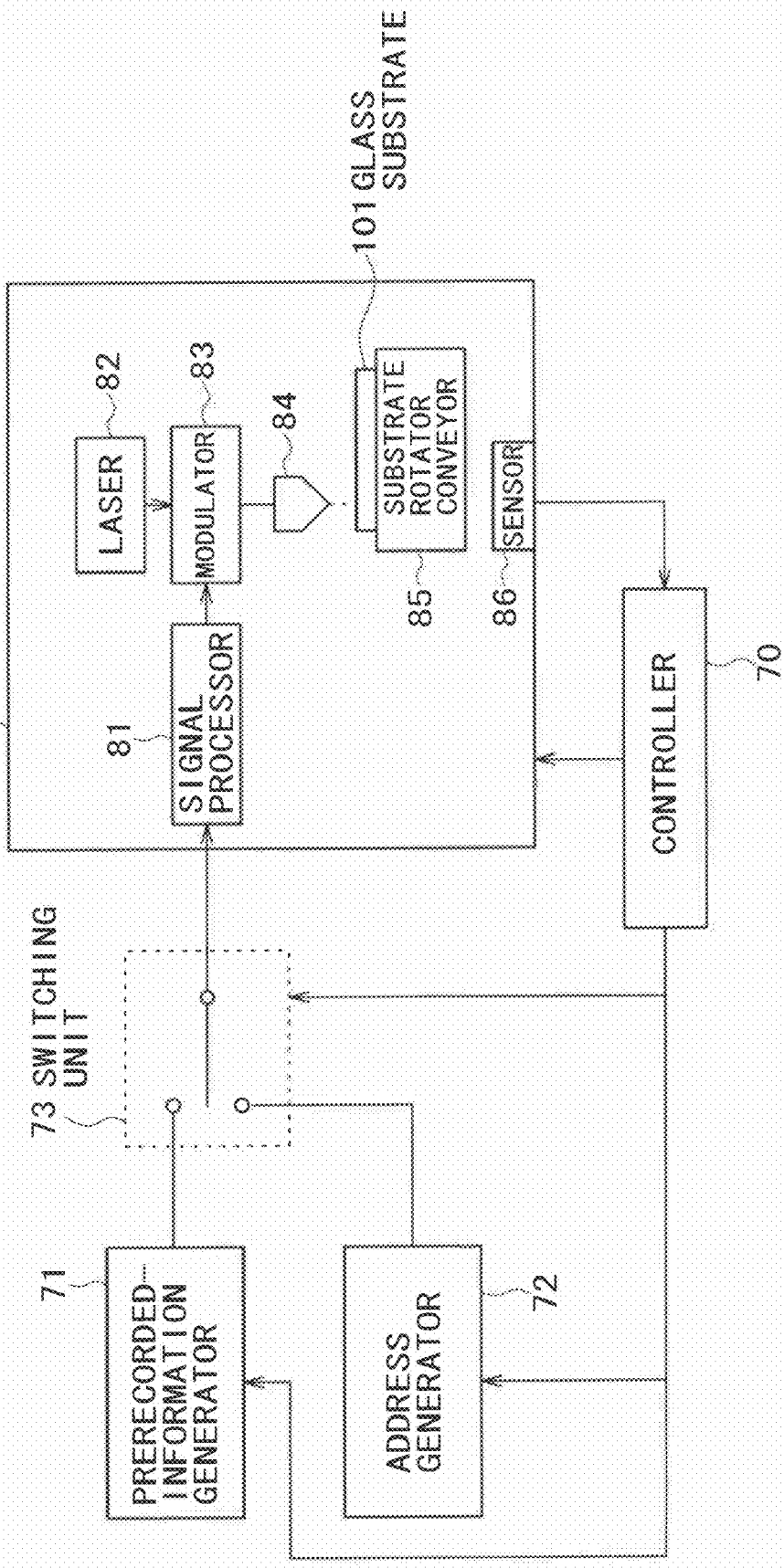
FIG. 34 is a block diagram showing a typical configuration of a cutting apparatus for manufacturing the disc implemented by the embodiment.

As shown in FIG. 34, a cutting apparatus for carrying out the cutting process includes a prerecorded-information generator 71, an address generator 72, a switching unit 73, a cutting unit 74 and a controller 70.

The prerecorded-information generator 71 outputs the prerecorded information prepared in the pre-mastering process. The address generator 72 generates absolute addresses sequentially.

The cutting unit 74 includes optical-unit components 82, 83, and 84, a substrate rotator/conveyor 85, a signal processor 81, and a sensor 86. The optical unit consisting the components 82, 83, and 84 radiates a laser beam to the glass substrate 101 covered by a photo-resist material to do the cutting process. The substrate rotator/conveyor 85 drives the glass substrate 101 into rotation and slides the substrate 101 to convey it from a place to another. The signal processor 81 converts input data into data to be recorded and supplies the data to be recorded to the optical unit. The sensor 86 outputs a signal indicating whether, at the present location, the substrate rotator/conveyor 85 places the cutting position in the PB or RW zone to the controller 70.

The components 82, 83, and 84 employed in the optical unit are a laser beam source, a modulator, and a cutting head respectively. The laser beam source 82 is typically a light source for generating an He—Cd laser beam. The laser beam radiated by the laser beam source 82 is modulated by the modulator 83 on the basis of the data to be recorded. The cutting head 84 converges a modulated beam output by the modulator 83 and radiates the converged beam to the photo-resist surface of the glass substrate 101.

The modulator 83 includes an AOM (Acoustic Optical Modulator) and an AOD (Acoustic Optical Deflector). The AOM turns on and off the beam radiated by the laser beam source 82. The AOD deflects the beam radiated by the laser beam source 82 in accordance with a wobbling generation signal.

The substrate rotator/conveyor 85 includes a rotation motor, a speed detector FG, a slide motor, and a servo controller. The rotation motor drives the glass substrate 101 into rotation. The speed detector FG detects a revolution speed of the rotation motor. The slide motor slides the glass substrate 101 in the radial direction of the glass substrate 101. The servo controller adjusts control quantities including the revolution speed of the rotation motor, the revolution speed of the slide motor, and the tracking position of the cutting head 84.

The signal processor 81 carries out processing on prerecorded information and address information, which are received through the switching unit 73. The processing includes a formatting process for adding data such as error correction codes to the prerecorded information and the address information to create formatted data, and a predetermined process carried out on the formatted data to create a modulating signal, that is, the signal representing the prerecorded information and the address information.

In addition, the signal processor 81 also carries out processing to drive the AOM (Acoustic Optical Modulator) and the AOD (Acoustic Optical Deflector), which are employed in the modulator 83, on the basis of the modulating signal by outputting the signal to the modulator 83.

During the cutting process, in the cutting unit 74, the substrate rotator/conveyor 85 drives the glass substrate 101 into rotation at a constant linear velocity and, while the glass substrate 101 is being driven as it is, slides the glass substrate 101 by a distance equal to a predetermined track pitch in order to create a spiral track on the surface of the glass substrate 101.

At the same time, the laser beam radiated by the laser beam source 82 is modulated by the modulator 83 into a modulated signal based on the modulating signal received from the signal processor 81, and the modulated signal is radiated to the photo resist surface of the glass substrate 101 by way of the cutting head 84. As a result, the photo resist is cut out due to a light-sensitivity effect to form a groove with a wobbling shape representing the modulating signal.

The controller 70 controls the cutting operation of the cutting unit 74 and, while monitoring a signal generated by the sensor 86, controls the prerecorded-information generator 71, the address generator 72 and the switching unit 73.

At the beginning of the cutting process, the controller 70 requests the cutting unit 74 to take the slide position of the substrate rotator/conveyor 85 as an initial value so that the cutting head 84 starts the radiation of the laser beam from the innermost circumference. Then, the controller 70 drives the cutting unit 74 to start an operation to drive the glass substrate 101 into rotation at a CLV and an operation to slide the glass substrate 101 by a distance equal to a track pitch of 0.35 μm in order to create a groove.

In this state, the prerecorded-information generator 71 is driven to generate prerecorded information used as shipping-time information and supply the information to the signal processor 81 by way of the switching unit 73. In addition, the laser beam source 82 is driven to start the operation to output a laser beam whereas the modulator 83 is driven to modulate the laser beam on the basis of the modulating signal received from the signal processor 81 in order to carry out a cutting process to create a groove on the glass substrate 101. The modulating signal is an FM code modulation signal representing the prerecorded information. In this way, a cutting process is carried out to create a groove like the one shown in FIG. 3B in an area to be used as the PB zone.

As the signal generated by the sensor 86 indicates that the cutting process to create a groove has reached an area to be used as the RW zone, completing the creation of the groove in the area to be used as the PB zone, the controller 70 changes over the switching position of the switching unit 73 from a pole for the prerecorded-information generator 71 to a pole for the address generator 72, and drives the address generator 72 to sequentially generates addresses.

In addition, the substrate rotator/conveyor 85 is driven to reduce the sliding speed of the glass substrate 101 so that a groove having a track pitch of 0.32 μm is created on the surface of the glass substrate 101.

In this state, the address information generated by the address generator 72 is supplied to the signal processor 81 by way of the switching unit 73. In addition, the modulator 83 is driven to modulate the laser beam generated by the laser beam source 82 on the basis of the modulating signal received from the signal processor 81 in order to carry out a cutting process to create a groove on the glass substrate 101 by using the modulated laser beam. In this case, however, the modulating signal is an MSK modulation signal representing the address information.

In this way, a cutting process is carried out to create a groove like the one shown in FIG. 3A in an area to be used as the RW zone.

As the signal generated by the sensor 86 indicates that the cutting process to create a groove has reached the end of a lead-out zone, completing the creation of the groove in the area to be used as the RW zone, the controller 70 ends the cutting process.

By carrying out the operations described above, an exposure portion corresponding to the wobbling grooves in the PB and RW zones on the glass substrate 101 is created.

Thereafter, processing such as a development process and an electrocasting process is carried out to produce a stamper to be used for mass production of the disc described above.

8. Modified Versions

The description given so far explains an embodiment implementing a disc as well as the embodiment's disc drive apparatus and disc-manufacturing method. However, the scope of the present invention is not limited to the embodiment. That is to say, it is possible to make a variety of changes not deviating from the range of the present invention to the embodiment.

In the embodiment, while user data is recorded as phase change marks, any technique of recording user data can be adopted as long as the technique is of the rewritable or write-once type. For example, the present invention can also be applied to a disc or a disc drive apparatus adopting the magneto-optical recording technique or the dye recording technique.

In addition, in the embodiment, shipping-time information is subjected to a bi-phase modulation process. However, the shipping-time information can also be subjected to the same modulation process as user data. In the case of the embodiment described above, for example, since the RLL (1, 7) PP technique is adopted in a modulation process for user data, the shipping-time information can also be subjected to a modulation process adopting the RLL (1, 7) PP technique.

What is claimed is:

1. A disc recording medium comprising:
   a data area with a first wobbled groove recorded in advance, in or adjacent to first data configured to be recorded by marks, and in which a second wobbled groove is formed to represent second data; and
   a reproduction-only area, in which a third wobbled groove is formed to represent third data, wherein
   said first data is configured to be recorded by adoption of a first modulation technique, corresponding to a first error-correction block structure;
   said second wobbled groove is wobbled by adoption of a second modulation technique; and
   said third wobbled groove is wobbled by adoption of a third modulation technique, including a second error-correction block structure based on a first correction coding for said first error-correction block structure.

2. A disc recording medium according to claim 1: wherein:
   said first error-correction block structure and said second error-correction block structure are decoded using a same error-correction method.

3. A disc recording medium according to claim 1 wherein:
   said first error-correction block structure comprises a first frame structure, a first sub-block structure comprising first error correction codes and a second sub-block structure comprising second error correction codes; and
   said second error-correction block structure comprises a second frame structure, a third sub-block structure comprising first error correction codes and a fourth sub-block structure comprising second error correction codes.

4. A disc recording medium according to claim 1 wherein:
   said second data and said third data are recorded along the first wobbled groove;
   said first data is recorded as a rewritable recording technique of recording phase change marks onto a track implemented as or adjacent to said first wobbled groove.

5. A disc recording medium according to claim 1 wherein:
   said second data and said third data are recorded along the first wobbled groove;
   said first data is recorded as a rewritable recording technique of recording magneto-optical marks onto a track implemented as the first wobbled groove.

6. A disc recording medium according to claim 1 wherein said third data recorded onto said reproduction-only area includes address information.

7. A disc recording medium according to claim 1 wherein:
   a recording density of said third data is made less dense than a recording density of said first data;
   a number of correction codes in said first error-correction block structure is set at a multiple of m; and
   a number of correction codes in said second error-correction block is set at n/m times the number of correction codes in said first error-correction block, so that
   a data-piece count in said second error-correction block structure is also n/m times a data-piece count in said first error-correction block structure, where notations n and m each denote a positive integer.

8. A disc recording medium according to claim 7 wherein the value of m is a power of two.

9. A disc recording medium according to claim 7 wherein the value of n is 1.

10. A disc recording medium according to claim 3 wherein:
    a recording density of said third data is made less dense than a recording density of said first data;
    a number of first correction codes composing the first sub-block structure is set at a multiple of m; and
    a number of first correction codes composing a third sub-block structure is set at n/m times the number of correction codes composing said first sub-block structure, so that
    a data-piece count in said third sub-block structure is also n/m times a data-piece count in said first sub-block structure where notations n and m each denote a positive integer, whereas
    a number of second correction codes composing a second sub-block structure is set at a multiple of p; and
    a number of second correction codes composing a fourth sub-block is set at q/p times the number of correction codes composing said second sub-block structure, so that a data-piece count in said fourth sub-block is also q/p times a data-piece count in second sub-block where notations p and q each denote a positive integer.

11. A disc recording medium according to claim 10 wherein the value of m is a power of two.

12. A disc recording medium according to claim 10 wherein the value of n is 1.

13. A disc recording medium according to claim 1 wherein respective block lengths of said first error-correction block structure and said second error-correction block structure are each set at such a value that blocks can be recorded in a circle of said track on said disc.

14. A disc recording medium according to claim 1 wherein a number of frames in said first error-correction block structure and a number of frames in said second error-correction block structure are each set at a value about equal to a data-piece count in said error correction codes.

15. A disc recording medium according to claim 3 wherein a number of frames in said first error-correction block structure and a number of frames in said second error-correction block structure are each set at a value at least about equal to a sum of a number of first correction code words and a number of second correction code words.

16. A disc recording medium according to claim 3 wherein said second frame structure includes a synchronization signal in a data portion corresponding to said third sub-block structure and also includes an address unit number in a data portion corresponding to said fourth sub-block structure.

17. A disc recording medium according to claim 3 wherein:
said second frame structure includes a synchronization signal in a data portion corresponding to said third sub-block structure;
said synchronization signal is from one of a plurality of different signals so that consecutive second frames are different each other.

18. A disc recording medium according to claim 3 wherein:
said second frame structure includes a synchronization signal in a data portion corresponding to said third sub-block structure; and
said synchronization signal includes:
a unique synchronization pattern comprising a bit string never obtained as a result of a modulation process adopting said third modulation technique;
a synchronization ID obtained as a result of a modulation process adopting said third modulation technique; and
a parity field for increasing a code distance between said synchronization signals.

19. A disc recording medium according to claim 1 wherein a frame for linking is added to said first error-correction block structure as well as to said second error-correction block structure.

20. A disc recording medium according to claim 1 wherein a frame for linking is added to said first error-correction block structure, but no frame for linking is added to said second error-correction block structure.

21. A disc recording medium according to claim 1 wherein said first modulation technique described above is an RLL (1, 7) PP technique, said second modulation technique is an MSK modulation technique, and said third modulation technique is a bi-phase modulation technique.

22. A disc recording medium according to claim 1 wherein said first modulation technique is a same technique as said third modulation technique.

23. A disc recording medium according to claim 1 wherein said first and third modulation techniques are a RLL (1, 7) PP technique whereas said second modulation technique is an MSK modulation technique.

24. A disc recording medium comprising:
a data area, in which user data and user control data are configured to be recorded by marks, and in which an ADIP wobbled groove is formed to represent pre-address information (ADIP); and
a reproduction-only area, in which a prerecorded wobbled groove is formed to represent prerecorded information and prerecorded control data, wherein,
said user data is configured to be recorded by adoption of a RLL (1, 7) PP modulation according to a user data LDC block using RS (248, 216, 33) and said user control data is configured to be recorded by adoption of a RLL (1, 7) PP modulation according to BIS block using RS (62, 30, 33);
said ADIP wobbled groove is wobbled by adoption of MSK modulation using an error-correction block using nibble-based Reed-Solomon encoding RS (15, 9, 7); and
said prerecorded wobbled groove is wobbled by adoption of a bi-phase modulation corresponding to a LDC block structure using said RS (248, 216, 33), having a size that is different from said user data LDC block, and said prerecorded control data is configured to be recorded by adoption of a bi-phase modulation corresponding to BIS block using said RS (62, 30, 33), whose size is different from said user control data's BIS block.

* * * * *